US012606661B2

(12) United States Patent
Sontag et al.

(10) Patent No.: US 12,606,661 B2
(45) Date of Patent: Apr. 21, 2026

(54) COMPOSITIONS AND ARTICLES INCLUDING PERFLUOROPOLYETHER BOTTLEBRUSH POLYMERS AND METHODS OF MAKING AND USING SAME

(71) Applicant: Donaldson Company, Inc., Bloomington, MN (US)

(72) Inventors: Stephen K. Sontag, Plymouth, MN (US); Matthew P. Goertz, Bloomington, MN (US); Andrew J. Dallas, Lakeville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 840 days.

(21) Appl. No.: 17/591,524

(22) Filed: Feb. 2, 2022

(65) Prior Publication Data

US 2022/0243010 A1 Aug. 4, 2022

Related U.S. Application Data

(60) Provisional application No. 63/145,084, filed on Feb. 3, 2021.

(51) Int. Cl.

*C08F 220/24* (2006.01)
*B01D 39/16* (2006.01)
*C08G 65/22* (2006.01)

(52) U.S. Cl.

CPC ............ *C08F 220/24* (2013.01); *B01D 39/16* (2013.01); *B01D 2239/0414* (2013.01); *C08G 65/226* (2013.01); *C08G 2340/00* (2013.01); *C08G 2650/48* (2013.01)

(58) Field of Classification Search

CPC combination set(s) only.
See application file for complete search history.

(56) References Cited

U.S. PATENT DOCUMENTS

| | | | | |
|---|---|---|---|---|
| 2,642,416 | A | 6/1953 | Ahlbrecht et al. | |
| 3,544,537 | A * | 12/1970 | Brace .................. | D06M 15/277 525/200 |
| 5,216,097 | A | 6/1993 | Allewaert et al. | |
| 5,554,414 | A | 9/1996 | Moya et al. | |
| 6,579,342 | B2 | 6/2003 | Wang et al. | |

(Continued)

FOREIGN PATENT DOCUMENTS

| | | | |
|---|---|---|---|
| CN | 102002129 | A * | 4/2011 |
| CN | 108159477 | A | 6/2018 |

(Continued)

OTHER PUBLICATIONS

English translation of CN 102002129 A (Year: 2011).*

(Continued)

*Primary Examiner* — Randy P Gulakowski
*Assistant Examiner* — Audra J Destefano
(74) *Attorney, Agent, or Firm* — Mueting Raasch Group

(57) ABSTRACT

This disclosure describes compositions including a perfluoropolyether (PFPE) bottlebrush polymer, optionally blended with other fluoropolymers. The compositions may be disposed on an article, including, for example, a porous filtration media, to form a fluoropolymer-containing article. This disclosure further describes methods of making fluoropolymer-containing articles and methods of using the fluoropolymer-containing articles.

15 Claims, 18 Drawing Sheets

(XIV)

(56) References Cited

U.S. PATENT DOCUMENTS

| | | | |
|---|---|---|---|
| 6,649,719 | B2 | 11/2003 | Moore et al. |
| 6,680,357 | B1 | 1/2004 | Hedhli et al. |
| 6,753,380 | B2 | 6/2004 | Qiu |
| 6,939,922 | B2 | 9/2005 | Beckley et al. |
| 7,022,381 | B2 | 4/2006 | Kirby et al. |
| 7,056,974 | B2 | 6/2006 | Hobisch et al. |
| 7,094,829 | B2 | 8/2006 | Audenaert et al. |
| 7,199,197 | B2 | 4/2007 | Caldwell et al. |
| 7,291,696 | B2 | 11/2007 | Duong et al. |
| 7,345,123 | B2 | 3/2008 | Qiu et al. |
| 7,354,693 | B2 | 4/2008 | Hatakeyama et al. |
| 7,407,703 | B2 | 8/2008 | Deyoung et al. |
| 7,470,745 | B2 | 12/2008 | Peng et al. |
| 7,495,118 | B2 | 2/2009 | Dams et al. |
| 7,534,471 | B2 | 5/2009 | Klare et al. |
| 7,588,796 | B2 | 9/2009 | Klare et al. |
| 7,592,405 | B2 | 9/2009 | Otaguro et al. |
| 7,631,768 | B2 | 12/2009 | Duong et al. |
| 7,635,062 | B2 | 12/2009 | Klare et al. |
| 7,696,669 | B2 | 4/2010 | Kudoh |
| 7,771,818 | B2 | 8/2010 | Klare et al. |
| 7,803,867 | B2 | 9/2010 | Hanrahan et al. |
| 7,825,046 | B2 | 11/2010 | Hatfield et al. |
| 7,871,675 | B2 | 1/2011 | Stanjek et al. |
| 8,057,872 | B2 | 11/2011 | Chen |
| 8,075,967 | B2 | 12/2011 | Chen |
| 8,088,445 | B2 | 1/2012 | Thottupurathu |
| 8,167,143 | B2 | 5/2012 | Sirkar et al. |
| 8,231,013 | B2 | 7/2012 | Chu et al. |
| 8,372,475 | B2 | 2/2013 | Kim et al. |
| 8,475,970 | B2 | 7/2013 | Yamada et al. |
| 8,551,895 | B2 | 10/2013 | Yahiaoui et al. |
| 8,636,826 | B2 | 1/2014 | Curello et al. |
| 8,680,223 | B2 | 3/2014 | Jin et al. |
| 8,684,189 | B2 | 4/2014 | Chen et al. |
| 8,735,306 | B2 | 5/2014 | Hatfield et al. |
| 8,801,933 | B2 | 8/2014 | Bansal et al. |
| 8,808,868 | B2 | 8/2014 | Shenoy et al. |
| 8,858,681 | B2 | 10/2014 | Harp |
| 8,901,264 | B2 | 12/2014 | Sugiyama et al. |
| 8,975,348 | B2 | 3/2015 | Ober et al. |
| 8,978,899 | B2 | 3/2015 | Ferrer et al. |
| 9,005,344 | B2 | 4/2015 | Curello et al. |
| 9,010,547 | B2 | 4/2015 | Chu et al. |
| 9,096,695 | B2 | 8/2015 | Kaneumi et al. |
| 9,105,909 | B2 | 8/2015 | Ha et al. |
| 9,318,764 | B2 | 4/2016 | Tanaka et al. |
| 9,353,037 | B2 | 5/2016 | Chu et al. |
| 9,464,195 | B2 | 10/2016 | Petersen et al. |
| 9,527,224 | B2 | 12/2016 | Grabowski et al. |
| 9,561,473 | B2 | 2/2017 | Singh et al. |
| 9,605,347 | B2 | 3/2017 | Moon et al. |
| 9,714,463 | B2 | 7/2017 | White et al. |
| 9,737,860 | B2 | 8/2017 | Singh et al. |
| 9,751,050 | B2 | 9/2017 | Zhou et al. |
| 9,834,459 | B2 | 12/2017 | Tuteja et al. |
| 9,837,652 | B2 | 12/2017 | Suzuki |
| 9,862,665 | B2 | 1/2018 | Chu et al. |
| 9,963,546 | B2 | 5/2018 | Bhagwagar et al. |
| 9,994,732 | B1 | 6/2018 | Johnson |
| 9,994,740 | B2 | 6/2018 | Qiu et al. |
| 10,035,915 | B2 | 7/2018 | Sun et al. |
| 10,065,917 | B2 | 9/2018 | Matsuura et al. |
| 10,099,997 | B2 | 10/2018 | Hamada et al. |
| 10,150,088 | B2 | 12/2018 | Alexiou et al. |
| 10,173,960 | B2 | 1/2019 | Hamada et al. |
| 10,196,495 | B2 | 2/2019 | Stokes et al. |
| 10,273,377 | B2 | 4/2019 | Sigmund et al. |
| 10,330,442 | B2 | 6/2019 | Castille |
| 10,374,204 | B2 | 8/2019 | Honda |
| 10,441,921 | B2 | 10/2019 | Warsinger et al. |
| 10,468,653 | B2 | 11/2019 | Suzuki |
| 10,479,895 | B2 | 11/2019 | Meuler et al. |
| 10,486,101 | B2 | 11/2019 | Mochizuki et al. |
| 10,494,554 | B2 | 12/2019 | Nishikawa et al. |
| 10,543,516 | B2 | 1/2020 | White et al. |
| 10,562,065 | B1 | 2/2020 | Johnson et al. |
| 10,571,970 | B2 | 2/2020 | Hossain et al. |
| 10,577,302 | B2 | 3/2020 | Matsuura et al. |
| 10,584,264 | B1 | 3/2020 | Johnson |
| 10,597,555 | B2 | 3/2020 | Shen et al. |
| 2009/0049988 | A1 | 2/2009 | Meindl |
| 2009/0325849 | A1 | 12/2009 | Gotz et al. |
| 2015/0299506 | A1 * | 10/2015 | Fan ......................... C08L 33/16 507/224 |
| 2016/0052270 | A1 * | 2/2016 | Tsutsui .................. B41J 2/1606 427/508 |

FOREIGN PATENT DOCUMENTS

| | | | |
|---|---|---|---|
| CN | 109477291 | A | 3/2019 |
| EP | 183989 | A2 | 6/1986 |
| EP | 641594 | A1 | 3/1995 |
| GB | 1318491 | A | 5/1973 |
| JP | 5351023 | B2 | 11/2013 |
| WO | 2005061638 | A1 | 7/2005 |
| WO | 2012170832 | A1 | 12/2012 |
| WO | 2022040154 | A1 | 2/2022 |
| WO | 2022169903 | A1 | 8/2022 |

OTHER PUBLICATIONS

3rd Party Observation in PCT/US2022/014983, submitted Mar. 23, 2023, 10 pages.

Ballarin et al., "Fluoroalkylsilanes with Embedded Functional Groups as Building Blocks for Environmentally Safer Self-Assembled Monolayers," Langmuir, 2015, vol. 31, pp. 6988-6994.

Bongiovanni et al., "New perfluoropolyether uethane methacrylates as surface modifiers: Effect of molecular weight and end group structure," Reactive & Functional Polymers, 2008, vol. 68, pp. 189-200.

Cassie et al., "Wettability of porous surfaces," Transactions of the Faraday Society, 1944, vol. 40, pp. 546-551.

Colorado et al., "Wettabilities of Self-Assembled Monolayers on Gold Generated from Progressively Fluorinated Alkanethiols," Langmuir, 2003, vol. 19, pp. 3288-3296.

Corpart et al., "Structure and Surface Properties of Liquid Crystalline Fluoroalkyl Polyacrylates: Role of the Spacer," Langmuir, 2001, vol. 17, pp. 7237-7244.

EPA, "Risk Management for Per- and Polyfluoroalkyl Substances (PFAS) under TSCA," United States Environmental Protection Agency, Jan. 11, 2024, Retrieved from Internet: <https://www.epa.gov/assessing-and-managing-chemicals-under-tsca/risk-management-and-polyfluoroalkyl-substances-pfass>, 7 pages.

Honda et al., "Molecular Aggregation Structure and Surface Properties of Poly(fluoroalkyl acrylate) Thin Films," Macromolecules, 2005, vol. 28, pp. 5699-5705.

International Preliminary Report on Patentability in PCT/US2022/014983, mailed Aug. 3, 2023, 7 pages.

International Preliminary Report on Patentability in PCT/US2021/046256, mailed Feb. 16, 2023, 6 pages.

International Search Report and Written Opinion in PCT/US2021/046256, mailed Dec. 2, 2022, 8 pages.

International Search Report and Written Opinion in PCT/US2022/014983, mailed May 17, 2022, 10 pages.

Key et al., "Fluorinated Organics in the Biosphere," Environ. Sci. Technol., 1997, vol. 31, pp. 2445-2454.

Lafuma et al., "Superhydrophobic states," Nature Materials, 2003, vol. 2, pp. 457-460.

Lenk et al., "Structural Investigation of Molecular Organization in Self-Assembled Monolayers of a Semifluorinated Amidethiol," Langmuir, 1994, vol. 10, pp. 4610-4617.

Li et al., "Hydrophobic Perfluoropolyether-Coated Thin-Film Composite Membranes for Organic Solvent Nanofiltration," ACS Applied Polymer Materials, 2019, vol. 1, pp. 472-481.

Oil Repellency: Hydrocarbon Resistance Test AATCC Test Method 118-1997, AATCC Technical Manual, 2000, pp. 191-193.

Porometer "First Bubble Point", Jan. 4, 2021.

(56) References Cited

OTHER PUBLICATIONS

Sohn et al., "Tuning Surface Properties of Poly(methyl methacrylate) Film Using Poly(perfluoromethyl methacrylate)s with Short Perfluorinated Side Chains," Langmuir, 2016, vol. 32, pp. 9748-9756.
Specific Polymers, "R&D Product Portfolio," 2019, 197 pages.
Tsibouklis et al., "Poly(perfluoroalkyl methacrylate) Film Structures: Surface Organization Phenomena, Surface Energy Determinations, and Force of Adhesion Measurements," Macromolecules, 2000, vol. 33, pp. 8460-8465.
Wang et al., "Structure and surface properties of polyacrylates with short fluorocarbon side chain: Role of the main chain and spacer group," Journal of Polymer Science: Part A: Polymer Chemistry, vol. 48, pp. 2584-2593.
Wei et al., "Highly Oil-Repellent Thermoplastic Boundaries via Surface Delivery of CF3 Groups by Molecular Bottlebrush Activities," ACS Applied Materials & Interfaces, 2020, vol. 12, pp. 38626-38637.
Wenzel, "Resistance of Solid Surfaces to Wetting by Water," Ind. Eng. Chem., 1936, vol. 28, pp. 988-994.
Xu et al., "Fluorinated bottlebrush polymers based on poly (trifluoroethyl methacrylate): synthesis and characterization," Polymer Chemistry, 2016, vol. 7, pp. 680-688.
Zhang et al., "Synthesis and Performance of Novel Fluorinated Acrylate Polymers: Preparation and Reactivity of Short Perfluoroalkyl Group Containing Monomers," Ind. Eng. Chem. Res., 2014, vol. 53, pp. 8026-8034.

* cited by examiner (II)

$R_1$= -CF(CF$_3$)C(O)OCH$_2$CH$_2$O-
$R_2$= -CH$_3$ $R_1$= -CF(CF$_3$)C(O)OCH$_2$CH$_2$NH-
$R_2$= -CH$_3$ $R_1$= a bond
$R_2$= -CH$_3$ $R_1$= -CF(CF$_3$)CH$_2$O-
$R_2$= -CH$_3$ $R_1$= -CF(CF$_3$)CH$_2$O-
$R_2$= -CH$_3$
y=0

(I)

$R_3$= $-CH_2O-$
$R_4$= $CH_3$ $R_3$= $-CH_2O-$
$R_4$= $CH_3$ $R_3$= $-CH_2O-$
$R_4$= $CH_3$ $R_3$= $-CH_2CH_2O-$
$R_4$= $CH_3$ $R_3$= $-O-$
$R_4$= $CH_3$
$R_f$= $-CH(CF_3)_2$ (IV)

(III)

(V)

Monomer 1

(VI)

Polymer 1

Monomer 2

(XII)

Polymer 2

(XIII)

(VII)

(VIII)

(XIV)

AIBN benzoyl peroxide di-tertbutyl peroxide

COMPOSITIONS AND ARTICLES INCLUDING PERFLUOROPOLYETHER BOTTLEBRUSH POLYMERS AND METHODS OF MAKING AND USING SAME

CROSS REFERENCE TO RELATED APPLICATIONS

This application claims the benefit of U.S. Provisional Application No. 63/145,084, filed 3 Feb. 2021, the disclosure of which is incorporated by reference herein in its entirety.

BACKGROUND

Fluorinated polymers have allowed for the creation of surfaces that repel not only water, but also oils. There is a need for fluorinated polymers with improved oil repellency. There is further a need for fluorinated polymers with reduced or no formation of perfluoroalkyl acids by hydrolysis or oxidative degeneration.

SUMMARY OF THE INVENTION

This disclosure describes compositions including a perfluoropolyether (PFPE) bottlebrush polymer, optionally blended with other fluoropolymers. The fluoropolymer or fluoropolymers do not form perfluorooctanoic acid (PFOA) when they degrade, and exhibit unexpectedly good oil repellency. The compositions may be disposed on an article, including, for example, a porous filtration media, to form a fluoropolymer-containing article. This disclosure further describes methods of making fluoropolymer-containing articles and methods of using the fluoropolymer-containing articles.

In one aspect, this disclosure describes a composition including a perfluoropolyether (PFPE) bottlebrush polymer, wherein the PFPE bottlebrush polymer comprises a subunit having the structure:

(IV)

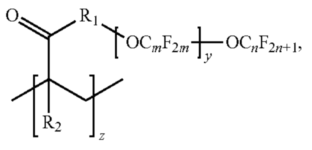

wherein each $R_1$ is independently a bond or a carbon-containing linker comprising at least 1 and up to 4 oxygen atoms, at least 1 and up to 5 carbon atoms, and, optionally up to 2 nitrogen atoms, up to 4 fluorine atoms, and up to 1 sulfur atom; wherein each $R_2$ is independently H or an alkyl comprising at least 1 and up to 4 carbon atoms; wherein m=1-3; wherein n=1-4; wherein y=0-30; wherein z=10-60; and wherein the PFPE bottlebrush polymer comprises at least 90% (w/w) subunits of Structure IV, based on the total weight of the PFPE bottlebrush polymer. In some embodiments n is 1-3. In certain embodiments, the PFPE bottlebrush polymer is free of subunits where n is 4 or greater.

In some embodiments, the composition further includes a short chain fluoropolymer comprising a subunit having the structure:

(III)

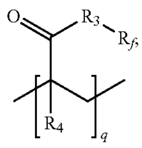

wherein each $R_3$ is independently a carbon-containing linker comprising at least 1 oxygen atom or nitrogen atom and at least 1 and up to 2 carbon atoms; wherein each $R_4$ is independently H or an alkyl comprising at least 1 and up to 4 carbon atoms; wherein each $R_f$ is independently F or a substituted alkyl comprising at least 1 and up to 4 carbon atoms and at least 1 and up to 9 fluorine atoms; and wherein q is at least 10, at least 20, at least 30, at least 40, at least 50, or at least 60. In some embodiments $R_f$ is independently F or a substituted alkyl comprising at least 1 and up to 4 carbon atoms and up to 9 fluorine atoms, or up to 3 carbon atoms and up to 7 fluorine atoms. In some embodiments, the fluoropolymer is free of subunits that include 4 or more consecutive fluorinated carbons.

In another aspect, this disclosure describes an article that includes a composition including a perfluoropolyether (PFPE) bottlebrush polymer disposed on a surface of the article.

In yet another aspect, this disclosure describes a method of making an article that includes a treated porous filtration medium. The method includes contacting a porous filtration medium with a mixture including a perfluoropolyether (PFPE) bottlebrush polymer and a liquid, depositing the mixture onto the porous filtration medium to form the treated porous filtration medium, and removing the liquid.

As used herein, "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 8 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

As used herein, "oleophobicity" refers to a rating on a scale of 1 to 8, determined according to AATCC TM118-2013e2 entitled "Oil Repellency: Hydrocarbon Resistance Test" wherein the ratings are rounded to the nearest integer value.

As used herein, "perfluorinated" or "perfluoroalkyl" refers to a group including carbon and fluorine atoms in which each carbon atom in the group is fully saturated with fluorine.

As used herein, "polyfluorinated" refers to a group including carbon and fluorine atoms in which the carbon atoms are not necessarily fully saturated with fluorine. Such a group may include, for example, a carbon-hydrogen bond.

As used herein, "perfluoropolyether" refers to a compound group including the following structure:

$$-\left[OC_mF_{2m}\right]_y-OC_nF_{2n+1},$$

wherein y is at least 1, m is 1 to 3, and n is 1 to 4.

The terms “polymer” and “polymeric material” include, but are not limited to, organic homopolymers, copolymers, such as for example, block, graft, random, and copolymers, terpolymers, etc., and blends and modifications thereof. Furthermore, unless otherwise specifically limited, the term “polymer” shall include all possible geometrical configurations of the material. These configurations include, but are not limited to, isotactic, syndiotactic, and atactic symmetries.

The term “copolymer” refers to polymers containing two or more different monomeric units or segments, including terpolymers, tetrapolymers, etc.

When a group is present more than once in a formula described herein, each group is independently selected, whether specifically stated or not. For example, when more than one $R_1$ group is present in a formula, each $R_1$ group is independently selected. Furthermore, subgroups contained within these groups may also be independently selected.

As used herein, weight average molecular weight ($M_w$) and number average molecular weight ($M_n$) are determined using poly(methyl methacrylate) (PMMA) standards and gel permeation chromatography (GPC). It may be desirable to use a PMMA standard in which the values of the molecular weight corresponding to the maximum of the chromatographic peak (Mp) range from 800 Da to 2,200 kDa to generate a calibration curve. It may be useful to use a column including highly cross-linked polystyrene-divinylbenzene (PSDVB), such as a PHENOGEL column (Phenomenex, Torrance, CA). Hexafluoroisopropanol (HFIPA) may be used as the solvent. A combination of HFIPA and Novec 7100 may also be used as the solvent. A flow rate of 0.8 mL/minute may be used. A column temperature of 40-50° C. may be maintained.

As used herein, air permeability refers to permeability measured by fixing the pressure drop and measuring the airflow. An exemplary permeability test may measure the amount of air flow across a test fixture with a fixed differential pressure of 0.5 inches (124.5 Pa) water ($H_2O$). The air permeability may be reported in cubic feet per minute (or liters per second) and referred to as Frazier permeability. One useful instrument for determining Frazier permeability is an Air Permeability Tester Model FX3300 (Texttest AG, Schwerzenbach, Switzerland).

As used herein, unless indicated otherwise, pore size (for example, mean flow pore size or maximum pore size) is determined using capillary flow porometry. Capillary flow porometry may be performed using a continuous pressure scan mode. An exemplary range of applied pressures that may be used is 0.115 bar to 3.5 bar (15 kPa to 350 kPa). It may be useful to use a wetting liquid having a surface tension of 16 dynes/cm and a contact angle of 0, including, for example POROFIL Wetting Solution (Quantachrome Instruments, Anton Paar, Boynton Beach, FL). The sample may initially be tested dry, varying low pressure to high pressure, and then tested wet, again varying low pressure to high pressure. The test is typically performed at ambient temperature conditions (for example, 20° C. to 25° C.). 200 data points may be collected across the range of the scan of the pressures for both the dry curve and the wet curve. Typically, a tortuosity factor and/or a shape factor of 0.715 is applied. An average pore size (for example, average mean flow pore size or average maximum pore size) may be calculated from the mean of at least three measurements. Individual measurements of maximum pore size may be detected at a measured bubble point, where the measured bubble is determined by increasing the pressure on a wetted sample until the point at which the wetting fluid is displaced and air flow is measured. The pressure at which air flow is first measured indicates the point at which the first and largest pore is opened. Individual measurements of mean flow pore size may be calculated by determining the pressure where the wet curve and the “half-dry” curve cross. The half-dry curve is obtained by the mathematical division by 2 of the air flow through a dry sample as a function of diameter ($V'_{dry}$).

The words “preferred” and “preferably” refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term “comprises” and variations thereof do not have a limiting meaning where these terms appear in the description and claims. Such terms will be understood to imply the inclusion of a stated step or element or group of steps or elements but not the exclusion of any other step or element or group of steps or elements.

By “consisting of” is meant including, and limited to, whatever follows the phrase “consisting of” Thus, the phrase “consisting of” indicates that the listed elements are required or mandatory, and that no other elements may be present. By “consisting essentially of” is meant including any elements listed after the phrase, and limited to other elements that do not interfere with or contribute to the activity or action specified in the disclosure for the listed elements. Thus, the phrase “consisting essentially of” indicates that the listed elements are required or mandatory, but that other elements are optional and may or may not be present depending upon whether or not they materially affect the activity or action of the listed elements.

Unless otherwise specified, “a,” “an,” “the,” and “at least one” are used interchangeably and mean one or more than one.

As used herein, the term “or” is generally employed in its usual sense including “and/or” unless the content clearly dictates otherwise. The term “and/or” means one or all of the listed elements or a combination of any two or more of the listed elements.

Any reference to standard methods (for example, ASTM, TAPPI, AATCC, etc.) refer to the most recent available version of the method at the time of filing of this disclosure unless otherwise indicated.

Also herein, the recitations of numerical ranges by endpoints include all numbers subsumed within that range (for example, 1 to 5 includes 1, 1.5, 2, 2.75, 3, 3.80, 4, 5, etc.).

Herein, “up to” a number (for example, up to 50) includes the number (for example, 50).

The term “in the range” or “within a range” (and similar statements) includes the endpoints of the stated range.

The term “substantially” as used here has the same meaning as “significantly,” and can be understood to modify the term that follows by at least about 90%, at least about 95%, or at least about 98%. The term “substantially free” of a particular compound means that the compositions of the present disclosure contain less than 1,000 parts per million (ppm) of the recited compound. The compositions of the present disclosure contain less than the aforementioned amount of the compound whether the compound itself is present in unreacted form or has been reacted with one or more other materials.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

In FIG. 3A, a quadratic fit was used for the mixture of Polymer 1 and Polymer 2, and a linear fit was used for the (total polymer) concentrations of 1% to 6%. In FIG. 3B, a quadratic fit was used for the mixture of Polymer 1 and Polymer 2, and a linear fit was used for the (total polymer) concentrations of 1% to 6%. Additional information about the statistical fit of each model is provided in Table 6A-Table 6B, for FIG. 3A-FIG. 3B, respectively.

FIG. 4A-FIG. 4B show properties of Side 1 of Media B (ePTFE side); FIG. 4C-FIG. 4D show properties of Side 2 of Media B (scrim side). In FIG. 4A, a quadratic fit was used for the mixture of Polymer 1 and Polymer 2, and a cubic fit was used for the (total polymer) concentrations of 1% to 6%. In FIG. 4B, a linear fit was used for the mixture of Polymer 1 and Polymer 2, and a linear fit was used for the (total polymer) concentrations of 1% to 6%. In FIG. 4C, a cubic fit was used for the mixture of Polymer 1 and Polymer 2, and a cubic fit was used for the (total polymer) concentrations of 1% to 6%. In FIG. 4D, a linear fit was used for the mixture of Polymer 1 and Polymer 2, and a linear fit was used for the (total polymer) concentrations of 1% to 6%. Additional information about the statistical fit of each model is provided in Table 7A-Table 7D, for FIG. 4A-FIG. 4D, respectively.

In FIG. 5A, a cubic fit was used for the mixture of Polymer 1 and Polymer 2, and a linear fit was used for the (total polymer) concentrations of 1% to 6%. In FIG. 5B, a quadratic fit was used for the mixture of Polymer 1 and Polymer 2, and a quadratic fit was used the (total polymer) concentrations of 1% to 6%. Additional information about the statistical fit of each model is provided in Table 8A-Table 8B, for FIG. 5A-FIG. 5B, respectively.

DETAILED DESCRIPTION OF ILLUSTRATIVE EMBODIMENTS

Figure 1A:
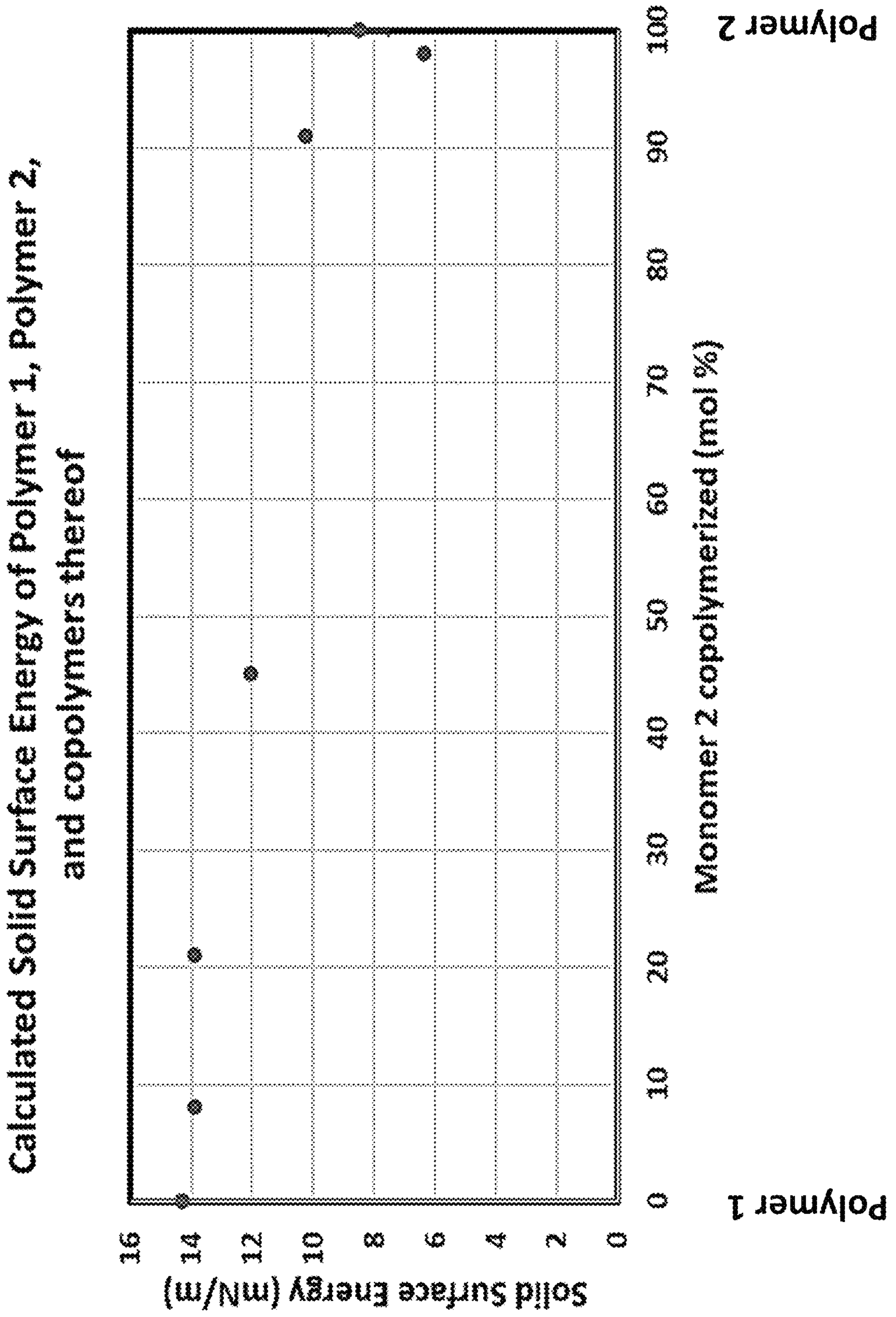
FIG. 1A shows exemplary solid surface energy results of coating a glass slide with poly(perfluoropolyether$_{1000}$ methacrylate) (also referred to as "poly(PFPE$_{1000}$ methacrylate)" or "Polymer 2," the structure of which is shown in FIG. 2H); poly(2,2,3,3,4,4,4-heptafluorobutyl methacrylate) (also referred to as "Polymer 1," the structure of which is shown in FIG. 2F); and a copolymer including the monomers used to form Polymer 2 and Polymer 1: perfluoropolyether$_{1000}$ methacrylate (also referred to as "PFPE$_{1000}$ methacrylate" or "Monomer 2", a perfluoropolyether methacrylate having a number average molecular weight ($M_n$) of 1000, the structure of which is shown in FIG. 2G) and 2,2,3,3,4,4,4-heptafluorobutyl methacrylate (also referred to as "Monomer 1," the structure of which is shown in FIG. 2E), as further described in Example 52A.
Figure 1B:
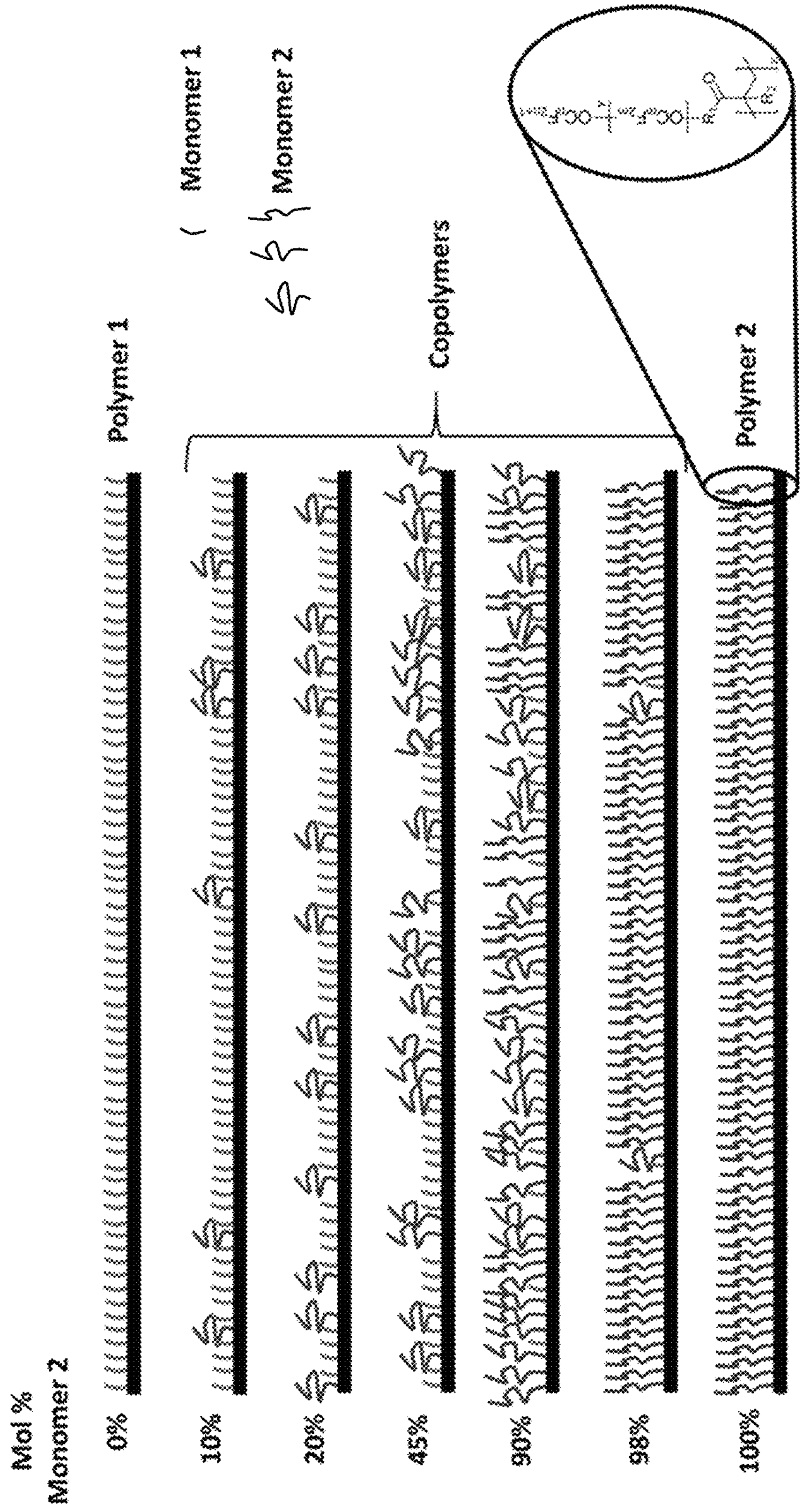
FIG. 1B shows a schematic of the predicted effect of the proportions of Monomer 1 and Monomer 2 during copolymerization on the geometric configuration of the side chain of PFPE$_{1000}$ methacrylate (Monomer 2) in the resulting copolymer, as further described in Example 52A.

This disclosure describes compositions including a perfluoropolyether (PFPE) bottlebrush polymer, optionally blended with other fluoropolymers. The fluoropolymer or fluoropolymers do not form perfluorooctanoic acid (PFOA) when they degrade. The fluoropolymer or fluoropolymers exhibit unexpectedly good oil repellency. The compositions may be disposed on (e.g., coated onto) an article, including, for example, a porous filtration media, to form a fluoropolymer-containing article (e.g., fluoropolymer-coated filtration media). The composition may be free of or substantially free of polymers or subunits with 6 or more consecutive fluorocarbons. The composition may be free of or substantially free of polymers or subunits with 4 or more consecutive fluorocarbons. This disclosure further describes methods of making fluoropolymer-containing articles and methods of using the fluoropolymer-containing articles.

Compositions Including Fluoropolymers

In one aspect, this disclosure describes a composition including a perfluoropolyether (PFPE) bottlebrush polymer or a PFPE bottlebrush polymer and a short chain fluoropolymer. Each of these polymers is further described below.

In some embodiments, the composition includes an organic solvent. The polymer or polymers may be dissolved in the solvent. Any suitable organic solvent may be used including, for example, methyl ethyl ketone (MEK) or a fluorosolvent. In an exemplary embodiment, a fluorosolvent may include a fluorinated ether. The composition including a solvent and one or more polymers (e.g., PFPE bottlebrush polymer and optionally a short chain fluoropolymer) may be coated onto an article. The solvent may subsequently be removed.

In some embodiments, the composition may include at least 1 weight % of the one or more polymer (in grams) per volume of solvent (mL) (w/v), at least 2% (w/v), at least 3% (w/v), at least 4% (w/v), at least 5% (w/v), at least 6% (w/v), or at least 7% (w/v) total polymer in solvent. In some embodiments, the composition may include up to 1% (w/v), up to 2% (w/v), up to 3% (w/v), up to 4% (w/v), up to 5% (w/v), up to 6% (w/v), up to 7% (w/v), or up to 8% (w/v) total polymer in solvent.

In some embodiments, the composition may include at least 1% (w/v), at least 2% (w/v), at least 3% (w/v), at least 4% (w/v), at least 5% (w/v), at least 6% (w/v), or at least 7% (w/v) of the PFPE bottlebrush polymer or combined PFPE bottlebrush polymer and a short chain fluoropolymer (in grams) per volume of solvent (mL) (w/v). In some embodiments, the composition may include up to 1% (w/v), up to 2% (w/v), up to 3% (w/v), up to 4% (w/v), up to 5% (w/v), up to 6% (w/v), up to 7% (w/v), or up to 8% (w/v) of the PFPE bottlebrush polymer or combined PFPE bottlebrush polymer and a short chain fluoropolymer (in grams) per volume of solvent (mL) (w/v).

For example, in an exemplary embodiment, the composition may include 1% (w/v) to 8% (w/v) total polymer in solvent. In another exemplary embodiment, the composition may include 1% (w/v) to 6% (w/v) total polymer in solvent. The composition may include 1% (w/v) to 8% (w/v) of the PFPE bottlebrush polymer or combined PFPE bottlebrush polymer and a short chain fluoropolymer. The composition may include 1% (w/v) to 6% (w/v) of the PFPE bottlebrush polymer or combined PFPE bottlebrush polymer and a short chain fluoropolymer.

PFPE Bottlebrush Polymer

In one aspect, this disclosure describes a composition including a perfluoropolyether (PFPE) bottlebrush polymer. The PFPE bottlebrush polymer includes fluorinated carbons tethered to a polymer chain derived from the polymerized acrylate group of the PFPE methacrylate monomer.

In some embodiments, the PFPE bottlebrush polymer has a number average molecular weight ($M_n$) of at least 19 kg/mol, at least 25 kg/mol, or at least 40 kg/mol. In some embodiments, the PFPE bottlebrush polymer has a number average molecular weight ($M_n$) of up to 80 kg/mol, up to 60 kg/mol, up to 50 kg/mol, or up to 26 kg/mol.

In some embodiments, the composition includes at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), at least 80% (w/w), at least 90% (w/w), or at least 95% (w/w) of the PFPE bottlebrush polymer, based on the total weight of polymers in the composition.

In some embodiments, the composition includes up to 10% (w/w), up to 15% (w/w), up to 20% (w/w), up to 30% (w/w), up to 40% (w/w), up to 50% (w/w), up to 60% (w/w), up to 70% (w/w), up to 80% (w/w), up to 90% (w/w), up to 95% (w/w), or up to 100% (w/w) of the PFPE bottlebrush polymer, based on the total weight of polymers in the composition.

For example, in an exemplary embodiment, the composition may include PFPE bottlebrush polymer in a range of 5% (w/w) to 95% (w/w) based on the total weight of polymers in the composition. For example, in another exemplary embodiment, the composition may include PFPE bottlebrush polymer in a range of 20% (w/w) to 80% (w/w) based on the total weight of polymers in the composition. In a further exemplary embodiment, the composition may include PFPE bottlebrush polymer in a range of 30% (w/w) to 70% (w/w) based on the total weight of polymers in the composition. In yet another exemplary embodiment, the composition may include PFPE bottlebrush polymer in a range of 50% (w/w) to 80% (w/w) based on the total weight of polymers in the composition.

In some embodiments, the PFPE bottlebrush polymer is derived from polymerization of one or more monomers, the monomers including a monomer having the structure:

(II)

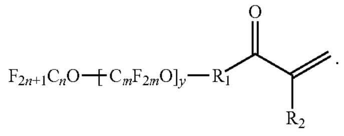

$R_1$ is a bond or a carbon-containing linker including at least 1 and up to 4 oxygen atoms, at least 1 and up to 5 carbon atoms, and, optionally up to 2 nitrogen atoms, up to 4 fluorine atoms, and up to 1 sulfur atom. That is, unless $R_1$ is a bond, $R_1$ must include at least one oxygen atom and at least 1 carbon atom, but $R_1$ may include 0 (and up to 2) nitrogen atoms, 0 (and up to 4) fluorine atoms, and/or 0 (and up to 1) sulfur atoms. $R_2$ is H or an alkyl comprising at least 1 and up to 4 carbon atoms. m=1-3; n=1-4; and y=0-30. In some embodiments n is 1-3. In certain embodiments, the PFPE bottlebrush polymer is free of subunits where n is 4 or greater. Exemplary monomers of Structure II are shown on the right side of FIG. 2A.

In some embodiments, the monomers of Structure II preferably constitute at least 90 mol-% of the recurring units in the PFPE bottlebrush polymer, based on 100 mol-% of all of the recurring units. In some embodiments, the monomers of Structure II constitute at least 95 mol-%, at least 98 mol-%, or at least 99 mol-% of all the recurring units in the PFPE bottlebrush polymer. In some embodiments, the monomers of Structure II constitute 100 mol-% of the recurring units in the PFPE bottlebrush polymer.

Figure 2A:
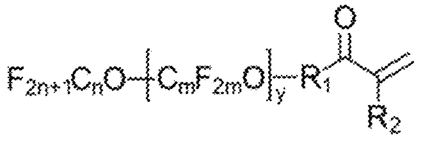
FIG. 2A shows a generalized structure of perfluoropolyether methacrylate monomer (left side, Structure II) and specific examples thereof (right side), which may be used to make poly(perfluoropolyether methacrylate) (also referred to herein as "poly(PFPE)" or "PFPE bottlebrush polymer").
Figure 2A:
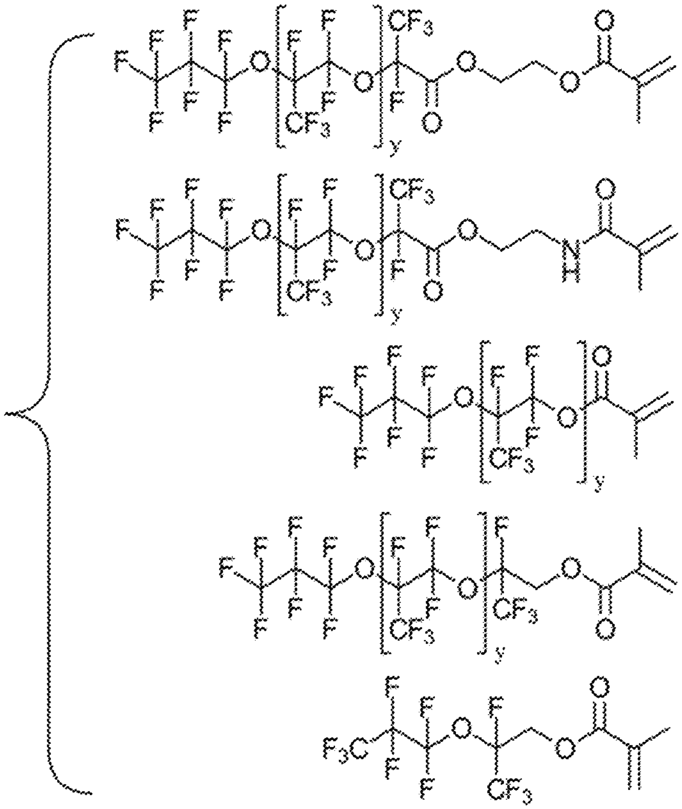

In some embodiments, the PFPE bottlebrush polymer may include only the monomers specified in FIG. 2A and, if there are no variations in the R groups, the PFPE bottlebrush polymer will be a homopolymer. In some embodiments, the PFPE bottlebrush polymer may be a copolymer. When the PFPE bottlebrush polymer is a copolymer, it may include only the monomers specified (with variations in the R groups), that is, without other monomers, or it may include one or more additional, other monomers.

In some embodiments, as noted above, the PFPE bottlebrush polymer is a copolymer. When the PFPE bottlebrush polymer is a copolymer, it may include only the subunits specified (e.g., structures (III) and (IV), with variations in the R groups), or, alternatively, it may include one or more additional, other subunits. When the PFPE bottlebrush polymer is a copolymer, it may include any suitable type of copolymer such as, for example, a block copolymer, a random copolymer, an alternating copolymer, etc. Additional copolymers are also envisioned including, for example, terpolymers, tetrapolymers, etc. The PFPE bottlebrush polymer may also include blends and modifications of the polymers and copolymers described herein. In some embodiments, the PFPE bottlebrush polymer is preferably a random copolymer.

Exemplary examples of $R_1$ of Structure II are a bond, $-OCH_2CF(CF_3)-$, $-OCH_2CH_2OC(O)CF(CF_3)-$, and $-NHCH_2CH_2OC(O)CF(CF_3)-$. Exemplary examples of $R_2$ include —H and $-CH_3$.

In one exemplary embodiment, the PFPE bottlebrush polymer is derived from polymerization of monomers of Structure II, where $R_1$ is $-OCH_2CH_2OC(O)CF(CF_3)-$ and $R_2$ is $-CH_3$. m may be 1, 2, or 3, preferably 3; n may be 1, 2, 3, or 4; and y may be any integer up to 30, preferably up to 10, up to 6, or up to 4.

Figure 2B:
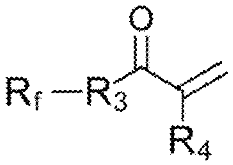
FIG. 2B shows a generalized structure of a polyfluorinated alkyl methacrylate monomer (left side, Structure I) and specific examples thereof (right side) that may be used to make short chain (acrylate or methacrylate) fluoropolymer polymers as described herein.
Figure 2B:
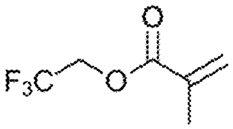
Figure 2B:
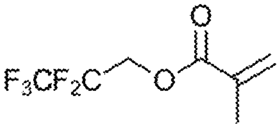
Figure 2B:
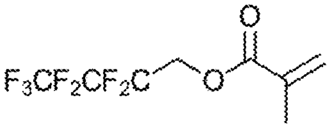
Figure 2B:
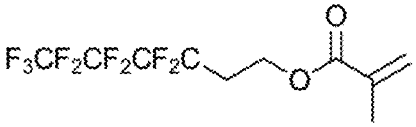
Figure 2B:
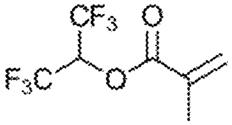
Figure 2C:
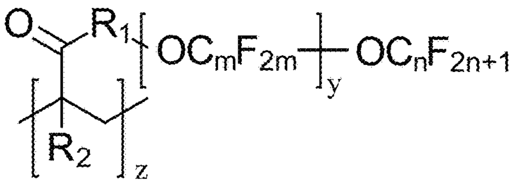
FIG. 2C shows a generalized structure of a PFPE bottlebrush polymer (Structure IV).
Figure 2D:
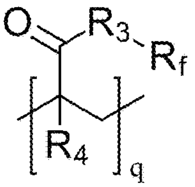
FIG. 2D shows a generalized structure of a short chain (acrylate or methacrylate) fluoropolymer (Structure III).
Figure 2E:
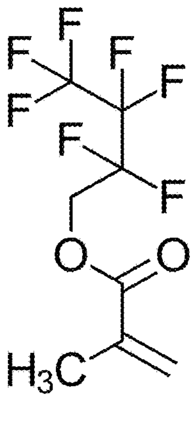
FIG. 2E shows the structure of 2,2,3,3,4,4,4-heptafluorobutyl methacrylate (Structure V), also referred to herein as "Monomer 1."
Figure 2F:
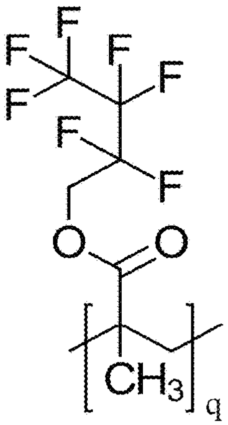
FIG. 2F shows the structure of poly(2,2,3,3,4,4,4-heptafluorobutyl methacrylate) (Structure VI), also referred to herein as "Polymer 1."
Figure 2G:
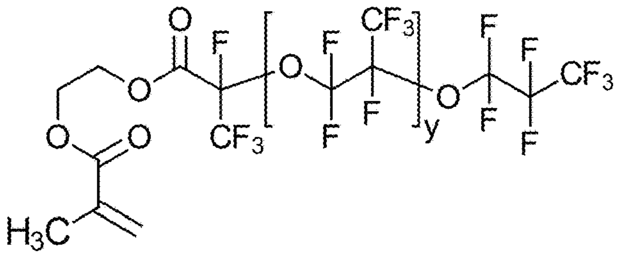
FIG. 2G shows the structure of perfluoropolyether$_{1000}$ methacrylate (Structure XII), that is, a perfluoropolyether methacrylate having a number average molecular weight ($M_n$) of 1000, also referred to herein as "Monomer 2."

In one exemplary embodiment, the PFPE bottlebrush polymer may be derived from polymerization of monomers wherein at least one of the monomers is perfluoropolyether$_{1000}$ methacrylate, also referred to herein as Monomer 2, the structure of which is shown in FIG. 2G. That is, with respect to Structure II, $R_1$ is $-OCH_2CH_2OC(O)CF(CF_3)-$; $R_2$ is $-CH_3$; m=3; n=3; and y is 1 or greater, 2 or greater, 3 or greater, or 4 or greater. Y may be 30 or less, 20 or less, 10 or less, 9 or less, or 6 or less. Y may be at least 1 and up to 30, from 1 to 20, from 3 to 9, or from 1 to 9. In some cases, y is 3 or 4.

The monomer of Structure II includes segments of up to 4 consecutive polyfluorinated (including, for example, perfluorinated) carbons. The term "consecutive" in this context refers to polyfluorinated carbons that are not separated by another atom, such as oxygen. In some embodiments, the monomer of Structure II more preferably includes up to 3 consecutive polyfluorinated carbons. Because the resulting polymer does not include long chains of consecutive polyfluorinated carbons in a fluorinated segment (including, for example, $-OC_mF_{2m}-$ or $-OC_nF_{2n+1}-$), its degradation cannot result in the production of long chain perfluoroalkyl acids. For example, it may be desirable that the polymer does not include more than 4 consecutive polyfluorinated carbons, or includes fewer than 4 consecutive polyfluorinated carbons. In some embodiments, degradation of the polymer does not result in the formation or perfluorooctanoic acid (PFOA), which is only formed when at least 8 consecutive polyfluorinated carbons are present, perfluorohexanoic acid, or perfluorobutanoic acid. Although the monomer of Structure II does not include long chains of consecutive fluorinated carbons (for example, 7 or more consecutive polyfluorinated carbons), it can include polyfluorinated carbon chains that include shorter chains of polyfluorinated carbons (for example, up to 4 carbons) separated by oxygen atoms. Without wishing to be bound by theory, it is believed that these pendant chains provide the desired oleophobicity and/or repellency when the resulting polymer is used as a coating without the risk of producing PFOA or other long chain perfluoroalkyl acids.

In some embodiments, at least 65% or at least 75% of the polyfluorinated carbons are fully fluorinated. For example, when the monomer of Structure II includes 4 polyfluorinated carbon atoms, at least 3 carbon atoms may be fully fluorinated. In another example, when the monomer of Structure II includes 3 carbon atoms, at least 2 carbon atoms may be fully fluorinated. In many cases, all of the carbons pending from $R_1$ (not including the carbons of $R_1$, $R_2$, or any carbons between $R_1$ and $R_2$) in the monomer of Structure II are fully fluorinated.

In some embodiments the polyfluorinated carbons are perfluorinated, that is, every carbon in the chain is fully fluorinated. In some embodiments the polyfluorinated carbons in the monomer of Structure II are preferably perfluorinated.

As noted above, in some embodiments, the PFPE bottlebrush polymer may be a copolymer. In an exemplary embodiment, the PFPE bottlebrush polymer may be derived from polymerization monomers including a first monomer of Structure II and a second monomer having the following structure:

(VII)

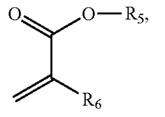

wherein $R_5$ is a carbon-containing linker, optionally comprising up to 9 fluorine atoms, up to 1 silicon atom, up to 3 oxygen atoms, and up to 2 nitrogen atoms. That is, $R_5$ may simply be an alkyl (including 0 fluorine atoms, 0 silicon atom, 0 oxygen atoms, and 0 nitrogen atoms), but $R_5$ may further include up to 9 fluorine atoms, up to 1 silicon atom, up to 3 oxygen atoms, and/or up to 2 nitrogen atoms. $R_6$ is H or an alkyl comprising at least 1 and up to 4 carbon atoms.

In some embodiments, $R_5$ may include up to 8 carbon atoms. In exemplary embodiments, $R_5$ may be $—CH_2CH_2CH_2Si(OCH_3)_3$, $—CH_2CH_2OH$, or $—CH_3$. In some embodiments, $R_5$ may be polyfluorinated or perfluorinated. When $R_5$ is polyfluorinated or perfluorinated, $R_5$ may preferably include up to 4 consecutive fluorinated carbons, more preferably up to 3 consecutive fluorinated carbons.

In some embodiments, it may be desirable to include a monomer having a cross-linkable side chain (for example, $—CH_2CH_2CH_2Si(OCH_3)_3$) as $R_5$. Without wishing to be bound by theory, it is believed that such cross-linking may result in decreased tackiness, increased stability, and/or increased oleophobicity of the treated porous filtration medium. Suitable cross-linkable side chains may preferably be inducibly cross-linked after the polymer has been disposed on an article (including, for example, on a porous filtration medium). A secondary additive may be added to induce crosslinking of the cross-linkable side chain.

In some embodiments, monomers of Structure VII constitute at least 0.5 mol-%, at least 1 mol-%, at least 5 mol-%, or at least 10 mol-% of all of the recurring units of the PFPE bottlebrush polymer, based on the total recurring units. In some embodiments, monomers of Structure VII constitute up to 1 mol-%, up to 5 mol-%, up to 10 mol-%, up to 15 mol-%, up to 20 mol-%, up to 25 mol-%, up to 30 mol-%, up to 35 mol-%, or up to 40 mol-% of all of the recurring units of the PFPE bottlebrush polymer. For example, in an exemplary embodiment, monomers of Structure VII constitute 0.5 mol-% to 10 mol-%, from 5 mol-% to 40 mol-%, or from 10 mol-% to 25 mol-% of all of the recurring units of the PFPE bottlebrush polymer. In another exemplary embodiment, monomers of Structure VII constitute 10 mol-% to 20 mol-% of all of the recurring units of the PFPE bottlebrush polymer. In some embodiments, the remainder of recurring units of the PFPE bottlebrush polymer includes or consists of monomers of Structure II.

In the PFPE bottlebrush polymer, the monomers of Structure II and the monomers of Structure VII may be present in blocks, may be alternating, or may be random.

In some embodiments, the PFPE bottlebrush polymer includes a subunit having the structure:

(IV)

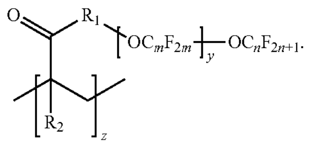

Each $R_1$ is independently a bond or a carbon-containing linker comprising at least 1 and up to 4 oxygen atoms, at least 1 and up to 5 carbon atoms, and, optionally up to 2 nitrogen atoms, up to 4 fluorine atoms, and up to 1 sulfur atom. That is, unless $R_1$ is a bond, each $R_1$ must include at least one oxygen atom and at least 1 carbon atom, but each $R_1$ may include 0 (and up to 2) nitrogen atoms, 0 (and up to 4) fluorine atoms, and/or 0 (and up to 1) sulfur atoms. Each $R_2$ is independently H or an alkyl comprising at least 1 and up to 4 carbon atoms. m=1-3; n=1-4; y=0-30; and z=10-60. In some embodiments n is 1-3. In certain embodiments, the PFPE bottlebrush polymer is free of subunits where n is 4 or greater.

In some embodiments, subunits of Structure IV constitute at least 90 mol-% of all the recurring units of the PFPE bottlebrush polymer, based on 100 mol-% of all of the recurring units. In some embodiments subunits of Structure IV constitute at least 95 mol-%, at least 98 mol-%, or at least 99 mol-% of all of the recurring units of the PFPE bottlebrush polymer. In some embodiments, subunits of Structure IV constitute 100 mol-% of all of the recurring units of the PFPE bottlebrush polymer. In embodiments, where the polymer includes subunits of Structure VII, the amount of subunits of Structure IV may range from 60 mol-% to 99.5 mol-% of all of the recurring units of the PFPE bottlebrush polymer. In some embodiments, monomers of Structure IV are present at 80 mol-% of greater, 85 mol-% or greater, 90 mol-% or greater, 95 mol-% or greater, or 99 mol-% or greater of all of the recurring units of the PFPE bottlebrush polymer. In an exemplary embodiment, monomers of Structure IV are present at 80 mol-% to 90 mol-% of all of the recurring units of the PFPE bottlebrush polymer.

In some embodiments, PFPE bottlebrush polymer may include only the subunits specified (e.g., structures (III) and (IV)) and, if there are no variations in the R groups, the PFPE bottlebrush polymer will be a homopolymer. Alternatively, the PFPE bottlebrush polymer may include only the subunits specified (with variations in the R groups), that is, without other monomers; or it may include one or more additional, other monomers. In some embodiments, as noted above, the PFPE bottlebrush polymer is a copolymer.

Figure 2H:
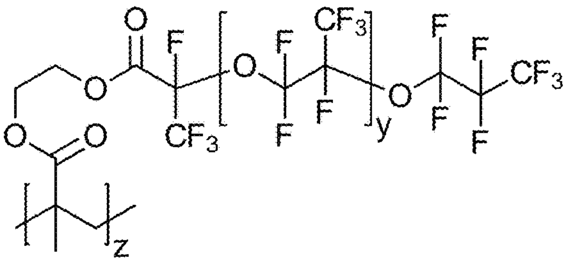
FIG. 2H shows the structure of poly(perfluoropolyether$_{1000}$ methacrylate) (Structure XIII), that is, a polymer formed from a perfluoropolyether methacrylate having a number average molecular weight ($M_n$) of 1000, also referred to herein as "poly(PFPE$_{1000}$)" or "Polymer 2."
Figure 2I:
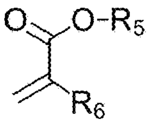
FIG. 2I shows the structure of a monomer that may be included in a PFPE bottlebrush polymer (Structure VII) when the PFPE bottlebrush polymer is a copolymer.
Figure 2J:
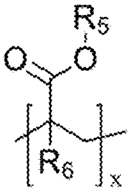
FIG. 2J shows the structure of a polymeric unit (Structure VIII) that may be included in a PFPE bottlebrush polymer when the PFPE bottlebrush polymer is a copolymer.

In one exemplary embodiment, the PFPE bottlebrush polymer may include a subunit having the structure (Structure XIII) shown in FIG. 2H. Structure XIII is Structure IV, where each $R_1$ is —$OCH_2CH_2OC(O)CF(CF_3)$—; each $R_2$ is —$CH_3$; m=3; n=3; y is 1 or greater, 2 or greater, 3 or greater, or 4 or greater. Y may be 30 or less, 20 or less, 10 or less, 9 or less, or 6 or less. Y may be at least 1 and up to 30, from 1 to 20, from 3 to 9, or from 1 to 9. In some cases, y is 3 or 4. Z is at least 19 and up to 26. That is, the polymer may include poly(perfluoropolyether$_{1000}$ methacrylate) or may be poly(perfluoropolyether$_{1000}$ methacrylate). Poly(perfluoropolyether$_{1000}$ methacrylate) is also referred to herein as "poly(PFPE$_{1000}$)" or "Polymer 2." Additional ranges for z may also be envisioned (including, for example, wherein z is at least 10 and up to 60 or up to 80), but for Polymer 2, as described herein, z is in a range of 19 to 26.

Figure 2K:
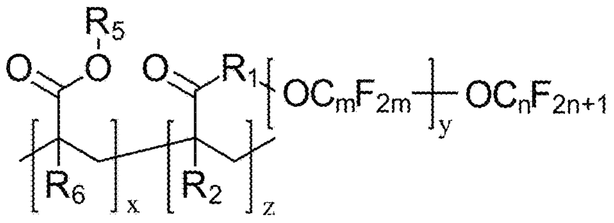
FIG. 2K shows the structure of an exemplary PFPE bottlebrush polymer (Structure XIV) that includes two different monomers.
Figure 2L:
FIG. 2L shows the structures of exemplary end groups of a PFPE bottlebrush polymer. The end group may be a residue of a free radical initiating species such as azobisisobutyronitrile (AIBN), a benzoyl peroxide, or di-tertbutyl peroxide.
Figure 2L:
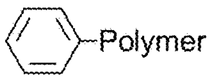
Figure 2L:
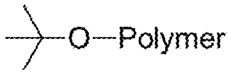

In some embodiments, the end group of the PFPE bottlebrush polymer may be a residue of a free radical initiating species. Exemplary end groups include a residue of azobisisobutyronitrile (AIBN), a residue of benzoyl peroxide, and a residue of di-tertbutyl peroxide. Exemplary structures of such end groups are shown in FIG. 2L.

As noted above, in some embodiments, the PFPE bottlebrush polymer may be a copolymer. In an exemplary embodiment, the PFPE bottlebrush polymer includes a subunit of Structure IV and also a subunit having the structure:

(VIII)

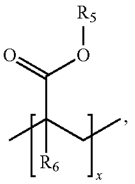

wherein each $R_5$ is independently a carbon-containing linker, optionally comprising up to 9 fluorine atoms, up to 1 silicon atom, up to 3 oxygen atoms, and up to 2 nitrogen atoms; wherein each $R_6$ is independently H or an alkyl comprising at least 1 and up to 4 carbon atoms; and wherein x=1-6. That is $R_5$ may include 0 (and up to 9) fluorine atoms, 0 (and up to 1) silicon atom, 0 (and up to 3) oxygen atoms, and/or 0 (and up to 2) nitrogen atoms. Structure (VIII) may be the result of using Structure (VII) to form the copolymer.

In some embodiments, each $R_5$ may independently include up to 8 carbon atoms. In exemplary embodiments, each $R_5$ may independently be —$CH_2CH_2CH_2Si(OCH_3)_3$, —$CH_2CH_2OH$, or —$CH_3$. In some embodiments, each $R_5$ may be independently polyfluorinated or perfluorinated. When $R_5$ is polyfluorinated or perfluorinated, $R_5$ may include up to 4 consecutive fluorinated carbons, preferably 3 or fewer consecutive fluorinated carbons.

In some embodiments, it may be desirable to include a subunit having a cross-linkable side chain (for example, —$CH_2CH_2CH_2Si(OCH_3)_3$) as $R_5$. Without wishing to be bound by theory, it is believed that such cross-linking may result in decreased tackiness and/or increased oleophobicity of the treated porous filtration medium. Suitable cross-linkable side chains may preferably be inducibly cross-linked after the polymer has been disposed on an article (including, for example, on a porous filtration medium). A secondary additive may need to be added to induce cross-linking of the cross-linkable groups.

In some embodiments, subunits of Structure VIII constitute at least 0.5 mol-%, at least 1 mol-%, at least 5 mol-%, or at least 10 mol-% of all of the recurring units of the PFPE bottlebrush polymer, based on the total recurring units. In some embodiments, subunits of Structure VIII constitute up to 1 mol-%, up to 5 mol-%, up to 10 mol-%, up to 15 mol-%, up to 20 mol-%, or up to 25 mol-%, up to 30 mol-%, up to 35 mol-%, or up to 40 mol-% of all of the recurring units of the PFPE bottlebrush polymer. For example, in an exemplary embodiment, subunits of Structure VIII constitute 0.5 mol-% to 25 mol-%, from 5 mol-% to 40 mol-%, or from 10 mol-% to 25 mol-% of all of the recurring units of the PFPE bottlebrush polymer. In another exemplary embodiment, subunits of Structure VIII constitute 10 mol-% to 20 mol-% of all of the recurring units of the PFPE bottlebrush polymer.

In the PFPE bottlebrush polymer, the subunits of Structure IV and the subunits of Structure VIII may be present in blocks, may be alternating, or many be random. In an exemplary embodiment, the resulting copolymer may have a structure shown in FIG. 2K.

Short Chain Fluoropolymer

In some embodiments, the composition including a PFPE bottlebrush polymer further includes a short chain fluoropolymer, wherein the short chain fluoropolymer is mixed with the PFPE bottlebrush polymer. The PFPE bottlebrush polymer and the short chain fluoropolymer may be mixed (e.g., dissolved) in a solvent. The mixture may be applied (e.g., coated) onto a substrate (e.g., filter media). The solvent may subsequently be removed. The short chain fluoropolymer may act as a cross-linker and may cross link with the PFPE bottlebrush polymer.

In some embodiments, the molecular weight of the short chain fluoropolymer is at least 10 kg/mol and up to 300 kg/mol.

In some embodiments, the composition includes at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), or at least 80% (w/w) of the short chain fluoropolymer, based on the total weight of the polymers in the composition. In some embodiments, the composition includes up to 20% (w/w), up to 30% (w/w), up to 40% (w/w), up to 50% (w/w), up to 60% (w/w), up to 70% (w/w), up to 80% (w/w), up to 90% (w/w), or up to 95% (w/w) of the short chain fluoropolymer, based on the total weight of the polymers in the composition. In an exemplary embodiment, the composition includes short chain fluoropolymer in a range of 10% (w/w) to 90% (w/w), based on the total weight of the polymers in the composition. In another exemplary embodiment, the composition includes short chain fluoropolymer in a range of 25% (w/w) to 75% (w/w), based on the total weight of the polymers in the composition. In a further exemplary embodiment, the composition includes short chain fluoropolymer in a range of 25% (w/w) to 75% (w/w), based on the total weight of the PFPE bottlebrush polymer and the short chain fluoropolymer in the composition.

In some embodiments, when the short chain fluoropolymer includes poly(2,2,3,3,4,4,4-heptafluorobutyl methacrylate), the composition may preferably include the PFPE bottlebrush polymer in a range of 25% (w/w) to 75% (w/w) and the short chain fluoropolymer in a range of 25% (w/w) to 75% (w/w), based on the total weight of the PFPE bottlebrush polymer and the short chain fluoropolymer in the composition. In some embodiments, when the short chain fluoropolymer includes poly(2,2,3,3,4,4,4-heptafluorobutyl methacrylate), the composition may preferably include the PFPE bottlebrush polymer in a range of 50% (w/w) to 90% (w/w) and the short chain fluoropolymer in a range of 10% (w/w) to 50% (w/w), based on the total weight of the PFPE bottlebrush polymer and the short chain fluoropolymer in the composition.

In some embodiments, the composition includes a short chain fluoropolymer formed from a monomer having the structure (I)

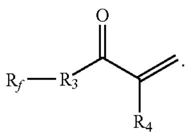

$R_3$ is a carbon-containing linker comprising at least 1 oxygen atom or nitrogen atom and at least 1 and up to 2 carbon atoms. $R_4$ is H or an alkyl comprising at least 1 and up to 4 carbon atoms. $R_f$ is a substituted alkyl comprising at least 1 and up to 4 carbon atoms and at least 1 and up to 9 fluorine atoms. $R_f$ may include 4 or fewer, or 3 or fewer, consecutive fluorinated carbons. In some embodiments $R_f$ includes up to 3 carbon atoms and up to 7 fluorine atoms. Exemplary monomers of Structure I are shown on the right side of FIG. 2B.

In some embodiments, the short chain fluoropolymer may include only the monomers specified in FIG. 2B and, if there are no variations in the R groups, the short chain fluoropolymer will be a homopolymer. In some embodiments, the short chain fluoropolymer may be a copolymer. When the short chain fluoropolymer is a copolymer, it may include only the monomers specified (with variations in the R groups), that is, without other monomers, or it may include one or more additional, other monomers.

Examples of suitable $R_3$ groups in Structure I are $—O—$, $—OCH_2—$, $—OCH_2CH_2—$, $—OC(O)CH_2—$ and $—OC(O)CH_2CH_2—$. Examples of suitable $R_4$ groups in Structure I are $—H$ and $—CH_3$.

In some embodiments, $R_f$ is a perfluoroalkyl. In some embodiments, the perfluoroalkyl includes 4 carbons. In preferred embodiments, the perfluoroalkyl includes 4 or fewer carbons. In some embodiments, the perfluoroalkyl includes 3 carbons. In some embodiment, $R_f$ is polyfluorinated group including at least 1 and up to 3 carbon atoms.

In some embodiments, at least 65%, at least 70%, or at least 80% of the carbons in $R_f$ are fully fluorinated. For example, when $R_f$ includes 6 polyfluorinated carbon atoms, at least 5 are fully fluorinated. In another example, $R_f$ includes 4 polyfluorinated carbon atoms, at least 3 are fully fluorinated. In another example, $R_f$ includes 3 polyfluorinated carbon atoms, at least 2 or all 3 are fully fluorinated.

Exemplary examples of $R_f$ of Structure I are $—F$, $—CF_3$, $—CF_2CF_2CF_3$, $—CF_2CF_2CF_2CF_3$, and $—CH(CF_3)_2$. In preferred embodiments, $R_f$ of Structure I is selected from $—F$, $—CF_3$, $—CF_2CF_2CF_3$, $—CF_2CF_2CF_2CF_3$, and $—CH(CF_3)_2$. In one embodiment, $R_f$ of Structure I is $—CF_2CF_2CF_3$.

In some embodiments, $R_f$ of Structure I may be a branched structure. For example, $R_f$ of Structure I may have the following structure:

(XI)

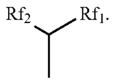

$R_{f1}$ is a substituted alkyl comprising at least 1 and up to 4 carbon atoms and at least 1 and up to 9 fluorine atoms, and $R_{f2}$ is a substituted alkyl comprising at least 1 and up to 4 carbon atoms and at least 1 and up to 9 fluorine atoms. In some embodiments, both $R_{f1}$ and $R_{f2}$ include 4 or fewer, or 3 or fewer, consecutive fluorinated carbons. In some embodiments, $R_f$ includes 3 or fewer consecutive fluorinated carbons. In some embodiments, $R_{f1}$ is a perfluoroalkyl or $R_f$ is a perfluoroalkyl or both $R_{f1}$ and $R_f$ are perfluoroalkyls.

In one exemplary embodiment, the short chain polymer may be derived from polymerization of monomers wherein at least one of the monomers is 2,2,3,3,4,4,4-heptafluorobutyl methacrylate, also referred to herein as "Monomer 1," the structure of which is shown in FIG. 2E.

In some embodiments, the short chain fluoropolymer may be formed from a monomer having any one of the following structures:

(IX)

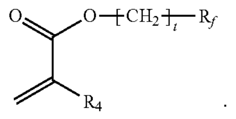

| t | $R_4$ | $R_f$ |
|---|---|---|
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | H | $CF_2CF_2CF_3$ |

However, in preferred embodiments, the short chain fluoropolymer is free of or substantially free of $R_f$ structures containing more than four (e.g., six) consecutive fluorinated carbons.

In some embodiments, the composition further includes a short chain fluoropolymer including a subunit having the structure (III)

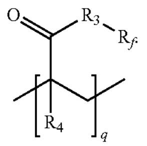

Each $R_3$ is independently a carbon-containing linker comprising at least 1 oxygen atom or nitrogen atom and at least 1 and up to 2 carbon atoms. Each $R_4$ is independently H or an alkyl comprising at least 1 and up to 4 carbon atoms. Each $R_f$ is independently F or a substituted alkyl comprising at least 1 and up to 4 carbon atoms and at least 1 and up to 9 fluorine atoms. In some embodiments, $R_f$ does not include more than four (e.g., six) consecutive fluorinated carbons. In some embodiments, $R_f$ includes 3 or fewer consecutive fluorinated carbons. In some embodiments, q is at least 10, at least 20, at least 30, at least 40, at least 50, or at least 60. In some embodiments, q is up to 200, up to 250, or up to 300.

In some embodiments, the short chain fluoropolymer may include only the subunits specified above and, if there are no variations in the R groups, the short chain fluoropolymer will be a homopolymer. In some embodiments, the short chain fluoropolymer may be a copolymer. When the short chain fluoropolymer is a copolymer, it may include only the subunits specified (with variations in the R groups), that is, without other subunits, or it may include one or more additional, other subunits.

Exemplary examples of $R_3$ of Structure III are —O—, —$OCH_2$—, —$OCH_2CH_2$—, —$OC(O)CH_2$— and —OC(O) $CH_2CH_2$—. Exemplary examples of $R_4$ of Structure III are —H and —$CH_3$.

In some embodiments, $R_f$ is a perfluoroalkyl. In some embodiments, the perfluoroalkyl includes 4 carbons. In preferred embodiments, the perfluoroalkyl includes 3 or fewer carbons. In some embodiments, the perfluoroalkyl includes 3 carbons. In some embodiment, $R_f$ is polyfluorinated group including at least 1 and up to 3 carbon atoms.

In some embodiments, at least 65%, at least 70%, or at least 80% of the carbons in $R_f$ are fully fluorinated. For example, when $R_f$ includes 4 polyfluorinated carbon atoms, at least 3 are fully fluorinated. In another example, $R_f$ includes 3 polyfluorinated carbon atoms, at least 2 or all 3 are fully fluorinated.

Exemplary examples of $R_f$ of Structure I are —F, —$CF_3$, —$CF_2CF_2CF_3$, —$CF_2CF_2CF_2CF_3$, — and —$CH(CF_3)_2$.

In some embodiments, $R_f$ of Structure I may be a branched structure. For example, $R_f$ of Structure I may have the following structure:

(XI)

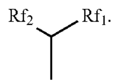

$R_{f1}$ is a substituted alkyl comprising at least 1 and up to 4 carbon atoms and at least 1 and up to 9 fluorine atoms and $R_{f2}$ is a substituted alkyl comprising at least 1 and up to 4 carbon atoms and at least 1 and up to 9 fluorine atoms. In some embodiments, both $R_{f1}$ and $R_{f2}$ include 4 or fewer, or 3 or fewer, consecutive fluorinated carbons. In some embodiments, $R_{f1}$ is a perfluoroalkyl or $R_f$ is a perfluoroalkyl or both $R_{f1}$ and $R_f$ are perfluoroalkyls.

In one exemplary embodiment, the short chain polymer may include poly(2,2,3,3,4,4,4-heptafluorobutyl methacrylate) (also referred to as "Polymer 1"), the structure of which is shown in FIG. 2F. For Polymer 1, q of Structure VI (FIG. 2F) is at least 186 and up to 223. Additional ranges for q may also be envisioned (including, for example, when q is at least 10 and up to 300), but for Polymer 1, as described herein, q is in a range of 186 to 223. When the short chain polymer includes poly(2,2,3,3,4,4,4-heptafluorobutyl methacrylate), the molecular weight of the short chain fluoropolymer may be in a range of 50 kg/mol to 60 kg/mol.

In some embodiments, the short chain fluoropolymer may include a fluoropolymer having any one of the following structures or a combination of such fluoropolymers:

(X)

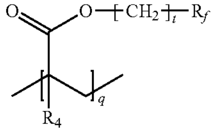

wherein t, $R_4$, and $R_f$ are as in the monomer of Structure (IX) above (t is 1 or 2; $R_4$ H or —$CH_3$; and $R_f$ is —$CF_3$, —$CF_2CF_3$, —$CF_2CF_2CF_3$, —$(CF_2)_3CF_3$, q is at least 10, at least 20, at least 30, at least 40, at least 50, or at least 60.

However, in preferred embodiments, the short chain fluoropolymer is free of or substantially free of $R_f$ structures containing more than four (e.g., six) consecutive fluorinated carbons.

Fluoropolymer-Containing Article

The compositions described herein may be disposed on (e.g., coated onto) an article (including a portion of the article) to form a fluoropolymer-containing article. For example, in some embodiments, the compositions may be disposed on (e.g., coated onto) a surface of an article, including, for example, a major surface of an article.

In some embodiments, the article may include a porous filtration medium, a medical device, an electronic touch display, a lens of an optical sensor (including, for example, for an autonomous vehicle), or any other article that includes a surface expected to come into contact with an oil and/or gasoline. In some embodiments, the article may preferably include a porous filtration medium.

When the article includes a porous filtration medium, any suitable porous filtration medium may be used as a part of the fluoropolymer-containing article or to form the fluoropolymer-containing article.

In some embodiments, the porous filtration medium may include expanded polytetrafluoroethylene (ePTFE), cellulose, cellulose acetate, polyurethane, polypropylene, polyethylene, polyether sulfone, polyvinylidene fluoride, polycarbonate, polyolefin, polyamide (nylon), polyester, polysulfone, polyether, acrylic polymers, methacrylic polymers, polystyrene, cellulosic polymer (e.g., cellulose acetate), or glass, or a combination thereof (for example, blends, mixtures, laminates, or copolymers thereof). In some embodiments, the porous filtration medium may preferably include expanded polytetrafluoroethylene (ePTFE).

In some embodiments, the porous filtration medium may include a membrane, a nonwoven web, a woven web, a porous sheet, a sintered plastic, a sintered metal, a screen (including for example, a woven screen, an expanded screen, an extruded screen, etc.), or a high density mesh, or a combination thereof. In some embodiments, the porous filtration medium may preferably include a membrane.

In some embodiments, the porous filtration medium may include synthetic fibers, naturally occurring fibers, or combinations thereof (for example, blends or mixtures thereof). The substrate is typically of a porous nature and of a specified and definable performance characteristic such as pore size, Frazier air permeability, and/or another suitable metric.

In some embodiments, the porous filtration medium may include a thermoplastic or a thermosetting polymer fiber. The polymers of the fiber may be present in a single polymeric material system, in a bicomponent fiber, or in a combination thereof. A bicomponent fiber may include, for example, a thermoplastic polymer. In some embodiments, a bicomponent fiber may have a core-sheath structure, including a concentric or a non-concentric structure. In some embodiments, the sheath of the bicomponent fiber may have a melting temperature lower than the melting temperature of the core such that, when heated, the sheath binds to the other fibers in the layer while the core maintains structural integrity. Additional exemplary embodiments of bicomponent fibers include side-by-side fibers or island-in-the-sea fibers.

In some embodiments, the porous filtration medium may include a cellulosic fiber including, for example, a softwood fiber (such as mercerized southern pine), a hardwood fiber (such as Eucalyptus fibers), a regenerated cellulose fiber, a mechanical pulp fiber, or a combination thereof (for example, a mixture or blend thereof).

In some embodiments, the porous filtration medium may include a glass fiber including, for example, a microglass, a chopped glass fiber, or a combination thereof (for example, a mixture or blend thereof).

In some embodiments, prior to treatment, a porous filtration medium including ePTFE may exhibit a permeability in a range of 0.1 cubic feet per minute (CFM) (0.17 $m^3$/h) at 0.5 inches $H_2O$ (120 Pa) to 0.2 CFM (0.34 $m^3$/h) at 0.5 inches $H_2O$ (120 Pa); a thickness in a range of 8 mils to 11 mils (0.20 mm to 0.28 mm); and an average mean flow pore size in a range of 0.1 μm to 0.3 μm. In some embodiments, prior to treatment, a porous filtration medium including ePTFE may exhibit a permeability in a range of 2 CFM (3.4 $m^3$/h) at 0.5 inches $H_2O$ (120 Pa) to 3 CFM (5.1 $m^3$/h) at 0.5 inches $H_2O$ (120 Pa); a thickness in a range of 7 mils to 15 mils (0.18 mm to 0.38 mm); and an average mean flow pore size in a range of 0.7 μm to 2 μm. In some embodiments, prior to treatment, a porous filtration medium including ePTFE may exhibit a permeability in a range of 0.1 cubic feet per minute (CFM) (0.17 $m^3$/h) at 0.5 inches $H_2O$ (120 Pa) to 0.4 CFM (0.68 $m^3$/h) at 0.5 inches $H_2O$ (120 Pa); a thickness in a range of 9 mils to 14 mils (0.23 mm to 0.36 mm); and an average mean flow pore size in a range of 0.5 μm to 0.9 μm.

Methods of Making the Fluoropolymer-Containing Articles

A composition including a fluoropolymer (including, for example, a combination of fluoropolymers as described herein) may be disposed on an article to form a fluoropolymer-containing article. In some embodiments, the composition is preferably disposed on a surface of the article including, for example, a major surface of the article. The composition may be coated on one major surface or on both major surfaces of the article.

When the article includes a porous filtration medium, the composition may be disposed on the porous filtration medium to form a treated porous filtration medium. The treated porous filtration medium may form the fluoropolymer-containing article or a portion of the fluoropolymer-containing article. For example, the composition may be disposed on a first major surface of the porous filtration medium or a second major surface of the porous filtration medium or both.

In some embodiments, in addition to the treated porous filtration medium, the fluoropolymer-containing article may further include a support layer. The support layer may be added before or after the treatment of the porous filtration medium to form the treated porous filtration medium. Any suitable material may be used for the support layer, depending on the intended use of the article. In an exemplary embodiment, however, the support layer may include a polymer material such as polypropylene, polyethylene, polyester, or nylon, or a combination thereof (for example, a mixture or blend thereof).

In some embodiments, when a first major surface of the support layer is in contact with a first major surface of the porous filtration medium, the support layer may be added before treatment of the porous filtration medium with the fluoropolymer so that the fluoropolymer is coated on a second major surface of the support layer and a second major surface of the porous filtration medium.

In some embodiments, when the fluoropolymer is disposed on the porous filtration medium, the porous filtration medium may be formed by contacting the porous filtration medium with a mixture including the fluoropolymer and a liquid (e.g., a solvent), depositing the fluoropolymer-liquid mixture onto the porous filtration medium, and removing the liquid. In some embodiments, the liquid in the fluoropolymer-liquid solution includes or is a solvent, that is, a liquid in which at least some of the fluoropolymer is dissolved. Preferably, the liquid in the fluoropolymer-liquid solution is a solvent in which all or substantially all of the fluoropolymer is dissolved. Additionally or alternatively, however, the fluoropolymer may be applied to the porous filtration medium in the form of an emulsion. For example, the fluoropolymer may be applied to the porous filtration medium via water-fluoropolymer emulsion.

The solution (or emulsion) containing the fluoropolymer is applied onto the article and the liquid (e.g., solvent) is removed. After removal of the liquid, the fluoropolymer remains disposed on at least one major surface of the porous filtration medium. For example, as described in an exemplary embodiment in the Examples, the fluoropolymer may be coated on a porous filtration medium by roll coating or dipping the porous filtration medium in a mixture including the fluoropolymer and a solvent and then removing the solvent from the porous filtration medium.

When the liquid includes a solvent, any suitable solvent may be used. In some embodiments, the fluoropolymer may be completely dissolved in the solvent when the fluoropolymer is applied to the porous filtration medium. Without wishing to be bound by theory, it is believed that a solution in which the fluoropolymer is completely dissolved in the solvent may be preferred, particularly when the porous filtration medium has small pore sizes (for example, less than 0.1 μm); however, a solution or an emulsion may be used when the porous filtration medium has larger pore sizes (for example, greater than 0.1 μm).

In some embodiments, the solvent may include an organic solvent. Alternatively, the solvent may include an inorganic solvent such as supercritical carbon dioxide ($SCCO_2$).

Exemplary organic solvents include methyl ethyl ketone (MEK) and fluorosolvents including, for example, a fluorinated heptane and a fluorinated ether. Exemplary fluorinated ethers include ethoxy nonafluorobutane, ethoxy nonafluoroisobutane, methoxy nonafluorobutane (also referred to as methyl nonafluorobutyl ether), and methoxy nonafluoroisobutane (also referred to as methyl nonafluoroisobutyl ether). Combinations of organic solvents and/or fluorinated ethers may also be used. In some embodiments, the fluorinated ether may include a NOVEC Engineering Fluid (available from 3M Company, St. Paul, MN) such as NOVEC 7100 (which includes methyl nonafluoroisobutyl ether and methyl nonafluorobutyl ether) or NOVEC 7200 (which includes two inseparable isomers of ethoxy-nonafluorobutane).

In some embodiments, the solvent may preferably be or include a fluorosolvent.

The amount of fluoropolymer included in the fluoropolymer-liquid mixture at the time of coating may be selected depending on the desired oleophobicity. In some embodiments, the amount of fluoropolymer in the mixture may be up to 8% weight of polymer (in grams) per volume of solvent (mL) (w/v), up to 7% (w/v), up to 6% (w/v), up to 5% (w/v), up to 4% (w/v), up to 3% (w/v), up to 2% (w/v), or up to 1% (w/v). In some embodiments, the amount of fluoropolymer in the mixture may be at least 1% weight of polymer (in grams) per volume of solvent (mL) (w/v), at least 2% (w/v), at least 3% (w/v), at least 4% (w/v), at least 5% (w/v), at least 6% (w/v), or at least 7% (w/v).

In some embodiments, contacting the porous filtration medium with the fluoropolymer-liquid mixture includes immersing the porous filtration medium in the fluoropolymer-liquid mixture. In an exemplary embodiment, immersing the porous filtration medium in the fluoropolymer-liquid mixture includes passing the porous filtration medium through the fluoropolymer-liquid mixture so that the media enter and exits the fluoropolymer-liquid mixture at approximately the same angle.

In some embodiments, the liquid of the fluoropolymer-liquid mixture may be removed from the porous filtration medium by drying at an ambient temperature (for example, at a temperature in a range of 20° C. to 25° C.) or at an elevated temperature, for a time sufficient to remove the liquid (for example, a solvent).

In some embodiments, applying fluoropolymer to the porous filtration medium to form a treated porous filtration medium may further include heat treating the treated porous filtration medium. Such heating may remove the liquid from the fluoropolymer-liquid mixture after the fluoropolymer is deposited on the porous filtration medium. Moreover, without wishing to be bound by theory, it is believed that such heat treatment or "curing" may also increase the oleophobicity of the treated porous filtration medium by facilitating orientation of the fluoropolymer. Further without wishing to be bound by theory, it is believed that such heat treatment or "curing" may facilitate cross-linking of the fluoropolymer.

For example, as shown in Example 54, a polymer including a monomer having a cross-linkable side chain (for example, $-CH_2CH_2CH_2Si(OCH_3)_3$) may, upon heat treatment cross-link. Without wishing to be bound by theory, it is believed that such cross-linking may result in decreased tackiness and/or increased oleophobicity of the treated porous filtration medium, and increased stability of the polymer coating. Suitable cross-linkable side chains may preferably be inducibly cross-linked after the polymer has been disposed on an article (including, for example, on a porous filtration medium). Cross-linking may be induced by the heat treatment.

The porous filtration medium may be heated by any suitable means. In an exemplary embodiment, the porous filtration medium is heated in an oven. In another exemplary embodiment, the porous filtration medium may be heated using a hot roller, steam, an infrared heater, etc.

In some embodiments, including when the porous filtration medium is heated in an oven, the porous filtration medium may be heated at a temperature greater than the glass transition temperature of the fluoropolymer. In some embodiments, the porous filtration medium is heated at a temperature of at least 70° C., at least 80° C., at least 90° C., at least 100° C., at least 110° C., or at least 120° C. In some embodiments, the porous filtration medium is heated at a temperature of up to 130° C., up to 140° C., or up to 150° C. For example, in an exemplary embodiment, the porous filtration medium may be heated at a temperature in a range of 110° C. to 130° C. In another example, the porous filtration medium may be heated at a temperature in a range of 80° C. to 100° C. In the Examples, the porous filtration medium is heated at a temperature of 90° C.

In some embodiments, including when the porous filtration medium is heated using a hot roller, steam, an infrared heater, the porous filtration medium may be heated to a temperature greater than the glass transition temperature of the fluoropolymer. In some embodiments, the porous filtration medium is heated at a temperature to at least 70° C., at least 80° C., at least 90° C., at least 100° C., at least 110° C., or at least 120° C. In some embodiments, the porous filtration medium is heated to a temperature of up to 130° C., up to 140° C., or up to 150° C. For example, in an exemplary embodiment, the porous filtration medium may be heated to a temperature in a range of 70° C. to 110° C.

In some embodiments, the porous filtration medium may be heated for at least 1 minute, at least 2 minutes, or at least 3 minutes. In some embodiments, the porous filtration medium may be heated for up to 3 minutes, up to 4 minutes, up to 5 minutes, or up to 10 minutes. For example, in in an exemplary embodiment, the porous filtration medium may be heated for at least 1 minute and up to 10 minutes. In the Examples, the porous filtration medium is heated for 5 minutes.

In some embodiments, the porous filtration medium may be located in a frame during drying or heating or both. The use of a frame may prevent curling of the porous filtration medium.

Treated Porous Filtration Medium

In some embodiments, as described above, fluoropolymer (including, for example, a combination of fluoropolymers as described herein) may be disposed on a porous filtration medium to form a treated porous filtration medium.

After fluoropolymer has been disposed on the porous filtration medium to form the treated porous filtration medium, the treated porous filtration medium may preferably exhibit an oleophobicity of at least 5 or at least 6 on at least one major surface of the porous filtration medium, as determined by AATCC test method 118 (AATCC TM118-2013e2), wherein the ratings are rounded to the nearest integer value. In some embodiments, the treated porous filtration medium may exhibit an oleophobicity of up to 7 or up to 8 on at least one major surface of the porous filtration medium. In exemplary embodiments, the treated porous filtration medium exhibits an oleophobicity in a range of 5 to 8, in a range of 6 to 7, in a range of 6 to 8, or in a range of 7 to 8.

In some embodiments, the treated porous filtration medium exhibits the same oleophobicity rating on two major surfaces of the porous filtration medium. For example, the treated porous filtration medium may exhibit an oleophobicity in a range of 5 to 8, in a range of 6 to 7, in a range of 6 to 8, or in a range of 7 to 8 on two major surfaces of the porous filtration medium (for example, on a front side and a backside of the porous filtration medium).

In some embodiments, two major surfaces of the fluoropolymer-containing article may exhibit an oleophobicity in a range of 5 to 8, in a range of 6 to 7, or in a range of 6 to 8. For example, when a first major surface of a support layer is in contact with a first major surface of the porous filtration medium, a second major surface of the porous filtration medium and a second major surface of the porous filtration medium may exhibit an oleophobicity in a range of 5 to 8, in a range of 5 to 7, in a range of 6 to 8, in a range of 6 to 7, or in a range of 7 to 8.

That a fluoropolymer-containing article having an oleophobicity of at least 7 can be obtained using a mixture of poly(2,2,3,3,4,4,4-heptafluorobutyl methacrylate) ("Polymer 1") and poly(perfluoropolyether$_{1000}$ methacrylate) ("Polymer 2"), as shown in the Examples, was surprising. When coated with Polymer 1 alone, an article exhibits at most an oleophobicity of 6. In contrast, when a composition including a mixture of Polymer 1 and Polymer 2 is used and includes up to 70% (w/w) of Polymer 1, the coating, at sufficient concentrations, exhibits an oleophobicity of at least 7. Without wishing to be bound by theory, it is believed that the introduction of Polymer 1 offsets any detrimental effects of a low modulus observed with Polymer 2 alone due to the much higher glass transition temperature of Polymer 1.

While an article coated with Polymer 2 alone can exhibit good oleophobicity and good permeability, in some cases a coating with a higher glass transition temperature is desired for reduced tackiness. Polymer 2 alone may exhibit a relatively low glass transition temperature ($T_g$ is −54° C.). Cross linking of Polymer 2 using cross-linkers as a comonomer can help with the properties of the resulting coating. For example, cross linking may reduce surface tackiness, increase oleophobicity, and improve stability.

When a mixture of Polymer 1 and Polymer 2 is used and includes at least 30% (w/w) of Polymer 1, the coating does not exhibit tackiness and, at sufficient concentrations, exhibits an oleophobicity of at least 7. Moreover, as described in Example 52A-Example 52B, although a surface coated with a mixture of Polymer 1 and Polymer 2 exhibits higher surface energy than a mixture coated with Polymer 2 alone, surprisingly, the mixture of Polymer 1 and Polymer 2 exhibits better oleophobicity than Polymer 2 alone.

Further, inclusion of Polymer 1 in the composition may provide a cost advantage because Polymer 1 is cheaper to produce than Polymer 2.

As further described in the Examples, for different types of media, different proportions of polymers (for example, Polymer 1 and Polymer 2) may be used to yield ePTFE coatings with oleo 7 performance, limited or no tackiness, and a permeability in a preferred range for a particular use.

As further described in the Examples, certain porous filtration medium may advantageously be treated with specific combinations of polymers to achieve the desired oleophobicity.

In some embodiments, the treated porous filtration medium including ePTFE may exhibit a permeability in a range of 0.1 cubic feet per minute (CFM) (0.17 $m^3/h$) at 0.5 inches $H_2O$ (120 Pa) to 0.2 CFM (0.34 $m^3/h$) at 0.5 inches $H_2O$ (120 Pa); a thickness in a range of 8 mils to 11 mils (0.20 mm to 0.28 mm). The treated porous filtration medium may have an average mean flow pore size in a range of 0.1 μm to 3 μm, from 0.2 μm to 2 μm, or from 0.1 μm to 0.3 μm. In some embodiments, such a treated porous filtration medium may have been formed by disposing a composition on the surface of the article wherein the composition included at least 25% (w/w) and up to 75% (w/w) of PFPE bottlebrush polymer, and at least 25% (w/w) and up to 75% (w/w) of a short chain fluoropolymer comprising poly(2,2,3,3,4,4,4-heptafluorobutyl methacrylate), wherein the weight percent is based on the total weight of the polymers in the composition. As shown in Example 51, the ratios of the polymers in the composition disposed on a media are reflected in the treated porous filtration medium, as tested using pyrolysis. In some embodiments, such a treated porous filtration medium may have been formed by disposing a composition having a concentration of at least 3% weight of the polymer (in grams) per volume of solvent (mL) (w/v) and/or up to 6% (w/v) polymer. In some embodiments, such a treated porous filtration media exhibits an oleophobicity of at least 7 on at least one major surface, as determined by AATCC test method 118 (AATCC TM118-2013e2), wherein the ratings are rounded to the nearest integer value. In some embodiments, such a treated porous filtration media exhibits an oleophobicity of at least 7 on both major surfaces, as determined by AATCC test method 118 (AATCC TM118-2013e2), wherein the ratings are rounded to the nearest integer value.

In some embodiments, the treated porous filtration medium including ePTFE may exhibit a permeability in a range of 1.4 CFM (2.4 $m^3/h$) at 0.5 inches $H_2O$ (120 Pa) to 3.5 CFM (6.0 $m^3/h$) at 0.5 inches $H_2O$ (120 Pa); a thickness in a range of 7 mils to 15 mils (0.18 mm to 0.38 mm); and an average mean flow pore size in a range of 1 μm to 1.5 μm. In some embodiments, such a treated porous filtration medium may have been formed by disposing a composition on the surface of the article wherein the composition included at least 25% (w/w) and up to 75% (w/w) of PFPE bottlebrush polymer, and at least 25% (w/w) and up to 75% (w/w) of a short chain fluoropolymer comprising poly(2,2,3,3,4,4,4-heptafluorobutyl methacrylate), wherein the weight percent is based on the total weight of the polymers in the composition. As shown in Example 51, the ratios of the polymers in the composition disposed on a media are reflected in the treated porous filtration medium, as tested using pyrolysis. In some embodiments, such a treated porous filtration medium may have been formed by disposing a composition having a concentration of at least 4% weight of the polymer (in grams) per volume of solvent (mL) (w/v) and/or up to 6% (w/v). In some embodiments, such a treated porous filtration media exhibits an oleophobicity of at least 7 on at least one major surface, as determined by AATCC test method 118 (AATCC TM118-2013e2), wherein the ratings are rounded to the nearest integer value. In some embodiments, such a treated porous filtration media exhibits an oleophobicity of at least 6 on both major surfaces, as determined by AATCC test method 118 (AATCC TM118-2013e2), wherein the ratings are rounded to the nearest integer value.

In some embodiments, the treated porous filtration medium including ePTFE may exhibit a permeability in a range of 0.1 CFM (CFM) (0.17 $m^3/h$) at 0.5 inches $H_2O$ (120 Pa) to 0.4 CFM (0.68 $m^3/h$) at 0.5 inches $H_2O$ (120 Pa); a thickness in a range of 9 mils to 14 mils; and an average mean flow pore size in a range of 0.5 μm to 2 μm. In some embodiments, such a treated porous filtration medium may have been formed by disposing a composition on the surface of the article wherein the composition included at least 10% (w/w) and up to 50% (w/w) of PFPE bottlebrush polymer, and at least 50% (w/w) and up to 90% (w/w) of a short chain fluoropolymer comprising poly(2,2,3,3,4,4,4-heptafluorobutyl methacrylate), wherein the weight percent is based on the total weight of the polymers in the composition. As shown in Example 51, the ratios of the polymers in the composition disposed on a media are reflected in the treated porous filtration medium, as tested using pyrolysis. In some embodiments, such a treated porous filtration medium may have been formed by disposing a composition having a concentration of at least 2% weight of the polymer (in grams) per volume of solvent (mL) (w/v) and/or up to 6% (w/v) polymer. In some embodiments, such a treated porous filtration media exhibits an oleophobicity of at least 7 on at least one major surface, as determined by AATCC test method 118 (AATCC TM118-2013e2), wherein the ratings are rounded to the nearest integer value. In some embodiments, such a treated porous filtration media exhibits an oleophobicity of at least 7 on both major surfaces, as determined by AATCC test method 118 (AATCC TM118-2013e2), wherein the ratings are rounded to the nearest integer value.

Methods of Using the Fluoropolymer-Containing Articles

The fluoropolymer-containing articles described herein may be used for any suitable application.

In some exemplary embodiments, the fluoropolymer-containing articles may be used as a biphasic separator. The two phases to be separated may be selected depending on the intended use of the article. For example, the articles may be used as an air/oil separator for air compressors, as a water/fuel separator, or as a water/oil separator. In some embodiments, the separator may be a coalescer.

In additional exemplary embodiments, the fluoropolymer-containing articles may be used as a filter for a vent. In an automotive or industrial context, the filter may be exposed to fuel; the resistance to oils and/or gasoline may be especially advantageous in such an environment.

The invention is defined in the claims. However, below there is provided a non-exhaustive listing of non-limiting exemplary aspects. Any one or more of the features of these aspects may be combined with any one or more features of another example, embodiment, or aspect described herein.

EXEMPLARY ASPECTS

Exemplary Coating Composition Aspects

A1. A composition comprising a perfluoropolyether (PFPE) bottlebrush polymer, wherein the PFPE bottlebrush polymer comprises a subunit having the structure:

(IV)

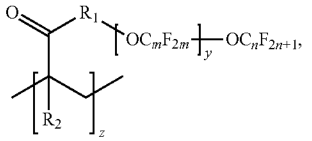

wherein each $R_1$ is independently a bond or an alkylene comprising at least 1 and up to 4 oxygen atoms, at least 1 and up to 5 carbon atoms, and, optionally up to 2 nitrogen atoms, up to 4 fluorine atoms, and up to 1 sulfur atom; wherein each $R_2$ is independently H or an alkyl comprising at least 1 and up to 4 carbon atoms; wherein m=1-3; wherein n=1-4 or n=1-3; wherein y=0-30; and wherein z=10-80 or 10-60, wherein the PFPE bottlebrush polymer comprises at least 90% (w/w) subunits of Structure IV, based on the total weight of the PFPE bottlebrush polymer.

A2. The composition of Aspect A1, wherein the PFPE bottlebrush polymer comprises a block copolymer.

A3. The composition of Aspect A1, wherein the PFPE bottlebrush polymer comprises an alternating copolymer.

A4. The composition of any one of Aspects A1 to A3, wherein each $R_1$ is a bond or a carbon-containing linker comprising at least 1 and up to 4 oxygen atoms, at least 1 and up to 5 carbon atoms, and, optionally up to 2 nitrogen atoms, up to 4 fluorine atoms, and up to 1 sulfur atom; and wherein each $R_2$ is H or an alkyl comprising at least 1 and up to 4 carbon atoms.

A5. The composition of any one of Aspects A1 to A4, wherein each $R_1$ is $—OCH_2CH_2OC(O)CF(CF_3)—$; each $R_2$ is $—CH_3$; m=3; n=3; y is at least 3 and up to 4; and z is at least 10 and up to 80 or up to 60.

A6. The composition of Aspect A5, wherein z is at least 19 and up to 26.

A7. The composition of any one of Aspects A1 to A6, wherein the PFPE bottlebrush polymer has a number average molecular weight ($M_n$) of at least 19 kg/mol and up to 26 kg/mol.

A8. The composition of any one of Aspects A1 to A7, wherein the PFPE bottlebrush polymer comprises at least 95 mol-%, at least 98 mol-%, or at least 99 mol-% subunits of Structure IV, based on 100 mol-% of the total of all the recurring units of the PFPE bottlebrush polymer.

A9. The composition of any one of Aspects A1 to A8, wherein the PFPE bottlebrush polymer comprises 100 mol-% subunits of Structure IV, based on 100 mol-% of the total of all the recurring units of the PFPE bottlebrush polymer.

A10. The composition of any one of Aspects A1 to A9, wherein the PFPE-bottlebrush polymer further comprises a subunit having the structure:

(VIII)

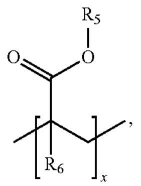

wherein each $R_5$ is independently a carbon-containing linker, optionally comprising up to 13 fluorine atoms, up to 1 silicon atom, up to 3 oxygen atoms, and up to 2 nitrogen atoms; wherein each $R_6$ is independently H or an alkyl comprising at least 1 and up to 4 carbon atoms; wherein x=1-6.

A11. The composition of Aspect A10, wherein each $R_5$ is independently a carbon-containing linker comprising at least 1 and up to 8 carbon atoms.

A12. The composition of Aspect A9 or A10, wherein each $R_5$ is independently $—CH_2CH_2CH_2Si(OCH_3)_3$, $—CH_3$, or $—CH_2CH_2OH$.

A13. The composition of any one of Aspects A10 to A12, wherein the PFPE bottlebrush polymer comprises at least 0.5 mol-%, at least 1 mol-%, at least 5 mol-%, or at least 10 mol-% subunits of Structure VIII, based on 100 mol-% of the total of all the recurring units of the PFPE bottlebrush polymer. 4.

A14. The composition of any one of Aspects A10 to A13, wherein the PFPE bottlebrush polymer comprises up to 1 mol-%, up to 5 mol-%, up to 10 mol-%, up to 20 mol-%, up to 25 mol-%, up to 30 mol-%, or up to 40 mol % of subunits of Structure VIII, based on 100 mol-% of the total of all the recurring units of the PFPE bottlebrush polymer.

A15. The composition of any one of Aspects A1 to A14, wherein each $R_1$ is a bond or a carbon-containing linker comprising at least 1 and up to 4 oxygen atoms, at least 1 and up to 5 carbon atoms, and optionally up to 2 nitrogen atoms, up to 4 fluorine atoms, and up to 1 sulfur atom; and wherein each $R_2$ is H or an alkyl comprising at least 1 and up to 4 carbon atoms.

A16. The composition of any one of Aspects A1 to A15, wherein the composition comprises at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), at least 80% (w/w), at least 90% (w/w), or at least 95% (w/w) of the PFPE bottlebrush polymer, based on the total weight of the polymers in the composition.

A17. The composition of any one of Aspects A1 to A16, wherein the composition comprises up to 10% (w/w), up to 15% (w/w), up to 20% (w/w), up to 30% (w/w), up to 40% (w/w), up to 50% (w/w), up to 60% (w/w), up to 70% (w/w), up to 80% (w/w), up to 90% (w/w), up to 95% (w/w), or up to 100% (w/w) of the PFPE bottlebrush polymer, based on the total weight of the polymers in the composition.

A18. The composition of any one of Aspects A1 to A17, wherein the composition further comprises a short chain fluoropolymer comprising a subunit having the structure:

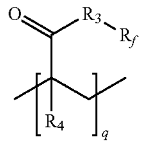

(III)

wherein each $R_3$ is independently a carbon-containing linker comprising at least 1 oxygen atom or nitrogen atom and at least 1 and up to 2 carbon atoms; wherein each $R_4$ is independently H or an alkyl comprising at least 1 and up to 4 carbon atoms; wherein each $R_f$ is independently F or a substituted alkyl comprising at least 1 and up to 4 carbon atoms and at least 1 and up to 9 fluorine atoms; and wherein q is at least 10, at least 20, at least 30, at least 40, at least 50, or at least 60.

A19. The composition of Aspect A18, wherein q is up to 200, up to 250, or up to 300.

A20. The composition of any one of Aspects A18 or A19, wherein $R_f$ is a perfluoroalkyl.

A21. The composition of Aspect A20, wherein the perfluoroalkyl comprises 4 carbons.

A22. The composition of Aspect A20 or A21, wherein the perfluoroalkyl has 3 carbons.

A23. The composition of any one of Aspects A18 to A22, wherein each $R_3$ is independently —O—, —$CH_2O$—, or —$CH_2CH_2O$—.

A24. The composition of any one of Aspects A18 to A23, wherein $R_4$ is —$CH_3$.

A25. The composition of Aspect A18 or A19, wherein each $R_f$ is independently —F or —$CH(CF_3)_2$.

A26. The composition of any one of Aspects A18 to A21, wherein the short chain fluoropolymer comprises a fluoropolymer having any one of the following structures or a combination of such fluoropolymers:

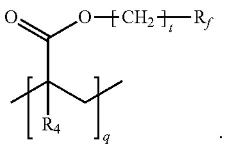

(X)

| t | $R_4$ | $R_f$ |
|---|---|---|
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | H | $CF_2CF_2CF_3$, |

wherein q is at least 10, at least 20, at least 30, at least 40, at least 50, or at least 60.

A27. The composition of any one of Aspects A18 to A21, wherein each $R_3$ is a carbon-containing linker comprising at least 1 oxygen atom or nitrogen atom and at least 1 and up to 2 carbon atoms; wherein each $R_4$ is H or an alkyl comprising at least 1 and up to 4 carbon atoms; and wherein each $R_f$ is a substituted alkyl comprising at least 1 and up to 4 carbon atoms and at least 1 and up to 9 fluorine atoms.

A28. The composition of any one of Aspects A18 to A21, wherein $R_4$ is H or $CH_3$, $R_3$ is —$OC(O)CH_2$— or —$OC(O)CH_2CH_2$—, and $R_f$ is a perfluoroalkyl comprising at least 1 and up to 4 carbons.

A29. The composition of any one of Aspects A18 to A24 or A27 to A28, wherein $R_f$ comprises a branched structure.

A30. The composition of Aspect A29, wherein $R_f$ has the structure:

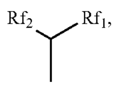

(XI)

wherein $R_{f1}$ is a substituted alkyl comprising at least 1 and up to 4 carbon atoms and at least 1 and up to 9 fluorine atoms and $R_{f2}$ is a substituted alkyl comprising at least 1 and up to 4 carbon atoms and at least 1 and up to 9 fluorine atoms.

A31. The composition of Aspect A30, wherein $R_{f1}$ is a perfluoroalkyl or $R_f$ is a perfluoroalkyl or both $R_{f1}$ and $R_f$ are perfluoroalkyls.

A32. The composition of any one of Aspects A18 to A21, wherein the short chain fluoropolymer has the following structure:

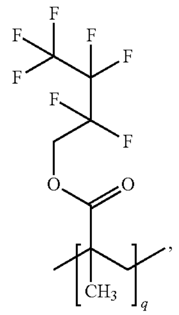

(VI)

wherein q is at least 10 and up to 300.

A33. The composition of Aspect A32, wherein q is at least 186 and up to 223.

A34. The composition of any one of Aspects A18 to A33, wherein the composition comprises at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), or at least 80% (w/w) of the short chain fluoropolymer, based on the total weight of the polymers in the composition.

A35. The composition of any one of Aspects A18 to A34, wherein the composition comprises up to 20% (w/w), up to 30% (w/w), up to 40% (w/w), up to 50% (w/w), up to 60% (w/w), up to 70% (w/w), up to 80% (w/w), up to 90% (w/w), or up to 95% (w/w) of the short chain fluoropolymer, based on the total weight of the polymers in the composition.

A36. The composition of any one of Aspects A18 to A35, wherein the composition comprises short chain fluoropolymer in a range of 10% (w/w) to 90% (w/w), based on the total weight of the polymers in the composition.

A37. The composition of any one of Aspects A18 to A36, wherein the composition comprises short chain fluoropolymer in a range of 25% (w/w) to 75% (w/w), based on the total weight of the polymers in the composition.

A38. The composition of any one of Aspects A18 to A36, wherein the composition comprises short chain fluoropolymer in a range of 25% (w/w) to 75% (w/w), based on the total weight of the PFPE bottlebrush polymer and the short chain fluoropolymer in the composition.

A39. The composition of any one of Aspects A18 to A38, wherein the short chain fluoropolymer comprises poly(2,2-3,3-4,4,4-heptafluorobutyl methacrylate) or poly(2,2-3,3-4-4-4-heptafluorobutyl acrylate), and wherein the short chain fluoropolymer has a number average molecular weight ($M_n$) in a range of 50 kg/mol to 60 kg/mol.

A40. The composition of any one of Aspects A1 to A39, wherein the composition comprises at least 25% (w/w) and up to 75% (w/w) of PFPE bottlebrush polymer, and at least 25% (w/w) and up to 75% (w/w) of a short chain fluoropolymer comprising poly(2,2,3,3,4,4,4-heptafluorobutyl methacrylate), wherein the weight percent is based on the total weight of the polymers in the composition.

A41. The composition of any one of Aspects A1 to A39, wherein the composition comprises at least 50% (w/w) and up to 90% (w/w) of the PFPE bottlebrush polymer, and at least 10% (w/w) and up to 50% (w/w) of a short chain fluoropolymer comprising poly(2,2,3,3,4,4,4-heptafluorobutyl methacrylate), wherein the weight percent is based on the total weight of the polymers in the composition.

A42. The composition of any one of Aspects A1 to A41, wherein the composition comprises an organic solvent.

A43. The composition of Aspect A42, wherein the organic solvent comprises methyl ethyl ketone (MEK) or a fluorosolvent.

A44. The composition of Aspect A43, wherein the fluorosolvent comprises a fluorinated ether.

A45. The composition of any one of Aspects A1 to A44, wherein the concentration of the total polymer in a solvent is at least 1% weight of the polymer (in grams) per volume of solvent (mL) (w/v), at least 2% (w/v), at least 3% (w/v), at least 4% (w/v), at least 5% (w/v), at least 6% (w/v), or at least 7% (w/v).

A46. The composition of any one of Aspects A1 to A45, wherein the concentration of the total polymer in a solvent is up to 1% weight of the polymer (in grams) per volume of solvent (mL) (w/v), up to 2% (w/v), up to 3% (w/v), up to 4% (w/v), up to 5% (w/v), up to 6% (w/v), up to 7% (w/v), or up to 8% (w/v).

A47. The composition of any one of Aspects A1 to A46, wherein the PFPE bottlebrush polymer is free of subunits where n is 4 or greater.

Exemplary Product-by-Monomer Coating Composition Aspects

B1. A composition comprising a perfluoropolyether (PFPE) bottlebrush polymer, wherein the PFPE bottlebrush polymer is derived from polymerization of one or more monomers, the monomers comprising a monomer having the structure:

(II)

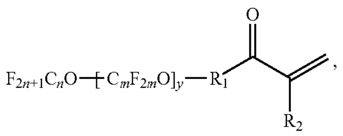

wherein $R_1$ is a bond or a carbon-containing linker comprising at least 1 and up to 4 oxygen atoms, at least 1 and up to 5 carbon atoms, and, optionally up to 2 nitrogen atoms, up to 4 fluorine atoms, and up to 1 sulfur atom; wherein $R_2$ is H or an alkyl comprising at least 1 and up to 4 carbon atoms; wherein m=1-3; wherein n=1-4; wherein y=0-30; and wherein the PFPE bottlebrush polymer comprises at least 90% (w/w) monomers of Structure II, based on the weight of all monomers in the PFPE bottlebrush polymer.

B2. The composition of Aspect B1, wherein the PFPE bottlebrush polymer comprises a block copolymer.

B3. The composition of Aspect B1, wherein the PFPE bottlebrush polymer comprises an alternating copolymer.

B4. The composition of any one of Aspects B1 to B3, wherein $R_1$ is $—OCH_2CH_2OC(O)CF(CF_3)—$; $R_2$ is $—CH_3$; m=3; n=3; and y is at least 3 and up to 4.

B5. The composition of any one of Aspects B1 to B4, wherein the PFPE bottlebrush polymer has a number average molecular weight ($M_n$) of at least 19 kg/mol and up to 26 kg/mol.

B6. The composition of any one of Aspects B1 to B5, wherein the PFPE bottlebrush polymer comprises at least 95% (w/w), at least 98% (w/w), or at least 99% (w/w) monomers of Structure II.

B7. The composition of any one of Aspects B1 to B6, wherein the PFPE bottlebrush polymer comprises 100% (w/w) monomers of Structure II.

B8. The composition of any one of Aspects B1 to B7, wherein the monomers further comprise a second monomer having the structure:

(VII)

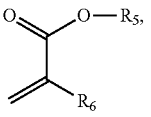

wherein $R_5$ is a carbon-containing linker, optionally comprising up to 9 fluorine atoms and, optionally, up to 1 silicon atom, up to 3 oxygen atoms, and up to 2 nitrogen atoms; and wherein $R_6$ is H or an alkyl comprising at least 1 and up to 4 carbon atoms.

B9. The composition of Aspect B8, wherein $R_5$ comprises at least 1 and up to 8 carbon atoms.

B10. The composition of Aspect B8 or B9, wherein $R_5$ is $—CH_2CH_2CH_2Si(OCH_3)_3$, $—CH_3$, or $—CH_2CH_2OH$.

B11. The composition of any one of Aspects B1 to B10, wherein the composition comprises at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), at least 80% (w/w), at least 90% (w/w), or at least 95% (w/w) of the PFPE bottlebrush polymer, based on the total weight of the polymers in the composition.

B12. The composition of any one of Aspects B1 to B11, wherein the composition comprises up to 10% (w/w), up to 15% (w/w), up to 20% (w/w), up to 30% (w/w), up to 40% (w/w), up to 50% (w/w), up to 60% (w/w), up to 70% (w/w), up to 80% (w/w), up to 90% (w/w), up to 95% (w/w), or up to 100% (w/w) of the PFPE bottlebrush polymer, based on the total weight of the polymers in the composition.

B13. The composition of any one of Aspects B1 to B12, wherein the composition further comprises a short chain fluoropolymer derived from polymerization of one or more monomers, the monomers comprising a monomer having the structure:

(I)

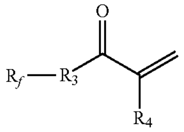

wherein $R_3$ is a carbon-containing linker comprising at least 1 oxygen atom or nitrogen atom and at least 1 and up to 2 carbon atoms; wherein $R_4$ is H or an alkyl comprising at least 1 and up to 4 carbon atoms; and wherein $R_f$ is a substituted alkyl comprising at least 1 and up to 4 carbon atoms and at least 1 and up to 9 fluorine atoms.

B14. The composition of Aspect B13, wherein the molecular weight of the short chain fluoropolymer is at least 10 kg/mol and up to 300 kg/mol.

B15. The composition of Aspect B13 or B14, wherein $R_f$ is a perfluoroalkyl.

B16. The composition of Aspect B15, wherein the perfluoroalkyl comprises 4 carbons.

B17. The composition of Aspect B15 or B16, wherein the perfluoroalkyl has 3 carbons.

B18. The composition of any one of Aspects B13 to B17, wherein $R_3$ is —O—, —$OCH_2$—, or —$OCH_2CH_2$—.

B19. The composition of any one of Aspects B13 to B18, wherein $R_4$ is —$CH_3$.

B20. The composition of Aspect B13 or B14, wherein $R_f$ is —F or —$CH(CF_3)_2$.

B21. The composition of any one of Aspects B13 to B16, wherein the monomer has one of the following structures:

(IX)

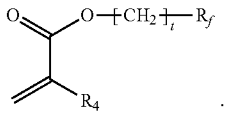

| t | $R_4$ | $R_f$ |
|---|---|---|
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | $CH_3$ | $CF_3$ |
| 1 | $CH_3$ | $CF_2CF_3$ |
| 1 | $CH_3$ | $CF_2CF_2CF_3$ |
| 2 | $CH_3$ | $CF_2CF_2CF_2CF_3$ |
| 1 | H | $CF_2CF_2CF_3$. |

B22. The composition of any one of Aspects B13 to B16, wherein $R_4$ is H or $CH_3$, $R_3$ is —OC(O)$CH_2$— or —OC(O)$CH_2CH_2$—, and $R_f$ is a perfluoroalkyl comprising at least 1 and up to 4 carbons.

B23. The composition of any one of Aspects B13 to B17 or B21 to B22, wherein $R_f$ comprises a branched structure.

B24. The composition of Aspect B23, wherein $R_f$ has the structure:

(XI)

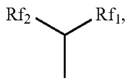

wherein $R_{f1}$ is a substituted alkyl comprising at least 1 and up to 4 carbon atoms and at least 1 and up to 9 fluorine atoms and $R_{f2}$ is a substituted alkyl comprising at least 1 and up to 4 carbon atoms and at least 1 and up to 9 fluorine atoms.

B25. The composition of Aspect B24, wherein $R_{f1}$ is a perfluoroalkyl or $R_f$ is a perfluoroalkyl or both $R_{f1}$ and $R_f$ are perfluoroalkyls.

B26. The composition of any one of Aspects B13 to B17, wherein the short chain fluoropolymer is derived from polymerization of one or more monomers, the monomers comprising a monomer having the structure:

(V)

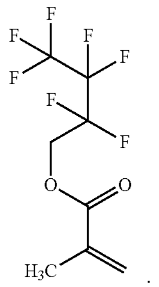

B27. The composition of any one of Aspects B13 to B26, wherein the composition comprises at least 5% (w/w), at least 10% (w/w), at least 15% (w/w), at least 20% (w/w), at least 30% (w/w), at least 40% (w/w), at least 50% (w/w), at least 60% (w/w), at least 70% (w/w), or at least 80% (w/w) of the short chain fluoropolymer, based on the total weight of the polymers in the composition.

B28. The composition of any one of Aspects B13 to B27, wherein the composition comprises up to 20% (w/w), up to 30% (w/w), up to 40% (w/w), up to 50% (w/w), up to 60% (w/w), up to 70% (w/w), up to 80% (w/w), up to 90% (w/w), or up to 95% (w/w) of the short chain fluoropolymer, based on the total weight of the polymers in the composition.

B29. The composition of any one of Aspects B13 to B28, wherein the composition comprises short chain fluoropolymer in a range of 10% (w/w) to 90% (w/w), based on the total weight of the polymers in the composition.

B30. The composition of any one of Aspects B13 to B29, wherein the composition comprises short chain fluoropolymer in a range of 25% (w/w) to 75% (w/w), based on the total weight of the polymers in the composition.

B31. The composition of any one of Aspects B13 to B30, wherein the composition comprises short chain fluoropolymer in a range of 25% (w/w) to 75% (w/w), based on the total weight of the PFPE bottlebrush polymer and the short chain fluoropolymer in the composition.

B32. The composition of any one of Aspects B13 to B31, wherein the short chain fluoropolymer comprises poly(2,2-3,3-4,4,4-heptafluorobutyl methacrylate) or poly(2,2-3,3-4-4-4-heptafluorobutyl acrylate), and wherein the short chain fluoropolymer has a number average molecular weight ($M_n$) in a range of 50 kg/mol to 60 kg/mol.

B33. The composition of any one of Aspects B1 to B30, wherein the composition comprises at least 25% (w/w) and up to 75% (w/w) of PFPE bottlebrush polymer, and at least 25% (w/w) and up to 75% (w/w) of a short chain fluoropolymer comprising poly(2,2-3,3-4,4,4-heptafluorobutyl methacrylate), wherein the weight percent is based on the total weight of the polymers in the composition.

B34. The composition of any one of Aspects B1 to B30, wherein the composition comprises at least 50% (w/w) and up to 90% (w/w) of the PFPE bottlebrush polymer, and at least 10% (w/w) and up to 50% (w/w) of a short chain fluoropolymer comprising poly(2,2-3,3-4,4,4-heptafluorobutyl methacrylate), wherein the weight percent is based on the total weight of the polymers in the composition.

B35. The composition of any one of Aspects B1 to B34, wherein the PFPE bottlebrush polymer comprises a monomer having a cross-linkable side chain.

B36. The composition of any one of Aspects B1 to B35, wherein the composition comprises an organic solvent.

B37. The composition of Aspect B36, wherein the organic solvent comprises methyl ethyl ketone (MEK) or a fluorosolvent.

B38. The composition of Aspect B37, wherein the fluorosolvent comprises a fluorinated ether.

B39. The composition of any one of Aspects B1 to B38, wherein the concentration of the total polymer in a solvent is at least 1% weight of the polymer (in grams) per volume of solvent (mL) (w/v), at least 2% (w/v), at least 3% (w/v), at least 4% (w/v), at least 5% (w/v), at least 6% (w/v), or at least 7% (w/v).

B40. The composition of any one of Aspects B1 to B39, wherein the concentration of the total polymer in a solvent is up to 1% weight of the polymer (in grams) per volume of solvent (mL) (w/v), up to 2% (w/v), up to 3% (w/v), up to 4% (w/v), up to 5% (w/v), up to 6% (w/v), up to 7% (w/v), or up to 8% (w/v).

B41. The composition of any one of Aspects B1 to B40, wherein the PFPE bottlebrush polymer is free of subunits where n is 4 or greater.

Exemplary Article Aspects

C1. An article comprising a composition disposed on a surface of the article, forming a treated article, wherein the composition comprises the composition of any one of Aspects A1 to A47 or B1 to B41.

C2. The article of Aspect C1, wherein the article comprises a porous filtration medium, and wherein the composition is disposed on a major surface of the porous filtration medium, forming a treated porous filtration medium.

C3. The article of Aspect C2, wherein the porous filtration medium comprises expanded polytetrafluoroethylene (ePTFE), polyurethane, polypropylene, polyethylene, polyether sulfone, polyvinylidene fluoride, polycarbonate, polyolefin, polyamide, polyester, polysulfone, polyether, acrylic polymers, methacrylic polymers, polystyrene, a cellulosic polymer (e.g., cellulose acetate), or glass, or a combination thereof.

C4. The article of Aspect C2 or C3, wherein the porous filtration medium comprises ePTFE.

C5. The article of any one of Aspects C1 or C4, wherein the porous filtration medium comprises a membrane.

C6. The article of any one of Aspects C2 to C5, wherein the treated porous filtration medium exhibits an oleophobicity of at least 6, more preferably at least 7 on at least one major surface of the porous filtration medium, as determined by AATCC test method 118 (TM118-2013e2), wherein the ratings are rounded to the nearest integer value.

C7. The article of any one of Aspects C1 to C6, wherein the porous filtration medium has a thickness in a range of 4 mils to 15 mils.

C8. The article of any one of Aspects C1 to C7, wherein the porous filtration medium prior to treatment exhibits a permeability in a range of 0.1 CFM at 0.5 inches $H_2O$ to 3 CFM at 0.5 inches $H_2O$.

C9. The article of any one of Aspects C1 to C8, wherein the porous filtration medium prior to treatment has an average mean flow pore size in a range of 0.1 μm to 1.5 μm.

C10. The article of any one of Aspects C1 to C9, wherein the porous filtration medium prior to treatment exhibits a permeability in a range of 0.1 CFM at 0.5 inches $H_2O$ to 0.2 CFM at 0.5 inches $H_2O$; a thickness in a range of 8 mils to 11 mils; and an average mean flow pore size in a range of 0.1 μm to 0.3 μm.

C11. The article of any one of Aspects C1 to C10, wherein the porous filtration medium prior to treatment exhibits a permeability in a range of 2 CFM at 0.5 inches $H_2O$ to 3 CFM at 0.5 inches $H_2O$; a thickness in a range of 7 mils to 15 mils; and an average mean flow pore size in a range of 0.5 μm to 2 μm.

C12. The article of any one of Aspects C1 to C10, wherein the porous filtration medium prior to treatment exhibits a permeability in a range of 0.1 CFM at 0.5 inches $H_2O$ to 0.4 CFM at 0.5 inches $H_2O$; a thickness in a range of 9 mils to 14 mils; and an average mean flow pore size in a range of 0.5 μm to 0.9 μm.

C13. The article of any one of Aspects C1 to C7, wherein the porous filtration medium post-treatment has an average mean flow pore size in a range of 0.1 μm to 1.5 μm.

C14. The article of Aspect C13, wherein the porous filtration medium post-treatment exhibits a permeability in a range of 0.1 CFM at 0.5 inches $H_2O$ to 0.2 CFM at 0.5 inches $H_2O$; a thickness in a range of 8 mils to 11 mils; and an average mean flow pore size in a range of 0.1 μm to 0.3 μm.

C15. The article of Aspect C13, wherein the porous filtration medium post-treatment exhibits a permeability in a range of 1.4 CFM at 0.5 inches $H_2O$ to 3.5 CFM at 0.5 inches $H_2O$; a thickness in a range of 7 mils to 15 mils; and an average mean flow pore size in a range of 1 μm to 1.5 μm.

C16. The article of Aspect C13, wherein the porous filtration medium post-treatment exhibits a permeability in a range of 0.1 CFM at 0.5 inches $H_2O$ to 0.4 CFM at 0.5 inches $H_2O$; a thickness in a range of 9 mils to 14 mils; and an average mean flow pore size in a range of 0.5 μm to 2 μm.

C17. The article of Aspect C14, the composition disposed on a surface of the article comprising: at least 25% (w/w) and up to 75% (w/w) of PFPE bottlebrush polymer, and at least 25% (w/w) and up to 75% (w/w) of a short chain fluoropolymer comprising poly(2,2,3,3,4,4,4-heptafluorobutyl methacrylate), wherein the weight percent is based on the total weight of the polymers in the composition.

C18. The article of Aspect C14 or C17, the composition disposed on a surface of the article comprising at least 3% weight of the polymer (in grams) per volume of solvent (mL) (w/v) polymer and/or up to 6% (w/v) polymer.

C19. The article of Aspect C15, the composition disposed on a surface of the article comprising: at least 25% (w/w) and up to 75% (w/w) of PFPE bottlebrush polymer, and at least 25% (w/w) and up to 75% (w/w) of a short chain fluoropolymer comprising poly(2,2,3,3,4,4,4-heptafluorobutyl methacrylate), wherein the weight percent is based on the total weight of the polymers in the composition.

C20. The article of Aspect C15 or C19, the composition disposed on a surface of the article comprising at least 4% weight of the polymer (in grams) per volume of solvent (mL) (w/v) polymer and/or up to 6% (w/v) polymer.

C21. The article of Aspect C16, the composition disposed on a surface of the article comprising: at least 10% (w/w) and up to 50% (w/w) of PFPE bottlebrush polymer, and at least 50% (w/w) and up to 90% (w/w) of a short chain fluoropolymer comprising poly(2,2,3,3,4,4,4-heptafluorobutyl methacrylate), wherein the weight percent is based on the total weight of the polymers in the composition.

C22. The article of Aspect C16 or C21, the composition disposed on a surface of the article comprising at least 2% weight of the polymer (in grams) per volume of solvent (mL) (w/v) polymer and/or up to 6% (w/v) polymer.

Exemplary Methods of Making

D1. A method of making an article, the method comprising: contacting a surface of the article with a mixture comprising the composition of any one of Aspects A1 to A47 or B1 to B41, wherein the composition comprises a liquid, depositing the mixture onto the surface to form the treated article, and removing the liquid.

D2. The method of Aspect D1, wherein the liquid comprises an organic solvent.

D3. The method of Aspect D2, wherein the organic solvent comprises methyl ethyl ketone (MEK) or a fluorosolvent.

D4. The method of claim D3, wherein the fluorosolvent comprises a fluorinated ether.

D5. The article of any one of Aspects D2 to D4, wherein the mixture comprises a fluoropolymer completely dissolved in the organic solvent.

D6. The method of any one of Aspects D1 to D4, wherein the mixture comprises an emulsion.

D7. The method of any one of Aspects D1 to D6, wherein the article comprises a porous filtration medium, and the method comprises contacting a surface of the porous filtration medium with the mixture and depositing the mixture onto the surface of the porous filtration medium to form a treated porous filtration medium.

D8. The method of D7, wherein forming the treated porous filtration medium further comprises heat treating the treated porous filtration medium.

D9. The method of Aspect D8, wherein heat treating the treated porous filtration medium comprises heating the treated porous filtration medium at a temperature of at least 70° C., at least 80° C., at least 90° C., at least 100° C., or at least 120° C.; and/or heating the treated porous filtration medium at a temperature of up to 130° C., up to 140° C., or up to 150° C.

D10. The method of Aspect D8, wherein heat treating the treated porous filtration medium comprises heating the treated porous filtration medium to a temperature of at least 70° C., at least 80° C., at least 90° C., at least 100° C., or at least 120° C.; and/or heating the treated porous filtration medium to a temperature of up to 130° C., up to 140° C., or up to 150° C.

D11. The method of any one of Aspects D8 to D10, wherein heat treating the treated porous filtration medium comprises heating the treated porous filtration medium for at least 1 minute, at least 2 minutes, or at least 3 minutes; and/or heating the treated porous filtration medium for up to 3 minutes, up to 4 minutes, up to 5 minutes, or up to 10 minutes.

D12. The method of any one of Aspects D7 to D10, wherein contacting a surface of the porous filtration medium with the mixture comprises immersing the porous filtration medium in the mixture.

D13. The method of any one of Aspects D7 to D11, wherein the treated porous filtration medium has an oleophobicity of at least 6, more preferably at least 7 on at least one major surface, as determined by AATCC test method 118 (TM118-2013e2), wherein the ratings are rounded to the nearest integer value.

D14. The method of Aspect D13, wherein the treated porous filtration medium has an oleophobicity of at least 6, more preferably at least 7 on two major surfaces of the porous filtration medium.

D15. The method of any one of Aspects D7 to D14, wherein the treated porous filtration medium has an oleophobicity of up to 8, as determined by AATCC test method 118 (TM118-2013e2), wherein the ratings are rounded to the nearest integer value.

The present invention is illustrated by the following examples. It is to be understood that the particular examples, materials, amounts, and procedures are to be interpreted broadly in accordance with the scope and spirit of the invention as set forth herein.

EXAMPLES

Materials and Methods

All reagents, starting materials, and solvents used in the following examples were purchased from commercial suppliers (such as Sigma Aldrich, St. Louis, MO) and were used without further purification unless otherwise indicated.

Polymers

Perfluoropolyether methacrylate (PFPE, molecular weight (MW)=1000) was obtained from Fuzhou Topda New Material Co., Ltd. (Fuzhou, China).

2,2,3,3,4,4,4-Heptafluorobutyl methacrylate was obtained from TCI America (Portland, OR).

Azobisisobutyronitrile (AIBN) was obtained from Sigma Aldrich (Milwaukee, WI).

3M NOVEC 7100 solvent was obtained from Best Technology, Inc. (Plymouth, MN).

Hexafluoroisopropanol (HFIPA) was obtained from Sigma Aldrich (St. Louis, MO).

Phenogel MIXED C Column (300 mm×7.8 mm) was obtained from Phenomenex (Torrance, CA).

Perfluoro(2-methyl-3-oxahexan-1-ol) was obtained from Synquest Labs (Alachua, FL).

Acryloyl chloride was obtained from Sigma Aldrich (St. Louis, MO).

Media ePTFE media (membranes) included Media A-Media C. Features of these media are shown in Table 1, below.

Air permeability in cubic feet per minute (CFM) was determined using an Air Permeability Tester Model FX3300 (Texttest AG, Schwerzenbach, Switzerland) at 0.5 inch of water of differential pressure.

Thickness was determined using a Model 3W dial comparator (B.C. Ames Incorporated, Framingham, MA) with base plate and moveable presser foot at 1.5 psi.

Pore Size was determined by capillary extrusion porometry with a Capillary Flow Porometer (Porolux 500, Through-Pore Size Analyzer, POROMETER NV, APTCO Group, Nazareth, Belgium) using POROFIL Wetting Solution (Quantachrome Instruments, Boynton Beach, CA) as a wetting liquid.

Samples 25 mm in diameter were subjected to a pressure sweep (that is, a continuous pressure scan) from 0.115 bar to 3.5 bar in both wet and dry states (first dry, then wet) to determine pore sizes within 0.1 microns to 4 microns.

The sample was tested from low pressure to high pressure, while dry and wet. The air flow and sample pressure from the saturated part of the test is commonly called the wet curve. 200 data points were collected across the range of the scan of the pressures for both the dry curve and the wet curve. The test was performed at ambient conditions (for example, 20° C. to 25° C.). An empirical tortuosity factor and/or a shape factor of 0.715 was applied to adjust the pore size diameter definition.

The flow porometry test procedure collects a set of pressure (typically plotted on the x-axis) and air flow (typically plotted on the y-axis) data for the dry sample, and a set of pressure and air flow data for the saturated (wet) sample. These two sets of data are commonly called the dry curve and the wet curve. That is:

Dry Curve=$V_{dry}$=air flow through a dry sample as a function of pressure

Wet Curve=$V_{wet}$=air flow through a saturated sample as a function of pressure Based on capillary theory, the pressure across the sample (AP) can be converted to pore diameter (d) using the Young-Laplace formula, $$d = \frac{4\gamma\cos\theta}{\Delta P} \times (\text{Emperical Factor})$$

Where,

γ=fluid surface tension

θ=fluid contact angle d=pore diameter

ΔP=pressure across sample

This conversion allows the dry and wet curves to be defined as a function of pore diameter.

Dry Curve=$V'_{dry}$=air flow through a dry sample as a function of diameter

Wet Cruve=$V'_{wet}$=air flow through a saturated sample as a function of diameter The cumulative flow pore size distribution (Q) is defined as the ratio of the wet curve over the dry curve as a function of pore diameter. Where, $$Q(d) = \frac{V'_{wst}}{V'_{dry}}$$

The mean flow pore size was calculated at the pressure where the wet curve and the “half-dry” curve cross. The half-dry curve is obtained by the mathematical division by 2 of V'dry. The average mean flow pore size was calculated from the mean of at least three measurements.

The maximum pore size was determined by detecting the measured bubble point. That is, the bubble point was determined by increasing the pressure on a wetted sample while measuring the air flow across the sample. The measured bubble point is defined at the pressure at which air flow is first observed, indicating the point at which the first and largest pore was dewetted.

TABLE 1

| Media | Permeability (CFM at 0.5 inches $H_2O$) | Thickness (mils) | Mean flow pore size (μm) |
|---|---|---|---|
| A | 0.15 +/− 0.08 | 9.5 +/− 1.0 | 0.2 |
| B | ≥2.0 (scrim laminated) | 7.4-14.5 | 0.5-1.5 |
| C | 0.12-0.3 | 9.8-13.8 | 0.7-0.9 |

Because the ePTFE media of Media B was laminated to a scrim, the two sides were not identical. As referred to herein, Side 1 of Media B is ePTFE and Side 2 of Media B is scrim.

Fluoropolymers

General Fluoropolymer Synthesis Method

A 20 mL scintillation vial with a magnetic stir bar (for 4 g and 10 g scale reactions) or a jacketed reactor with a stir shaft (for 100 g scale reactions) was charged with the indicated amount of monomer, azobisisobutyronitrile (AIBN), and solvent. The vial or reactor was securely closed and sparged with Argon for 5 minutes to remove air. If a vial was used, the vial containing the reaction mixture was placed in a custom aluminum block affixed to a hot plate/magnetic stirrer controlled utilizing a feedback probe and preheated to 65° C. If a reactor was used, a reflux condenser was placed on top of the reactor to prevent the solvent from escaping, and the jacket of the reactor containing the reaction mixture was preheated to 65° C. The polymerization reaction was then allowed to proceed overnight (at least 12 hours) at 65° C. Kinetic analysis revealed the reactions were complete within 10 hours. The reaction mixture was cooled to room temperature and diluted with solvent to a desired w/v %. The concentration of the solution was validated by pipetting 1 mL of the solution into a pre-weighed petri dish. The solvent was evaporated and the petri dish was weighed again to obtain mass of polymer.

The resulting solution was used directly for coating of samples or was mixed with another polymer in solution and then used to coat samples, as further described below.

Poly(2,2-3,3-4,4,4-heptafluorobutyl methacrylate) (“Polymer 1”)

Poly(2,2-3,3-4,4,4-heptafluorobutyl methacrylate) (“Polymer 1”) was produced as described in the General Fluoropolymer Synthesis Method using 10 g or 100 g 2,2-3,3-4,4,4-heptafluorobutyl methacrylate, 0.036 to 0.45 g AIBN, and 10 mL or 100 mL NOVEC 7100 Engineered Fluid, as shown in Table 2A. The resulting polymer exhibited the number average molecular weight ($M_n$), weight average molecular weight ($M_w$), polydispersity index (PDI), and glass transition temperature ($T_g$) shown in Table 2B.

Poly(perfluoropolyether$_{1000}$ methacrylate) (“Polymer 2”)

Poly(perfluoropolyether$_{1000}$ methacrylate) (“poly (PFPE$_{1000}$)” or “Polymer 2”) was produced as described in the General Fluoropolymer Synthesis Method using 4 g perfluoropolyether$_{1000}$ methacrylate, 0.008 g to 0.032 g AIBN, and 4 mL NOVEC 7100 Engineered Fluid, as shown in Table 2A. The resulting polymer exhibited the number average molecular weight ($M_n$), weight average molecular weight ($M_w$), polydispersity index (PDI), degree of polymerization (DP), and glass transition temperature ($T_g$) shown in Table 2B.

TABLE 2A

| Examples | Polymer | MONOMER (g) | AIBN (g) | NOVEC 7100 (mL) | Temperature (° C.) | Time (hours) |
|---|---|---|---|---|---|---|
| 1 to 19 | Polymer 1 | 10 | 0.036 | 10 | 65 | >12 |
| | Polymer 2 | 4 | 0.008 | 4 | 65 | >12 |

TABLE 2A-continued

| Examples | Polymer | MONOMER (g) | AIBN (g) | NOVEC 7100 (mL) | Temperature (° C.) | Time (hours) |
|---|---|---|---|---|---|---|
| 20 to 38 | Polymer 1 | 10 | 0.036 | 10 | 65 | >12 |
| | Polymer 2 | 4 | 0.008 | 4 | 65 | >12 |
| 39 to 46 | Polymer 1 | 100 | 0.45 | 100 | 62 | >12 |
| | Polymer 2 | 4 | 0.008 | 4 | 65 | >12 |
| 46 to 50 | Polymer 1 | 100 | 0.45 | 100 | 62 | >12 |
| | Polymer 2 | 4 | 0.032 | 4 | 65 | >12 |

TABLE 2B

| Examples | Polymer | Mn (g/mol) | Mw (g/mol) | PDI | DP | $T_g$ (° C.) |
|---|---|---|---|---|---|---|
| 1 to 19 | Polymer 1 | 53896 | 107796 | 2.00 | 201 | 54 |
| | Polymer 2 | 26319 | 34587 | 1.31 | 26 | −54 |
| 20 to 38 | Polymer 1 | 46007 | 120342 | 2.62 | 172 | 54 |
| | Polymer 2 | 26319 | 34587 | 1.31 | 26 | −54 |
| 39 to 46 | Polymer 1 | 58217 | 128190 | 2.20 | 217 | 54 |
| | Polymer 2 | 19311 | 34530 | 1.79 | 19 | −54 |
| 46 to 50 | Polymer 1 | 58217 | 128190 | 2.20 | 217 | 54 |
| | Polymer 2 | 23328 | 33344 | 1.43 | 23 | −54 |

Number Average Molecular Weight (Mn) & Weight Average Molecular Weight (Mw)

Two PHENOGEL columns (MIXED-C, 300 mm×7.8 mm, Phenomenex, Torrance, CA) were used in a loop. Hexafluoroisopropanol (HFIPA) was used as the solvent at a flow rate of 0.8 mL/min. Column temperature was 50° C. A refractive index detector was used as the sole detection method. A set of poly(methyl methacrylate) (PMMA) polymers (poly(methyl methacrylate) standard ReadyCal set Mp 800-2,200,000 Da, Sigma Aldrich, St. Louis, MO) with the values of the molecular weight corresponding to that of the maximum of the chromatographic peak (Mp) ranging from 800 Da to 2,200 kDa were used to generate a calibration curve, which is shown in Table 3.

All number average molecular weight (Mn), weight average molecular weight (Mw), and degree of polymerization (n) values reported herein were obtained using this calibration set and GPC parameters using Cirrus GPC Software for OpenLAB CDS ChemStation Edition (Agilent, Santa Clara, CA).

Degree of polymerization (n) was determined by dividing the Mn value by the monomer's molecular weight (MW).

TABLE 3

| retention time | Mp (g/mol) | Log(Mp) |
|---|---|---|
| 14.36 | 2200000 | 6.34 |
| 15.21 | 988000 | 5.99 |
| 15.77 | 608000 | 5.78 |
| 16.32 | 340000 | 5.53 |
| 16.93 | 202000 | 5.31 |
| 17.84 | 88500 | 4.95 |
| 18.72 | 41400 | 4.62 |
| 19.48 | 18700 | 4.27 |
| 20.15 | 9680 | 3.99 |
| 20.80 | 5050 | 3.70 |
| 21.49 | 2380 | 3.38 |
| 22.51 | 800 | 2.90 |

Glass Transition Temperature ($T_g$)

Glass transition temperatures (Tg) of polymers were obtained using a Q2000 DSC (TA Instruments, New Castle, DE). A typical DSC run procedure was as follows: Cycle 1: room temperature to 100° C. to −90° C. to room temperature. Cycle 2: 23° C. to 100° C. to −90° C. to room temperature. The scan rate was 10° C./min. The glass transition peak was calculated using the embedded software features on the second cycle.

Coating Procedure

A coating solution including 1% (w/v) to 6% (w/v) polymer in NOVEC 7100 was poured into an aluminum petri dish to a sufficient depth so that media being coated is adequately submerged. The submerged end was pulled through the solution and out, allowing for the remaining media to follow behind at approximately the same angle. Once the media completely exited the solution at approximately the same angle as at entrance, the excess solvent on the surface and in the pores was allowed to drain for a few seconds. The coated media was then placed in a support form to prevent curling/shrinkage upon drying. After the coated media was visibly dry (typically 10 seconds to 30 seconds, depending on media grade), it was placed in an oven at 90° C. for 5 minutes.

Testing Oleophobicity

To determine the oleophobicity rating on a scale of 1 to 8, testing for oleophobicity was performed according to AATCC TM118-2013e2 entitled "Oil Repellency: Hydrocarbon Resistance Test." Briefly, drops of various oils (described in Table 4A) were placed on the coated media. Each oil drop was slowed to sit for one minute before the oleo rating was recorded.

Resistance to wetting by Kaydol indicates an oleophobicity rating of 1; resistance to wetting by a 65:35 mixture of Kaydol:n-hexadecane indicates an oleophobicity rating of 2; resistance to wetting by n-hexadecane indicates an oleophobicity rating of 3; resistance to wetting by n-tetradecane indicates an oleophobicity rating of 4; resistance to wetting by n-dodecane indicates an oleophobicity rating of 5; resistance to wetting by n-decane oleophobicity rating of 6; resistance to wetting by n-octane oleophobicity rating of 7; resistance to wetting by n-heptane oleophobicity rating of 8. Both "A-type" and "B-type" drops according to FIG. 1 of AATCC TM118-2013e2 were considered a "pass"; thus, the ratings provided herein are to the nearest integer value.

TABLE 4A

Oils used in the oleophobicity test. (ST = surface tension)

| Oil | ST (mN/m) | Oleo Rating |
|---|---|---|
| Kaydol | 31.5 | 1 |
| 65:35 Kaydol:n-hexadecane | 29.6 | 2 |
| n-hexadecane | 27.3 | 3 |
| n-tetradecane | 26.4 | 4 |
| n-dodecane | 24.7 | 5 |
| n-decane | 23.5 | 6 |
| n-octane | 21.4 | 7 |
| n-heptane | 19.5 | 8 |

Testing Time to Wet with Gasoline

To determine resistance to gasoline, a 10 μL drop of gasoline (obtained from Holiday Stationstores, Penn Ave., Bloomington, MN) was placed gently on coated samples and the time for the droplet to demonstrate signs of wetting was recorded. If the time to wetting exceeded 30 seconds, then >30 seconds was recorded.

Pyrolysis Data Analysis Method

A small sample cup containing a miniscule amount (less than 50 μg) of coated media was placed in a pyrolyzer (Model PY-3030D, Frontier Laboratories, Koriyama, Fukushima, Japan) mounted on a gas chromatograph mass spectrometer (Model QP-2010, Shimadzu Corporation, Kyoto, Japan). The sample was rapidly heated to 700° C., and the pyrolites were separated in a GC column (Ultra ALLOY UA-5, Frontier Labs, Koriyama, Japan) over 30 minutes prior to be analyzed by the mass spectrometer.

Calculation of Surface Energy

A 5% (w/v) solution of polymer was coated on a glass slide and air dried to form a polymer film. Glass slides coated with polymer were then placed in an oven for 5 minutes at 90° C. Surface energies of resulting films were calculated using the Owens-Wendt-Rabel-Kaelble (WORK) method in ISO 19403-2 2017-06. Liquids used to acquire contact angles are shown in Table 4B. Surface energy (also referred to as surface tension) values reported for coated films are the sum of the polar and dispersive components.

TABLE 4B

Liquids used to acquire contact angles

| Test Liquid | Surface Tension | Dispersive Fraction | Polar Fraction |
|---|---|---|---|
| Water | 72.8 | 21.8 | 51 |
| Diiodomethane | 50.8 | 50.8 | 0 |
| Ethylene Glycol | 47.7 | 30.9 | 16.8 |
| Glycerol | 63.4 | 37 | 26.4 |
| Hexadecane | 27.6 | 27.6 | 0 |
| 1-Bromonaphthalene | 44.6 | 44.6 | 0 |
| Benzyl Alcohol | 38.9 | 29 | 9.9 |
| Decalin (cis/trans) | 30.6 | 30.6 | 0 |
| cis-decalin | 32.2 | 32.2 | 0 |
| trans-decalin | 29.9 | 29.9 | 0 |

Nuclear Magnetic Resonance (NMR)

Nuclear Magnetic Resonance (NMR) was performed using an AVANCE NEO 400 MHz spectrometer (Bruker Corporation, Billerica, MA), equipped with BBO Probe (Bruker Corporation, Billerica, MA). The Bruker parameter set PROTON (pulse sequence: zg30) using a 30 deg pulse and 16 scans was used. The sweepwidth was 20 ppm (8197 Hz). Delay between pulses was 1 second and acquisition time was 4 seconds. 32K data points were collected at 298K ($^1$H spectrum).

Examples 1-50

Polymer 1 (poly(2,2,3,3,4,4,4-heptafluorobutyl methacrylate) and Polymer 2 (poly(perfluoropolyether$_{1000}$ methacrylate)) were prepared as described above. Mixtures including the amounts of Polymer 1 and Polymer 2 shown in Table 5A in NOVEC 7100 were prepared. Coating solutions including the concentrations of polymers indicated were used to coat three different Media (Media A, Media B, and Media C) as described in the Materials and Methods section.

The oleophobicity and permeability of the resulting coated media was evaluated. Results are shown in Table 5B.

Results were further plotted as contour mix-process plots using Design-Expert (version 12, StatEase, Minneapolis, MN), as shown in FIG. 3 to FIG. 5 to determine the concentrations and proportions of Polymer 1 and Polymer 2 that provide the highest oleophobicity while retaining a permeability near to that of the uncoated sample. For each media type, statistical fit analysis of key terms was performed, and all nonsignificant terms were removed using p-values backwards to remove terms that have a fit of alpha >0.1. Additional information about the statistical fit of the model used for each panel of FIG. 3-FIG. 5 is provided in Table 6-Table 8. In Tables 6 to 8, Adeq refers to "Adequate Precision," a signal-to-noise ratio that compares the range of the predicted values at the design points to the average prediction error.

Figure 3A:
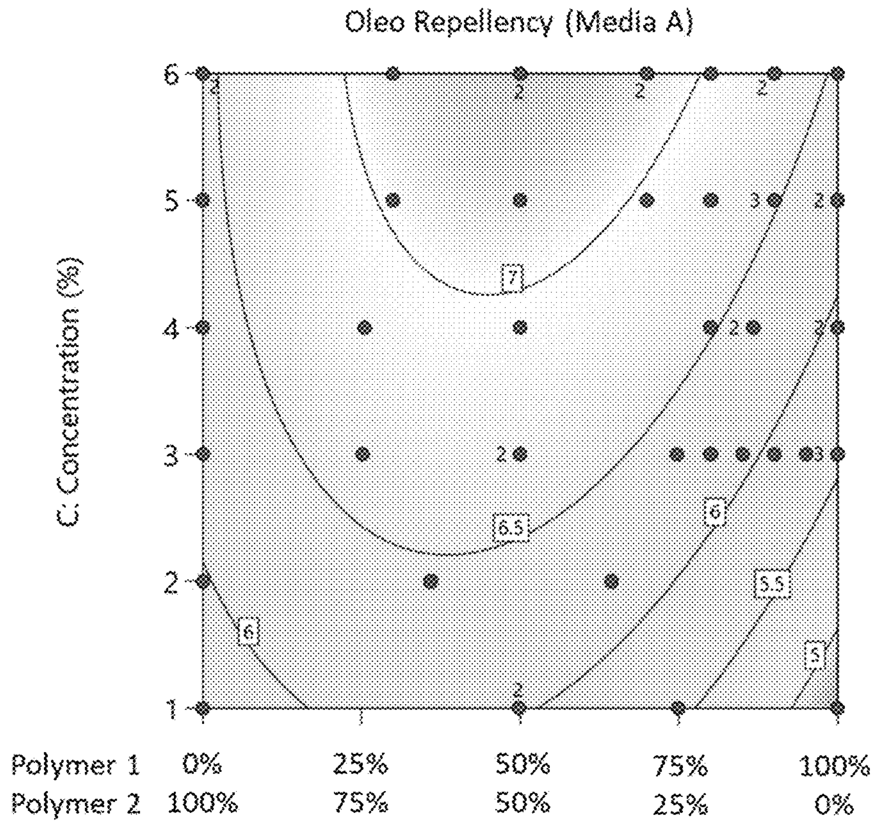
FIG. 3A-FIG. 3B show contour mix-process plots showing oleophobicity (FIG. 3A) and permeability (FIG. 3B) of Media A coated with differing proportions of Polymer 1 and Polymer 2 at varying concentrations.
Figure 3B:
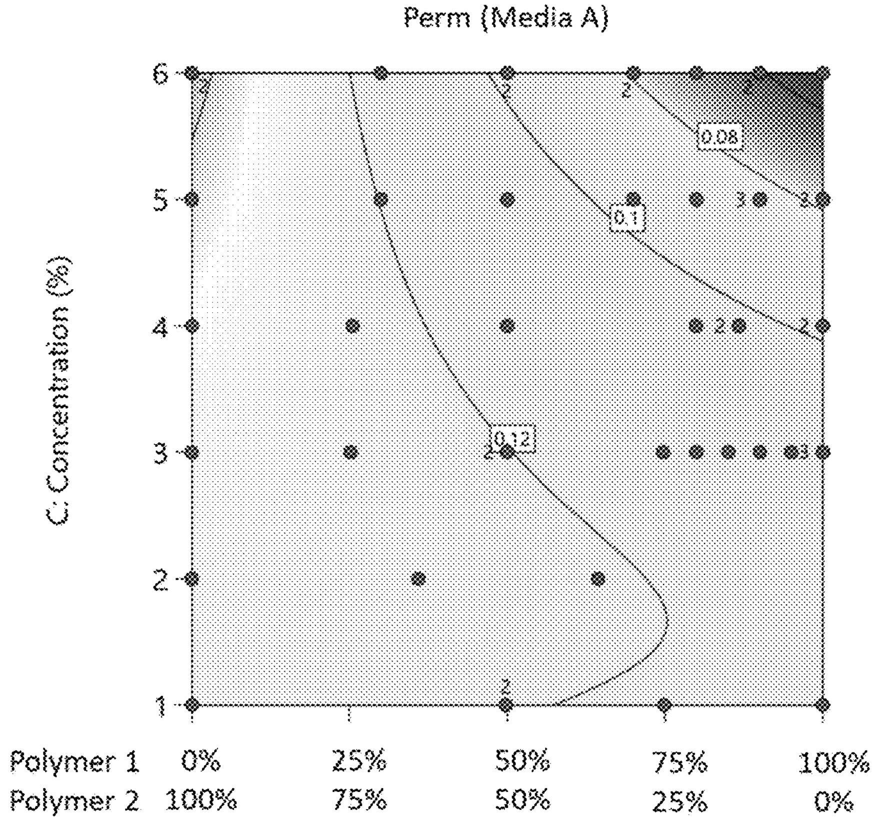

As can be seen in FIG. 3A-FIG. 3B, for Media A, when the coating mixtures included Polymer 1 in a range of 25% (w/w) to 75% (w/w) and Polymer 2 in a range of 25% (w/w) to 75% (w/w) and was coated at a concentration of at least 3% weight of the polymer (in grams) per volume of solvent (mL) (w/v), an oleo repellency of at least 7 was achieved while maintaining a permeability of at least 0.08.

Figure 4A:
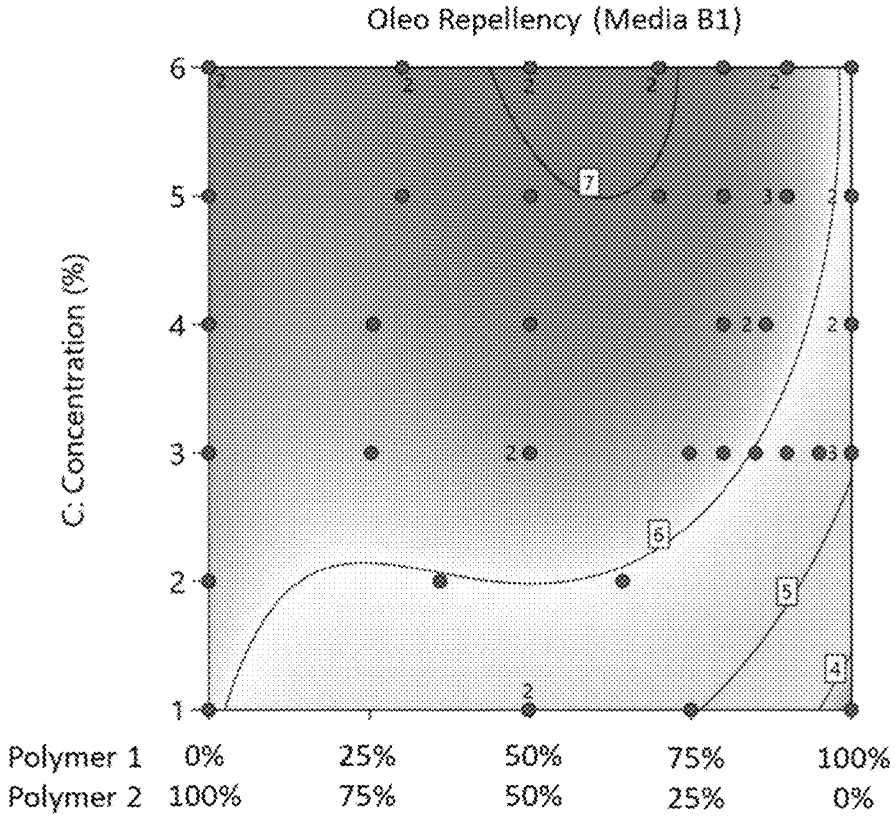
FIG. 4A-FIG. 4D show contour mix-process plots showing oleophobicity (FIG. 4A, FIG. 4C) and permeability (FIG. 4B, FIG. 4D) of Media B coated with differing proportions of Polymer 1 and Polymer 2 at varying concentrations. Because the ePTFE media of Media B was laminated to a scrim, the properties of the two sides are not identical.
Figure 4B:
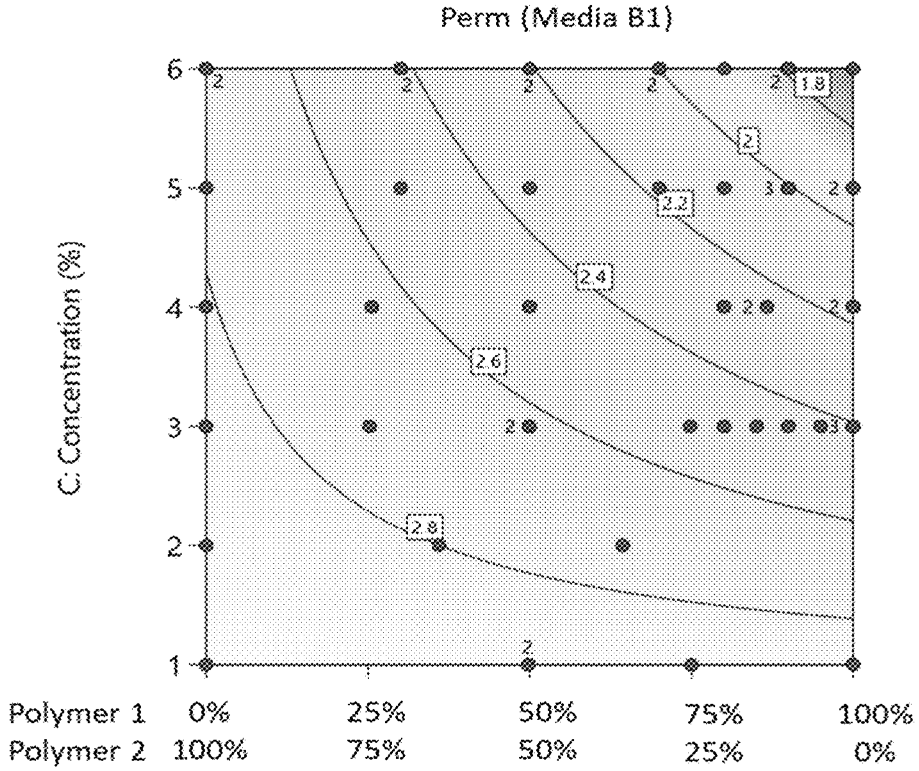

As can be seen in FIG. 4A-FIG. 4B, for Side 1 of Media B (ePTFE), when the coating mixtures included Polymer 1 in a range of 25% (w/w) to 75% (w/w) and Polymer 2 in a range of 25% (w/w) to 75% (w/w) and was coated at a concentration of at least 4% (w/v), an oleo repellency of at least 7 was achieved while maintaining a permeability of at least 2.

Figure 4C:
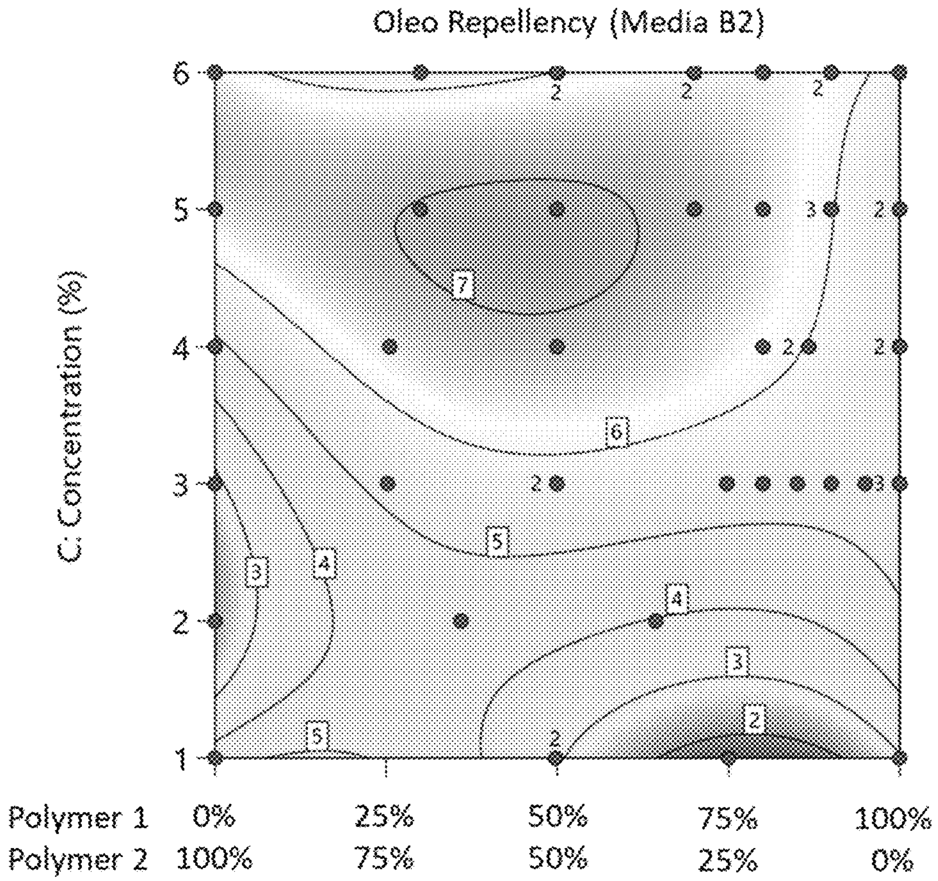
Figure 4D:
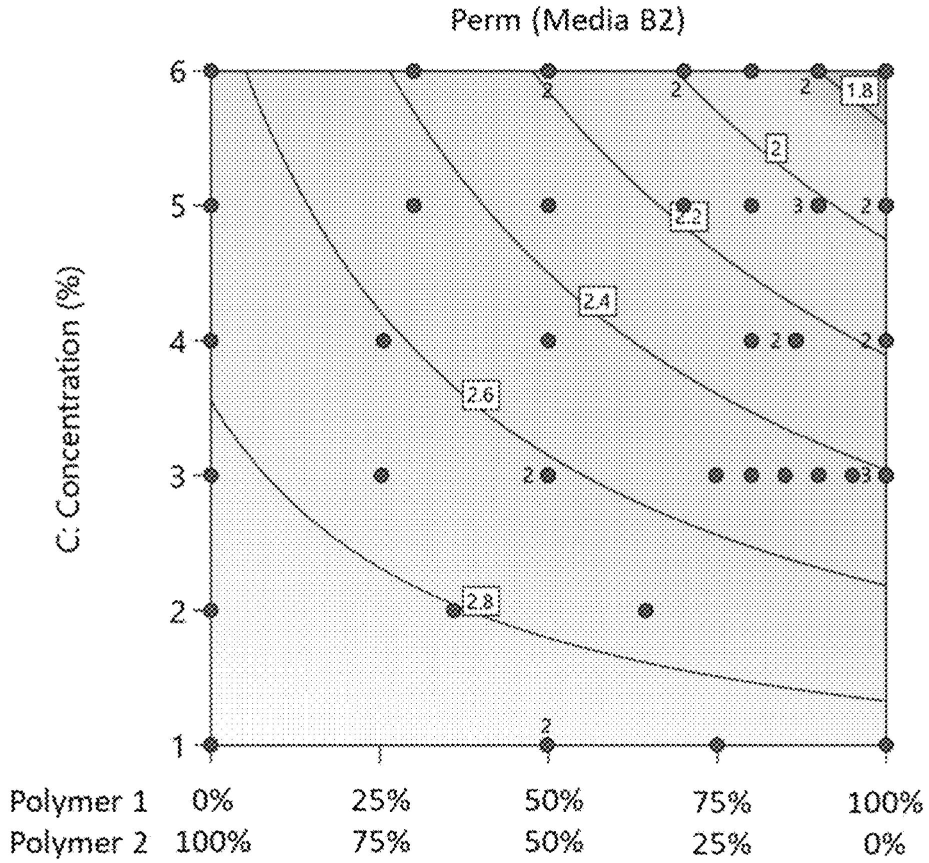

As can be seen in FIG. 4C-FIG. 4D, for Side 2 of Media B (scrim), when the coating mixtures included Polymer 1 in a range of 25% (w/w) to 75% (w/w) and Polymer 2 in a range of 25% (w/w) to 75% (w/w) and was coated at a concentration of at least 4% (w/v), an oleo repellency of at least 6 was achieved while maintaining a permeability of at least 2.

Figure 5A:
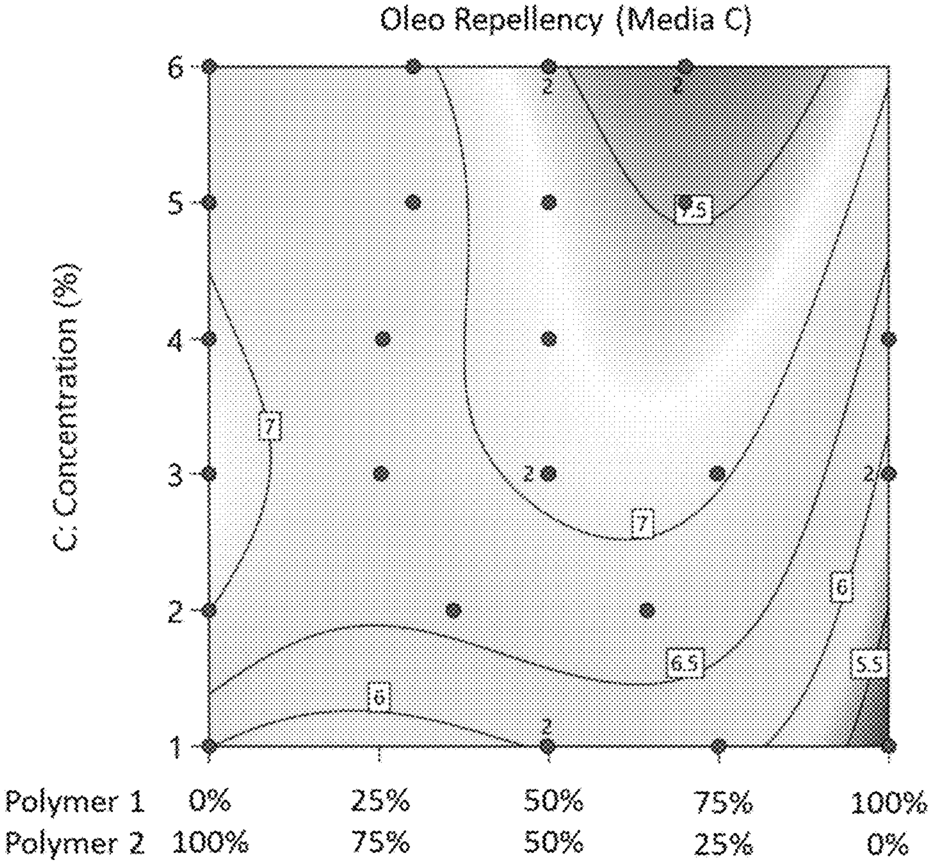
FIG. 5A-FIG. 5B show contour mix-process plots showing oleophobicity (FIG. 5A) and permeability (FIG. 5B) of Media C coated with differing proportions of Polymer 1 and Polymer 2 at varying concentrations.
Figure 5B:
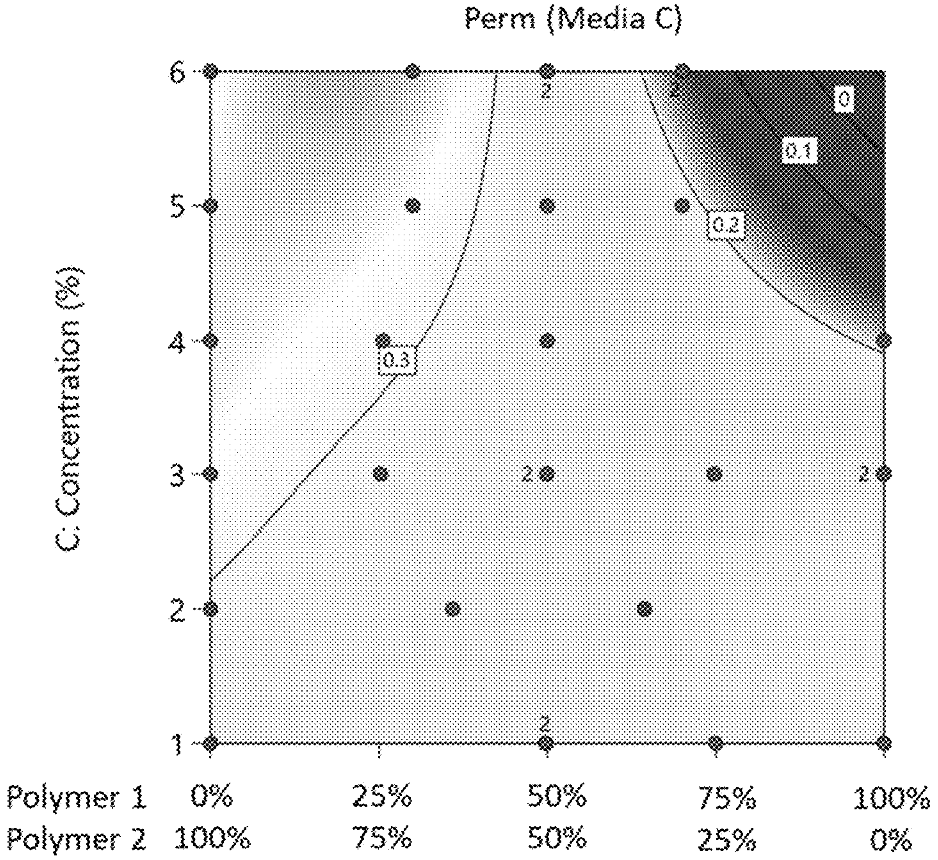
Figure 6A:
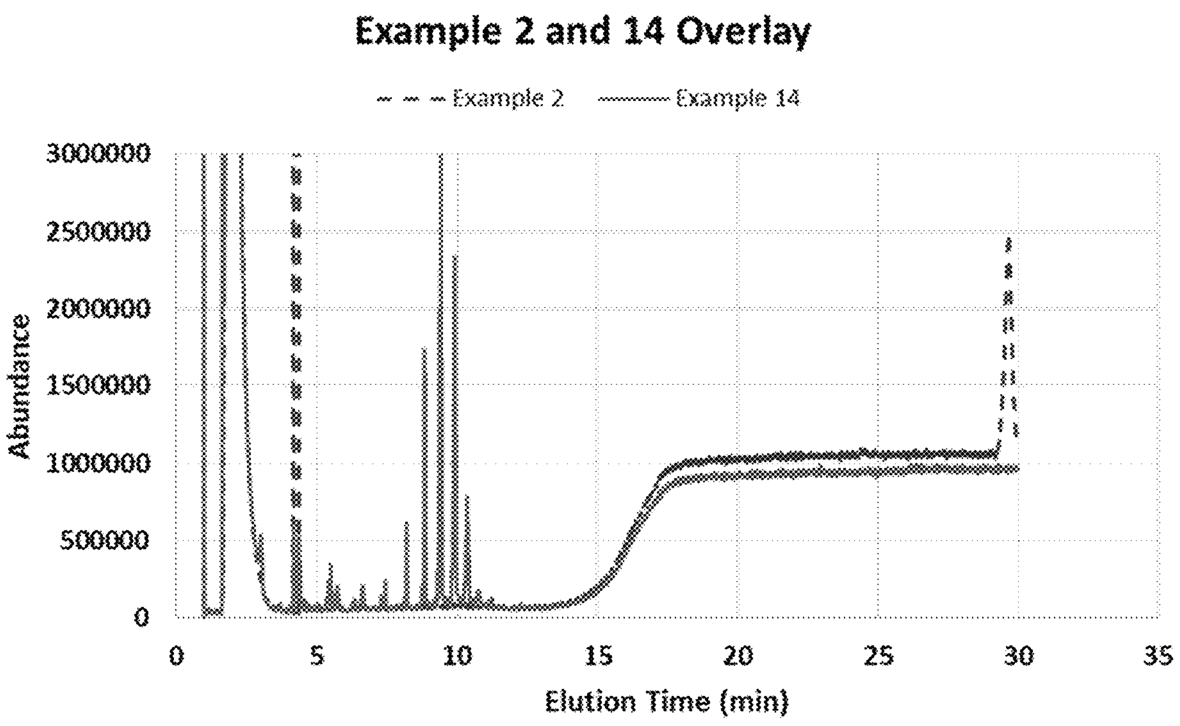
FIG. 6A-FIG. 6E show the analytical results of pyrolysis of a media coated with a solution including only Polymer 1 (FIG. 6A, using the solution described for Example 2) or only Polymer 2 (FIG. 6A, using the solution described for Example 14) or varying amounts of Polymer 1 and Polymer 2 (FIG. 6B-FIG. 6E, using the solutions described for Examples 10, 12, 18, or 17, respectively). The right-hand sides of FIG. 6B-FIG. 6E shown an enlargement of a portion of the left-hand sides of FIG. 6B-FIG. 6D.
Figure 6B:
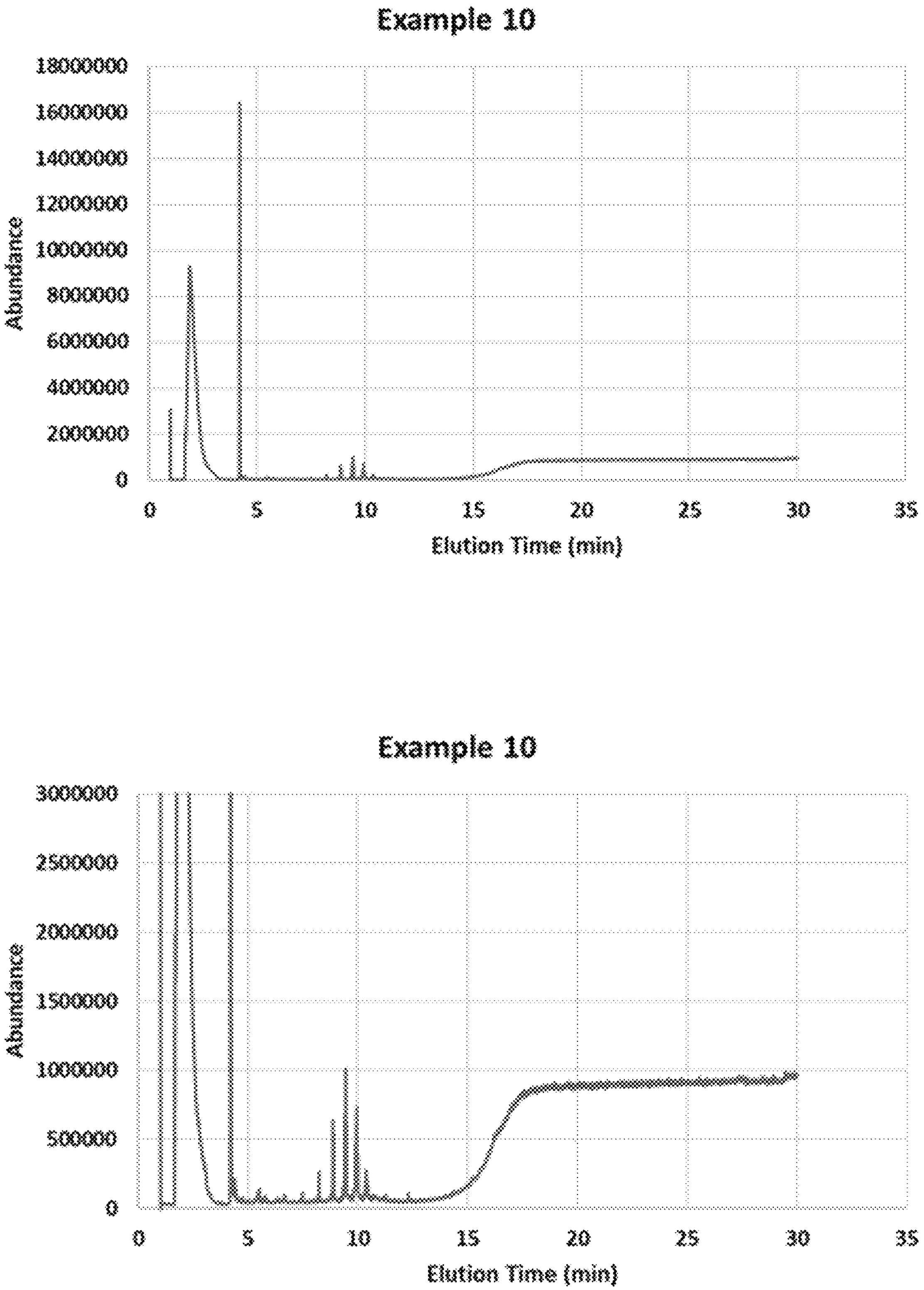
Figure 6C:
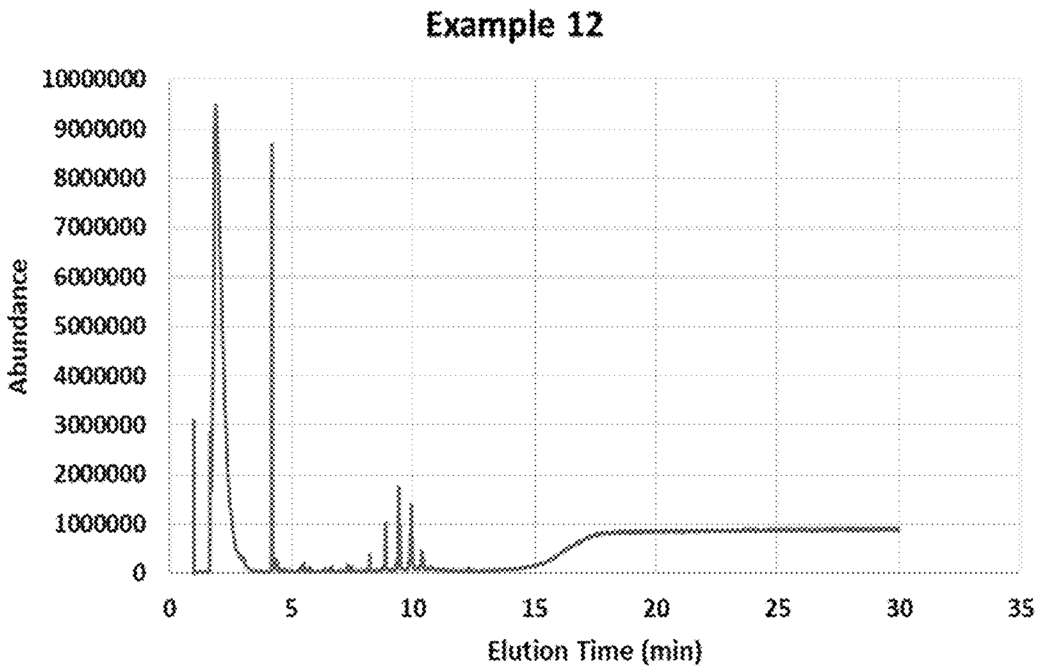
Figure 6C:
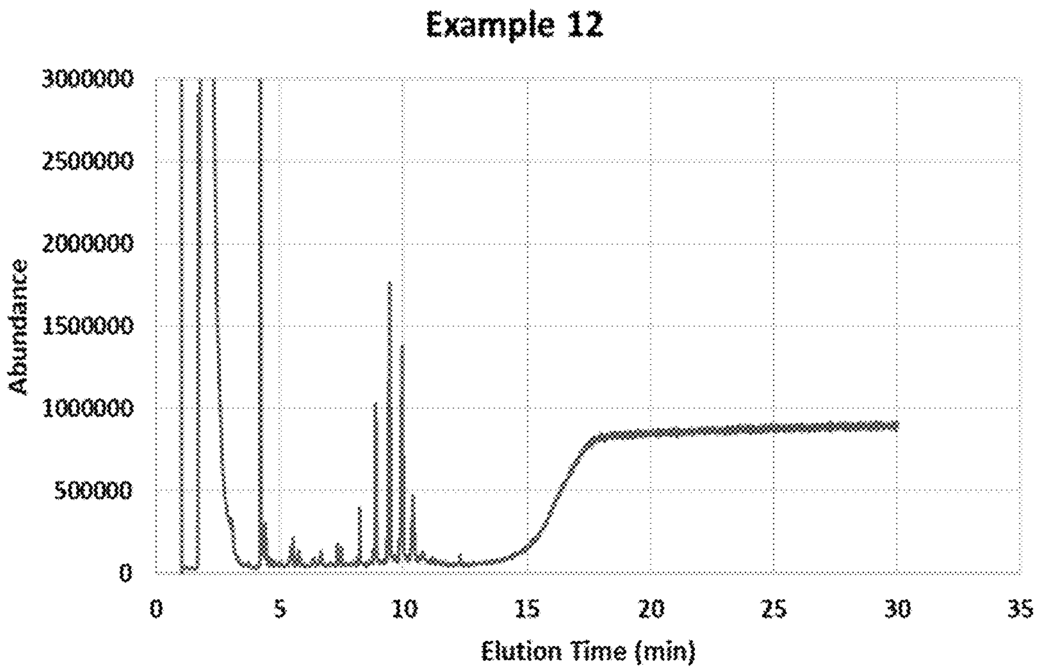
Figure 6D:
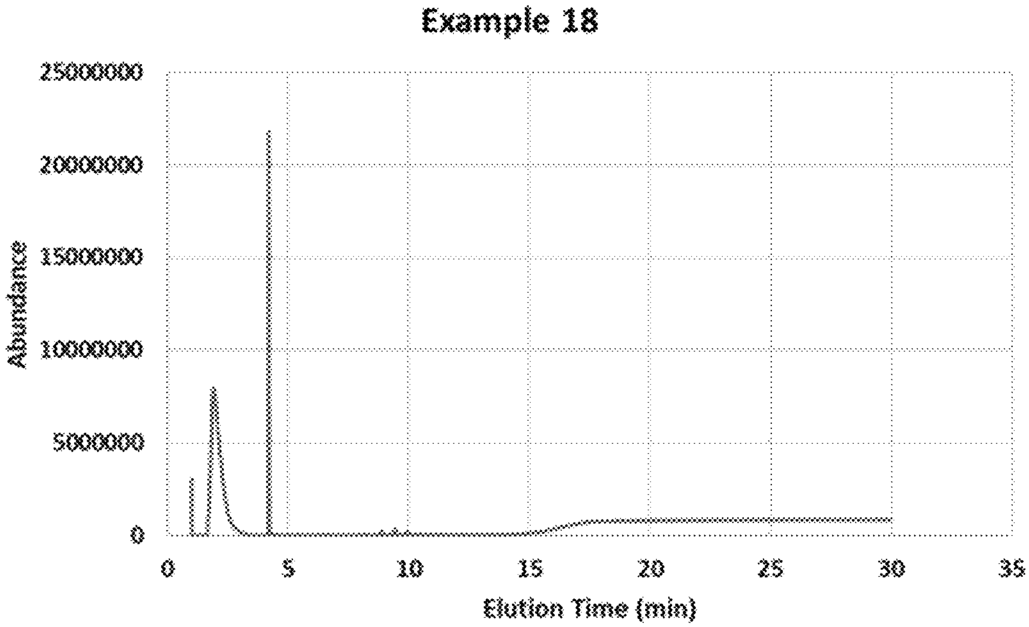
Figure 6D:
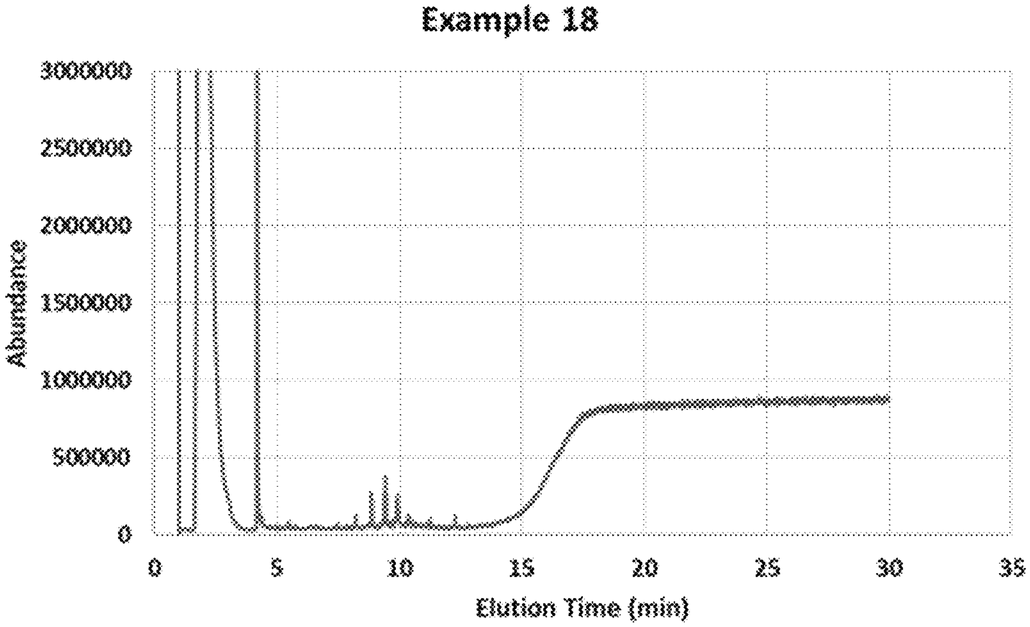
Figure 6E:
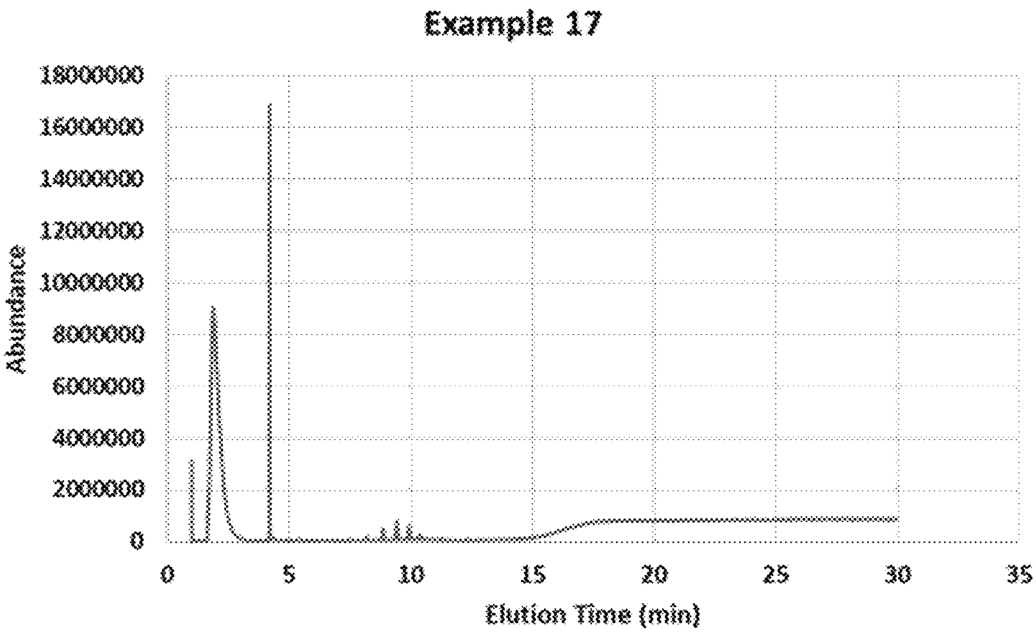
Figure 6E:
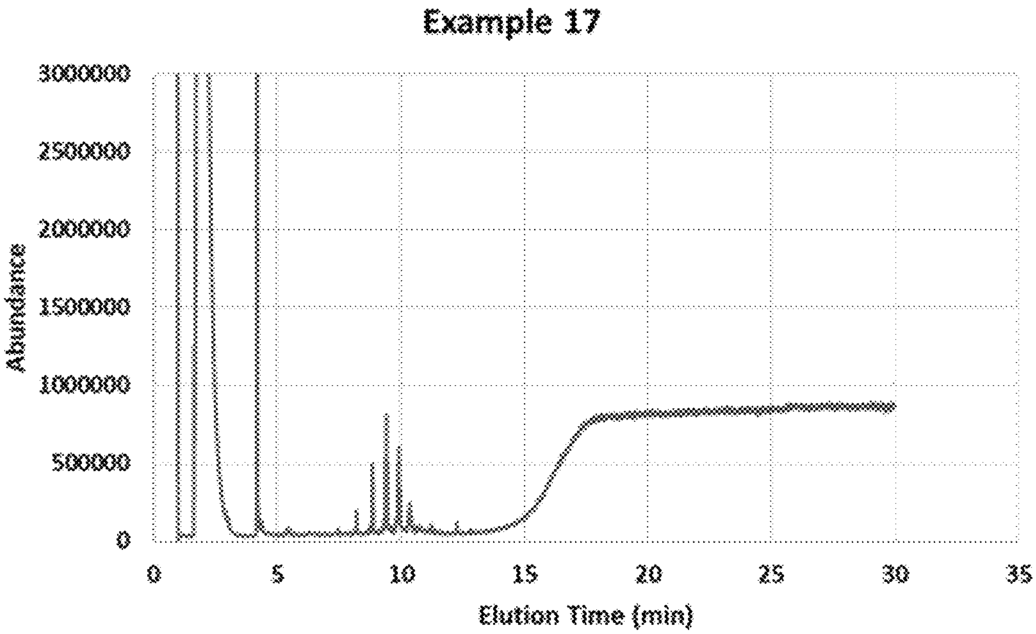

As can be seen in FIG. 5A-FIG. 5B, for Media C, when the coating mixtures included Polymer 1 in a range of 50% (w/w) to 90% (w/w) and Polymer 2 in a range of 10% (w/w) to 50% (w/w) and was coated at a concentration of at least 2% (w/v), an oleo repellency of at least 7 was achieved while maintaining a permeability of at least 0.145.

The coated media of Examples 39-50 were further evaluated to determine time to wet with gasoline. Results are shown in Table 5C.

The coated media of Example 8 was further evaluated to determine the effect of the coating on the pore size. Results are shown in Table 9.

TABLE 5A

| Example # | Polymer 1 (g) | Polymer 2 (g) | Polymer 1 (% w/w) | Polymer 2 (% w/w) | 1 + 2 (g) | NOVEC 7100 (mL) | Conc. (% w/v) |
|---|---|---|---|---|---|---|---|
| 1 | 0.17 | 0.00 | 100% | 0% | 0.17 | 16.67 | 1% |
| 2 | 0.50 | 0.00 | 100% | 0% | 0.50 | 12.50 | 4% |
| 3 | 0.13 | 0.37 | 26% | 74% | 0.50 | 12.50 | 4% |
| 4 | 0.00 | 0.33 | 0% | 100% | 0.33 | 11.11 | 3% |
| 5 | 0.25 | 0.25 | 50% | 50% | 0.50 | 12.50 | 4% |

TABLE 5A-continued

| Example # | Polymer 1 (g) | Polymer 2 (g) | Polymer 1 (% w/w) | Polymer 2 (% w/w) | 1 + 2 (g) | NOVEC 7100 (mL) | Conc. (% w/v) |
|---|---|---|---|---|---|---|---|
| 6 | 0.50 | 0.00 | 100% | 0% | 0.50 | 16.67 | 3% |
| 7 | 0.08 | 0.08 | 50% | 50% | 0.17 | 16.67 | 1% |
| 8 | 0.07 | 0.13 | 36% | 64% | 0.20 | 10.00 | 2% |
| 9 | 0.12 | 0.04 | 75% | 25% | 0.17 | 16.67 | 1% |
| 10 | 0.25 | 0.25 | 50% | 50% | 0.50 | 16.67 | 3% |
| 11 | 0.00 | 0.17 | 0% | 100% | 0.17 | 16.67 | 1% |
| 12 | 0.13 | 0.37 | 25% | 75% | 0.50 | 16.67 | 3% |
| 13 | 0.50 | 0.00 | 100% | 0% | 0.50 | 16.67 | 3% |
| 14 | 0.00 | 0.33 | 0% | 100% | 0.33 | 8.33 | 4% |
| 15 | 0.00 | 0.20 | 0% | 100% | 0.20 | 10.00 | 2% |
| 16 | 0.08 | 0.08 | 50% | 50% | 0.17 | 16.67 | 1% |
| 17 | 0.13 | 0.07 | 64% | 36% | 0.20 | 10.00 | 2% |
| 18 | 0.37 | 0.13 | 75% | 25% | 0.50 | 16.67 | 3% |
| 19 | 0.25 | 0.25 | 50% | 50% | 0.50 | 16.67 | 3% |
| 20 | 0.50 | 0.00 | 100% | 0% | 0.50 | 10.00 | 5% |
| 21 | 0.40 | 0.10 | 80% | 20% | 0.50 | 10.00 | 5% |
| 22 | 0.43 | 0.07 | 87% | 13% | 0.50 | 12.50 | 4% |
| 23 | 0.50 | 0.00 | 100% | 0% | 0.50 | 16.67 | 3% |
| 24 | 0.45 | 0.05 | 90% | 10% | 0.50 | 8.33 | 6% |
| 25 | 0.50 | 0.00 | 100% | 0% | 0.50 | 10.00 | 5% |
| 26 | 0.45 | 0.05 | 90% | 10% | 0.50 | 10.00 | 5% |
| 27 | 0.40 | 0.10 | 80% | 20% | 0.50 | 16.67 | 3% |
| 28 | 0.43 | 0.08 | 85% | 15% | 0.50 | 16.67 | 3% |
| 29 | 0.43 | 0.07 | 87% | 13% | 0.50 | 12.50 | 4% |
| 30 | 0.50 | 0.00 | 100% | 0% | 0.50 | 8.33 | 6% |
| 31 | 0.40 | 0.10 | 80% | 20% | 0.50 | 8.33 | 6% |
| 32 | 0.40 | 0.10 | 80% | 20% | 0.50 | 12.50 | 4% |
| 33 | 0.45 | 0.05 | 90% | 10% | 0.50 | 10.00 | 5% |
| 34 | 0.45 | 0.05 | 90% | 10% | 0.50 | 8.33 | 6% |
| 35 | 0.45 | 0.05 | 90% | 10% | 0.50 | 10.00 | 5% |
| 36 | 0.48 | 0.03 | 95% | 5% | 0.50 | 16.67 | 3% |
| 37 | 0.50 | 0.00 | 100% | 0% | 0.50 | 12.50 | 4% |
| 38 | 0.45 | 0.05 | 90% | 10% | 0.50 | 16.67 | 3% |
| 39 | 0.60 | 0.00 | 0% | 100% | 0.60 | 10.00 | 6% |
| 40 | 0.42 | 0.18 | 30% | 70% | 0.60 | 10.00 | 6% |
| 41 | 0.30 | 0.30 | 50% | 50% | 0.60 | 10.00 | 6% |
| 42 | 0.18 | 0.42 | 70% | 30% | 0.60 | 10.00 | 6% |
| 43 | 0.50 | 0.00 | 0% | 100% | 0.50 | 10.00 | 5% |
| 44 | 0.35 | 0.15 | 30% | 70% | 0.50 | 10.00 | 5% |
| 45 | 0.25 | 0.25 | 50% | 50% | 0.50 | 10.00 | 5% |
| 46 | 0.15 | 0.35 | 70% | 30% | 0.50 | 10.00 | 5% |
| 47 | 0.50 | 0.00 | 0% | 100% | 0.60 | 10.00 | 6% |
| 48 | 0.35 | 0.15 | 30% | 70% | 0.60 | 10.00 | 6% |
| 49 | 0.25 | 0.25 | 50% | 50% | 0.60 | 10.00 | 6% |
| 50 | 0.15 | 0.35 | 70% | 30% | 0.60 | 10.00 | 6% |

TABLE 5B

| Example # | Media A OLEO | Media B (Side 1) OLEO | Media B (Side 2) OLEO | Media C OLEO | Media A PERM* | Media B PERM* | Media C PERM* |
|---|---|---|---|---|---|---|---|
| 1 | 4 | 3 | 3 | 5 | 0.11 | 3.05 | 0.266 |
| 2 | 6 | 6 | 6 | 6 | 0.09 | 2.08 | 0.15 |
| 3 | 6 | 7 | 6 | 7 | 0.13 | 3.18 | 0.3 |
| 4 | 6 | 6 | 3 | 7 | 0.14 | 2.62 | 0.305 |
| 5 | 7 | 7 | 5 | 7 | 0.11 | 2.12 | 0.225 |
| 6 | 6 | 5 | 5 | 6 | 0.11 | 2.48 | 0.277 |
| 7 | 6 | 6 | 3 | 6 | 0.13 | 2.80 | 0.266 |
| 8 | 6 | 6 | 6 | 7 | 0.11 | 2.93 | 0.265 |
| 9 | 6 | 5 | 2 | 6 | 0.12 | 2.72 | 0.265 |
| 10 | 7 | 6 | 6 | 7 | 0.11 | 2.65 | 0.25 |
| 11 | 6 | 6 | 5 | 6 | 0.12 | 3.05 | 0.286 |
| 12 | 7 | 6 | 6 | 7 | 0.13 | 2.70 | 0.307 |
| 13 | 6 | 6 | 5 | 6 | 0.09 | 2.11 | 0.275 |
| 14 | 6 | 7 | 5 | 7 | 0.12 | 3.05 | 0.37 |
| 15 | 6 | 6 | 1 | 7 | 1.30 | 3.05 | 0.27 |
| 16 | 6 | 6 | 2 | 6 | 0.12 | 2.65 | 0.266 |
| 17 | 6 | 6 | 4 | 7 | 0.11 | 2.69 | 0.33 |
| 18 | 7 | 6 | 6 | 7 | 0.12 | 2.48 | 0.28 |
| 19 | 6 | 6 | 5 | 7 | 0.10 | 2.54 | 0.279 |
| 20 | 6 | 5 | 5 | no data | 0.09 | 1.65 | no data |
| 21 | 7 | 7 | 7 | no data | 0.09 | 1.68 | no data |
| 22 | 6 | 6 | 6 | no data | 0.10 | 2.10 | no data |

TABLE 5B-continued

| Example # | Media A OLEO | Media B (Side 1) OLEO | Media B (Side 2) OLEO | Media C OLEO | Media A PERM* | Media B PERM* | Media C PERM* |
|---|---|---|---|---|---|---|---|
| 23 | 5 | 5 | 5 | no data | 0.12 | 2.30 | no data |
| 24 | 7 | 6 | 6 | no data | 0.06 | 1.73 | no data |
| 25 | 6 | 6 | 6 | no data | 0.06 | 1.71 | no data |
| 26 | 6 | 7 | 6 | no data | 0.08 | 1.38 | no data |
| 27 | 7 | 6 | 6 | no data | 0.16 | 3.50 | no data |
| 28 | 6 | 6 | 5 | no data | 0.12 | 2.08 | no data |
| 29 | 6 | 6 | 6 | no data | 0.11 | 2.45 | no data |
| 30 | 6 | 6 | 6 | no data | 0.06 | 2.23 | no data |
| 31 | 7 | 7 | 6 | no data | 0.08 | 1.90 | no data |
| 32 | 7 | 6 | 6 | no data | 0.09 | 2.20 | no data |
| 33 | 7 | 7 | 6 | no data | 0.11 | 1.34 | no data |
| 34 | 7 | 7 | 6 | no data | 0.07 | 1.81 | no data |
| 35 | 6 | 6 | 5 | no data | 0.06 | 2.53 | no data |
| 36 | 6 | 6 | 6 | no data | 0.12 | 2.65 | no data |
| 37 | 6 | 5 | 6 | no data | 0.10 | 3.18 | no data |
| 38 | 6 | 6 | 5 | no data | 0.11 | 2.56 | no data |
| 39 | 7 | 7 | 6 | 7 | 0.13 | 2.62 | 0.32 |
| 40 | 7 | 7 | 6 | 7 | 0.00 | 2.30 | 0.00 |
| 41 | 7 | 7 | 6 | 7 | 0.11 | 2.78 | 0.27 |
| 42 | 8 | 7 | 6 | 8 | 0.05 | 2.58 | 0.15 |
| 43 | 7 | 7 | 7 | 7 | 0.14 | 2.47 | 0.30 |
| 44 | 7 | 7 | 7 | 7 | 0.13 | 2.70 | 0.29 |
| 45 | 7 | 7 | 7 | 7 | 0.11 | 1.40 | 0.31 |
| 46 | 7 | 7 | 8 | 8 | 0.12 | 2.05 | 0.28 |
| 47 | 6 | 7 | no data | 7 | 0.15 | 3.1 | 0.32 |
| 48 | 7 | 6 | no data | 7 | 0.11 | 2.31 | 0.3 |
| 49 | 7 | 7 | 6 | 7 | 0.1 | 2.1 | 0.3 |
| 50 | 7 | 7 | 7 | 8 | 0.7 | 1.8 | 0.15 |

PERM indicates permeability in cubic feet per minute (CFM) at 0.5 inches $H_2O$.

TABLE 5C

| Example # | Gasoline time to wet A (seconds) | Gasoline time to wet B Side 1 (seconds) | Gasoline time to wet C (seconds) |
|---|---|---|---|
| 39 | 3 | 5 | 4 |
| 40 | 2 | 4 | 9 |
| 41 | 2 | 5 | 4 |
| 42 | >30 | >30 | >30 |
| 43 | 0 | 2 | 1 |
| 44 | 1 | >30 | 10 |
| 45 | 1 | 10 | >30 |
| 46 | 15 | >30 | >30 |
| 47 | 0 | 1 | 1 |
| 48 | 1 | 2 | 2 |
| 49 | 1 | 0 | 5 |
| 50 | 3 | 4 | 10 |

TABLE 6A

| | | | |
|---|---|---|---|
| Std. Dev. | 0.0136 | $R^2$ | 0.7334 |
| Mean | 0.1062 | Adjusted $R^2$ | 0.7091 |
| C.V. % | 12.78 | Predicted $R^2$ | 0.6905 |
| | | Adeq Precision | 20.8443 |

TABLE 6B

| | | | |
|---|---|---|---|
| Std. Dev. | 0.4298 | $R^2$ | 0.6242 |
| Mean | 6.39 | Adjusted $R^2$ | 0.5900 |
| C.V. % | 6.73 | Predicted $R^2$ | 0.5146 |
| | | Adeq Precision | 17.8067 |

TABLE 7A

| | | | |
|---|---|---|---|
| Std. Dev. | 0.4141 | $R^2$ | 0.7588 |
| Mean | 6.22 | Adjusted $R^2$ | 0.7252 |
| C.V. % | 6.66 | Predicted $R^2$ | 0.6475 |
| | | Adeq Precision | 22.3493 |

TABLE 7B

| | | | |
|---|---|---|---|
| Std. Dev. | 0.3820 | $R^2$ | 0.4652 |
| Mean | 2.40 | Adjusted $R^2$ | 0.4425 |
| C.V. % | 15.90 | Predicted $R^2$ | 0.4072 |
| | | Adeq Precision | 13.5983 |

TABLE 7C

| | | | |
|---|---|---|---|
| Std. Dev. | 0.7012 | $R^2$ | 0.8123 |
| Mean | 5.42 | Adjusted $R^2$ | 0.7479 |
| C.V. % | 12.95 | Predicted $R^2$ | 0.1836 |
| | | Adeq Precision | 15.1514 |

TABLE 7D

| | | | |
|---|---|---|---|
| Std. Dev. | 0.3873 | $R^2$ | 0.4524 |
| Mean | 2.39 | Adjusted $R^2$ | 0.4280 |
| C.V. % | 16.21 | Predicted $R^2$ | 0.3913 |
| | | Adeq Precision | 13.0638 |

TABLE 8A

| | | | |
|---|---|---|---|
| Std. Dev. | 0.2527 | $R^2$ | 0.8949 |
| Mean | 6.79 | Adjusted $R^2$ | 0.8599 |
| C.V. % | 3.72 | Predicted $R^2$ | 0.8126 |
| | | Adeq Precision | 20.3385 |

TABLE 8B

| | | | |
|---|---|---|---|
| Std. Dev. | 0.0326 | $R^2$ | 0.7026 |
| Mean | 0.2721 | Adjusted $R^2$ | 0.5837 |
| C.V. % | 11.99 | Predicted $R^2$ | 0.3360 |
| | | Adeq Precision | 9.3149 |

TABLE 9

| Media | Ave. Max Pore Size (μm) | Ave. Mean Flow Pore Size (μm) |
|---|---|---|
| Media A uncoated | 0.46 | 0.22 |
| Media A coated (Example #8) | 0.50 | 0.23 |
| Media B uncoated | 2.1 | 0.8 |
| Media B coated (Example #8) | 2.7 | 1.2 |
| Media C uncoated | 1.45 | 0.85 |
| Media C coated (Example #8) | 1.84 | 0.86 |

Example 51

Media C was coated with mixtures that included varying amounts of Polymer 1 and Polymer 2 (mixtures from Examples 2, 14, 10, 12, 18, and 17). The media was tested according to the Pyrolysis Data Analysis Method. Results are shown in FIG. 6A-FIG. 6E.

The results indicated that Polymer 1 and Polymer 2 in solution were transferable to a coated media; the ratios of Polymer 1 and Polymer 2 in the solution were reflected in the pyrolysis results.

Example 52A

To determine if the similar results as observed in Examples 1-50 (which included mixtures of Polymer 1 and Polymer 2) could be obtained by copolymerizing 2,2,3,3,4,4,4-heptafluorobutyl methacrylate (Monomer 1) and perfluoropolyether$_{1000}$ methacrylate (Monomer 2), the monomers used to derive Polymer 1 and Polymer 2 were copolymerized using the General Fluoropolymer Synthesis method (total amount of monomer (Monomer 1+Monomer 2) was 2 g, with 2 mL NOVEC 7100 and 0.008 g AIBN, 65° C., >12 hours) and the proportions shown in Table 10. After formation, the copolymer was coated on glass slides. Surface energy (in millinewtons per meter (mN/m)) of the resulting coated surface was measured as described in the "Calculation of Surface Energy" method. Results are shown in FIG. 1A.

In contrast to the results obtained in Examples 1-50 and Example 52B where coating a surface with a mixture of Polymer 1 and Polymer 2 resulted in low surface energies, even when smaller amounts of Polymer 2 were used (for example, as little as 30%), when a surface is coated with copolymerized Polymer 1 and Polymer 2, high levels of Monomer 2 (for example, more than 95%) are needed to obtain a significant decrease in surface energy.

Without wishing to be bound by theory, it is believed that when copolymerized, the 2,2,3,3,4,4,4-heptafluorobutyl methacrylate monomers (Monomer 1) prevent the long side chain of PFPE$_{1000}$ monomers (Monomer 2) from being forced into an extended conformation (see FIG. 1B), and it is believed that the side chain assembling such an extended confirmation is necessary to obtain decreased surface energy.

TABLE 10

| Copolymerization of Monomer 1 and Monomer 2 to generate a copolymer | | | |
|---|---|---|---|
| mol % Monomer 1 | mol % Monomer 2 | ST (mN/m) | Std Dev (mN/m) |
| 100 | 0 | 14.27 | 0.16 |
| 92 | 8 | 13.87 | — |
| 79 | 21 | 13.66 | — |
| 55 | 45 | 12.05 | — |
| 9 | 91 | 10.25 | — |
| 2 | 98 | 6.38 | — |
| 0 | 100 | 8.5 | 0.97 |

Example 52B

Figure 1C:
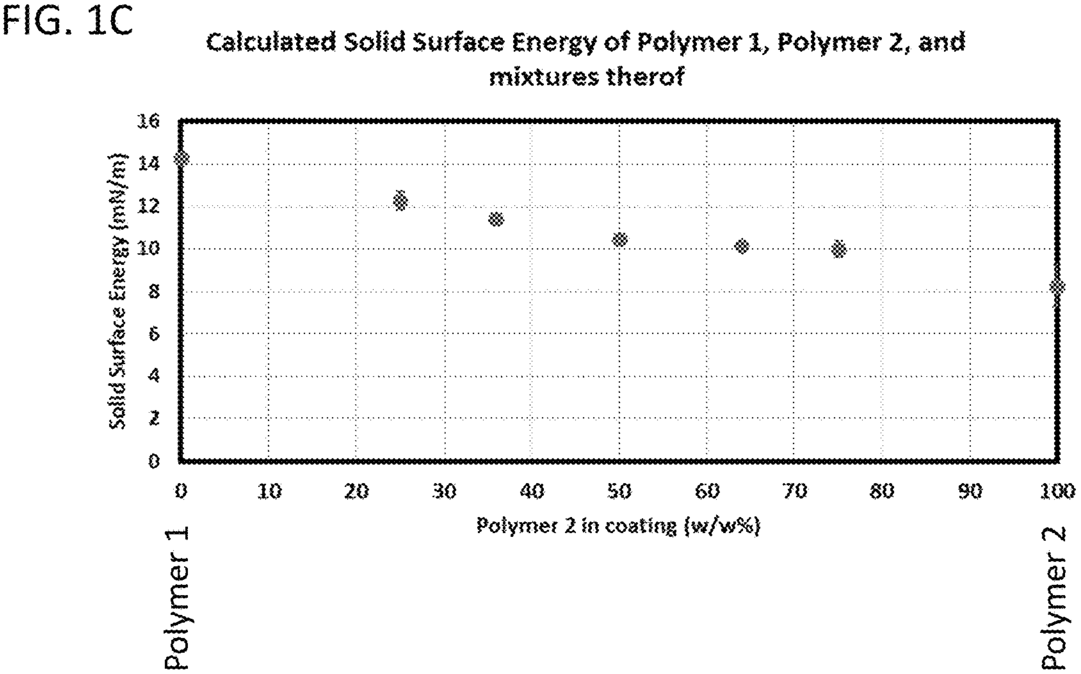
FIG. 1C shows solid surface energy results of coating a glass slide with Polymer 1 or Polymer 2 or a mixture (that is not copolymerized) thereof, and measuring the calculated solid surface energy, as further described in Example 52B.

To test the solid surface energy (also referred to as surface tension) of Polymer 1, Polymer 2, or a mixture thereof, the polymers (or mixtures thereof) were coated on glass slides. Surface energy (in millinewtons per meter (mN/m)) of the resulting coated surface was measured as described in the "Calculation of Surface Energy" method. Results are shown in FIG. 1C.

Surprisingly, although surface energies continue to decrease as the amount of Polymer 2 in the mixture increases, as seen in Examples 1-50, a mixture of Polymer 1 and Polymer 2 achieves the greatest oleophobicity ratings.

Figure 1D:
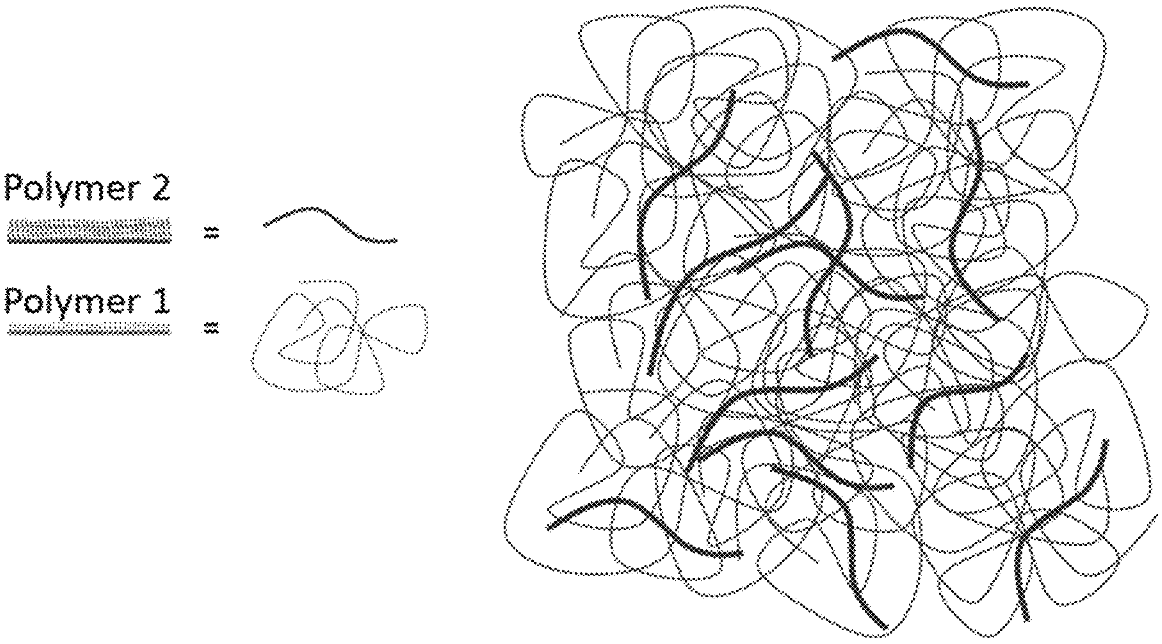
FIG. 1D shows a schematic of the predicted structure when Polymer 1 and Polymer 2 are mixed (but not copolymerized) and coated on a surface, as further described in Example 52B.

Without wishing to be bound by theory, it is believed that when polymerized, the long side chain of PFPE$_{1000}$ monomers (Monomer 2) assume an extended conformation (see FIG. 1D, left side) when polymerized (Polymer 2), which is maintained even when mixed with Polymer 1 (FIG. 1D, right side).

Example 53

A monomer (referred to herein as "Monomer 3") and having the following structure:

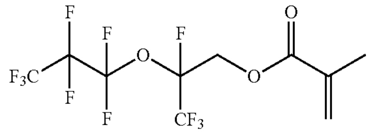

$R_1$ = —$CF(CF_3)CH_2O$—

Figure 7:
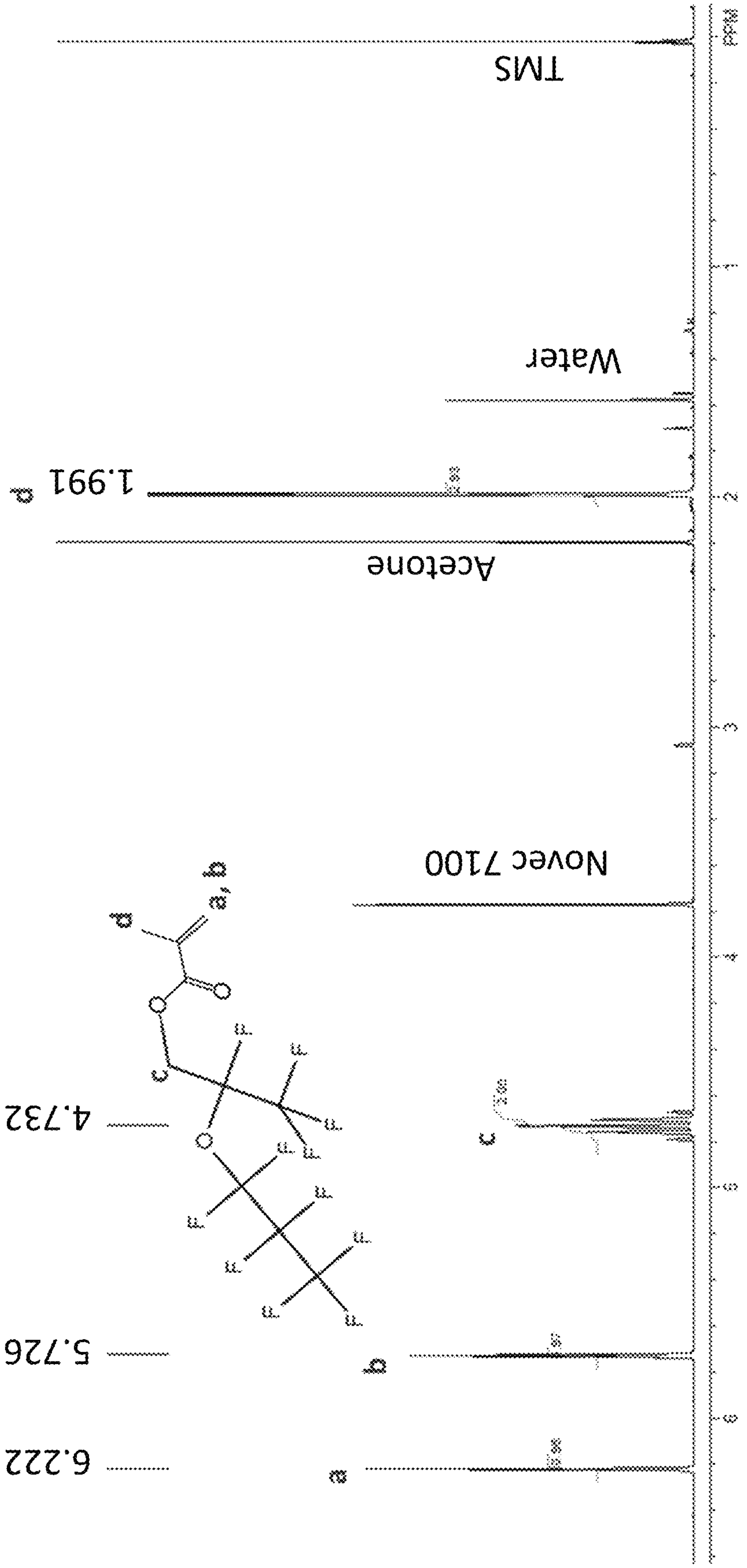
FIG. 7 shows an NMR scan for Monomer 3.

$R_2$ = —$CH_3$ y = 0 and a molecular weight of 384.13 g/mol was prepared by adding 24.6 g 1H,1H-Perfluoro(2-methyl-3-oxahexan-1-ol), 200 mL NOVEC 7100, and a magnetic stir bar to a 500 mL 3-neck round bottom flask fitted with a reflux condenser. The flask was sparged with Argon for 10 minutes. 7.6 mL acryloyl chloride was added dropwise via syringe, then the reaction was refluxed overnight. A white precipitate appeared within 30 minutes of reflux. The reaction was allowed to cool, poured over cold water, and washed with copious amounts of water and brine. The organic phase was then dried over 10 g of magnesium sulfate, filtered, and concentrated to a clear oil. The clear oil was flashed through an alumina plug with NOVEC 7100 and concentrated again to yield ~24 g of Monomer 3. NMR results are shown in FIG. 7.

A polymer (Polymer 3) having the following structure:

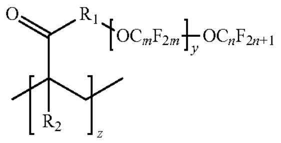

where, $R_1$=$OCH_2CF(CF_3)$, $R_2$=$CH_3$, n=3, y=0, and z=101, was prepared using the General Fluoropolymer Synthesis Method (2 g of the monomer, 0.008 g AIBN, 2 mL NOVEC 7100, 65° C., >12 hours, in a 20 mL scintillation vial). A mixture including Polymer 3 (concentration: 3.5% (w/v)) in NOVEC 7100 was prepared and was used to coat three different Media (Media A, Media B, and Media C), as described in the Materials and Methods section. Oleophobicity of the resulting media was tested, and results are shown in Table 11.

TABLE 11

| Example # | Polymer 3 (g) | NOVEC 7100 (mL) | Polymer 3 (%) | Conc. (% w/v) | Media A OLEO | Media B (Side 1) OLEO | Media C OLEO |
|---|---|---|---|---|---|---|---|
| 53 | 2 | 57 | 100 | 3.5 | 6 | 6 | 7 |

Example 54

A polymer (referred to herein as Polymer 4) was prepared from Monomer 2 and 3-(trimethoxysilyl)propyl methacrylate (Sigma Aldrich, St. Louis, MO) (referred to herein as Monomer 4), wherein Monomer 4 has the following structure:

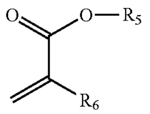

wherein $R_5$=—$CH_2CH_2CH_2Si(OCH_3)_3$, $R_6$=—$CH_3$. The polymer was prepared using the General Fluoropolymer Synthesis Method (2 g of Monomer 2, 0.007 g of Monomer 4, 0.008 g AIBN, 2 mL NOVEC 7100, 65° C., >12 hours, in a 20 mL scintillation vial).

A mixture including Polymer 4 (concentration: 3.5% (w/v)) in NOVEC 7100 was prepared by dilution of the reaction and was used to coat three different Media (Media A, Media B, and Media C), as described in the Materials and Methods section. Oleophobicity of the resulting media was tested, and results are shown in Table 12.

TABLE 12

| Example # | Polymer 4 (g) | NOVEC 7100 (mL) | Polymer 3 (%) | Conc. (% w/v) | Media A OLEO | Media B (Side 1) OLEO | Media C OLEO |
|---|---|---|---|---|---|---|---|
| 54 | 2 | 50 | 100 | 4 | 7 | 7 | 8 |

Examples 55-67

Figure 8:
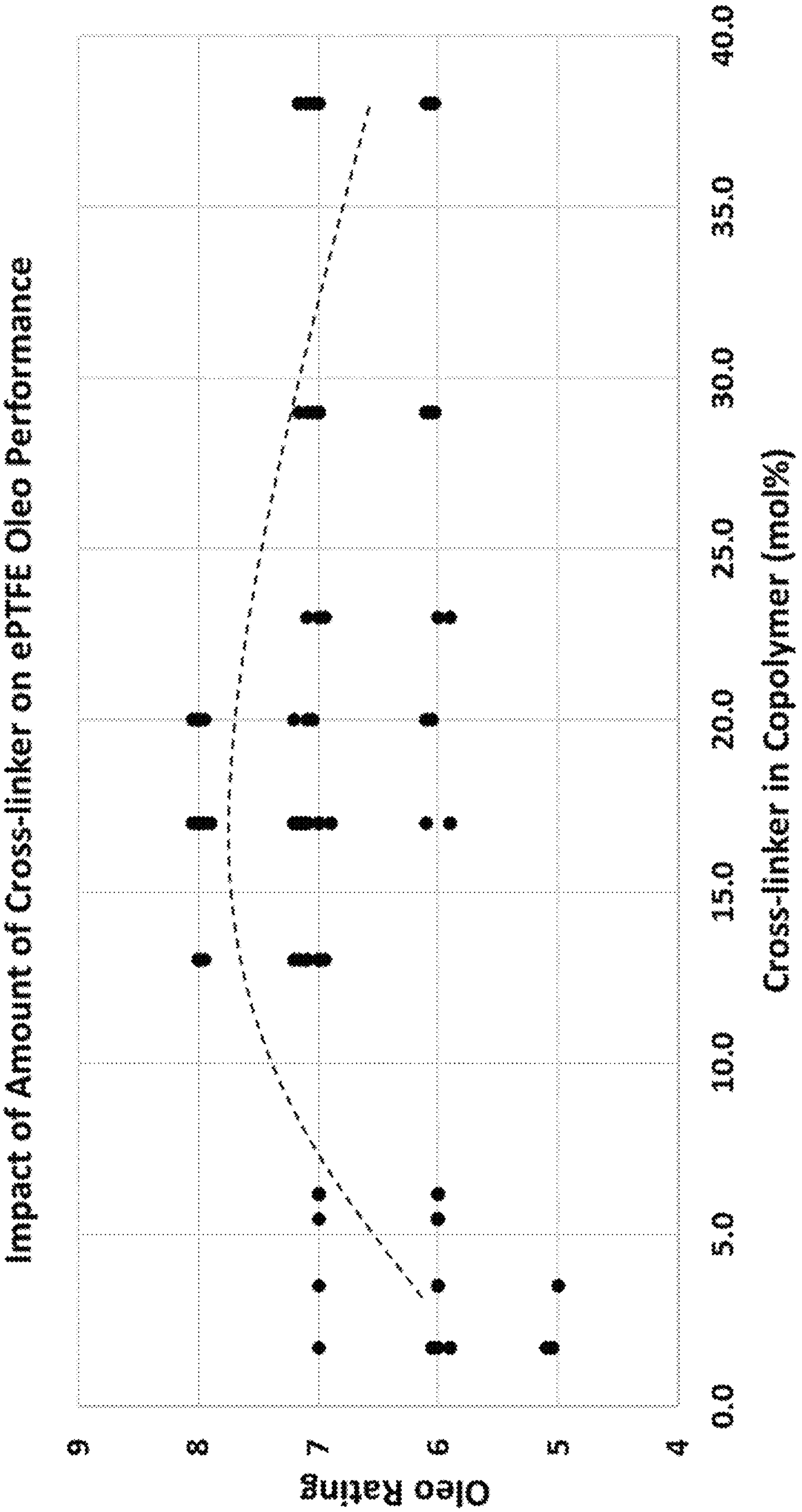
FIG. 8 shows the results of Examples 55-67.

Various polymers were prepared to assess the impact of varying the amount of cross-linker on the oleophobicity of the resulting polymer. The cross-linked polymers were prepared using Polymer 2 (poly(perfluoropolyether$_{1000}$ methacrylate)), prepared as described above, and MEMO (3-methacryloxypropyltrimethoxysilane) obtained from Evonik in Essen, Germany, and NOVEC 7100. The amount of cross-linker was varied from 1.7 mol-% to 38 mol-%. AIBN was used as the initiator. The amounts of the components are shown in Table 13. The cross-linked polymers were coated onto three different types of media (Media A, B, and C), including the membrane side (ePTFE side) and the scrim side of Media B. The coating compositions included the cross-linked polymer at concentrations of 1 wt-$, 2 wt-%, 3 wt-%, and 4 wt-%. The coated media were tested for their oleophobicity performance. The results are shown in Tables 14A-14D and FIG. 8.

TABLE 13

| Example # | Polymer 2 (g) | MEMO (g) | MEMO (mol-%) | NOVEC 7100 (mL) | AIBN (g) |
|---|---|---|---|---|---|
| 55 | 4 | 0.017 | 1.7 | 3.5 | 0.01 |
| 56 | 4 | 0.036 | 3.5 | 3.5 | 0.01 |
| 57 | 4 | 0.057 | 5.5 | 3.5 | 0.01 |
| 58 | 4 | 0.065 | 6.2 | 3.5 | 0.01 |
| 59 | 4 | 0.14 | 13 | 6 | 0.01 |
| 60 | 4 | 0.14 | 13 | 5 | 0.01 |
| 61 | 4 | 0.2 | 17 | 7 | 0.01 |
| 62 | 4 | 0.19 | 17 | 6 | 0.01 |
| 63 | 4 | 0.2 | 17 | 5 | 0.01 |
| 64 | 4 | 0.25 | 20 | 6 | 0.01 |
| 65 | 4 | 0.3 | 23 | 6 | 0.01 |
| 66 | 4 | 0.4 | 29 | 7 | 0.01 |
| 67 | 4 | 0.6 | 38 | 7 | 0.01 |

TABLE 14A

| Media A oleophobicity results. | | | | |
|---|---|---|---|---|
| Example # | Oleophobicity at 4% | Oleophobicity at 3% | Oleophobicity at 2% | Oleophobicity at 1% |
| 55 | 5 | 5 | no data | no data |
| 56 | no data | 6 | no data | no data |
| 57 | no data | 6 | no data | no data |
| 58 | no data | 6 | no data | no data |
| 59 | 7 | no data | no data | no data |
| 60 | 7 | no data | no data | no data |
| 61 | 7 | 7 | 6 | 6 |
| 62 | 7 | no data | no data | no data |
| 63 | 7 | 6 | 6 | 6 |
| 64 | 7 | 6 | 6 | 6 |
| 65 | 6 | no data | no data | no data |
| 66 | 6 | 6 | 6 | 5 |
| 67 | 6 | 6 | 6 | 5 |

TABLE 14B

| Media B, membrane side, oleophobicity results. | | | | |
|---|---|---|---|---|
| Example # | Oleophobicity at 4% | Oleophobicity at 3% | Oleophobicity at 2% | Oleophobicity at 1% |
| 55 | 6 | 6 | no data | no data |
| 56 | no data | 6 | no data | no data |
| 57 | no data | 6 | no data | no data |
| 58 | no data | 7 | no data | no data |
| 59 | 7 | no data | no data | no data |
| 60 | 8 | no data | no data | no data |
| 61 | 7 | 7 | 7 | 7 |
| 62 | 7 | no data | no data | no data |
| 63 | 8 | 8 | 7 | 7 |
| 64 | 8 | 7 | 7 | 6 |
| 65 | 7 | no data | no data | no data |
| 66 | 7 | 7 | 7 | 6 |
| 67 | 7 | 7 | 7 | 6 |

TABLE 14C

| Media C, scrim side, oleophobicity results. | | | | |
|---|---|---|---|---|
| Example # | Oleophobicity at 4% | Oleophobicity at 3% | Oleophobicity at 2% | Oleophobicity at 1% |
| 55 | 2 | 0 | no data | no data |
| 56 | no data | 5 | no data | no data |
| 57 | no data | 6 | no data | no data |
| 58 | no data | 6 | no data | no data |
| 59 | 7 | no data | no data | no data |
| 60 | 7 | no data | no data | no data |
| 61 | 7 | 7 | 7 | 6 |
| 62 | 7 | no data | no data | no data |
| 63 | 7 | 6 | 6 | 5 |
| 64 | 7 | 6 | 6 | 5 |
| 65 | 6 | no data | no data | no data |
| 66 | 6 | 6 | 6 | 5 |
| 67 | 6 | 6 | 6 | 5 |

TABLE 14D

| Media D, scrim side, oleophobicity results. | | | | |
|---|---|---|---|---|
| Example # | Oleophobicity at 4% | Oleophobicity at 3% | Oleophobicity at 2% | Oleophobicity at 1% |
| 55 | 7 | 6 | no data | no data |
| 56 | no data | 7 | no data | no data |
| 57 | no data | 7 | no data | no data |
| 58 | no data | 7 | no data | no data |
| 59 | 8 | no data | no data | no data |
| 60 | 8 | no data | no data | no data |
| 61 | 8 | 7 | 7 | 7 |
| 62 | 8 | no data | no data | no data |
| 63 | 8 | 8 | 7 | 7 |
| 64 | 8 | 8 | 8 | 7 |
| 65 | 7 | no data | no data | no data |
| 66 | 7 | 7 | 7 | 6 |
| 67 | 7 | 7 | 7 | 6 |

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A composition comprising a perfluoropolyether (PFPE) bottlebrush polymer, wherein the PFPE bottlebrush polymer is a copolymer comprising a first subunit having a structure:

(IV)

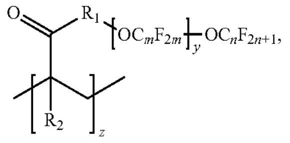

wherein each $R_1$ is independently a bond or an alkylene comprising at least 1 and up to 4 oxygen atoms, at least 1 and up to 5 carbon atoms, and, optionally up to 2 nitrogen atoms, up to 4 fluorine atoms, and up to 1 sulfur atom;

wherein each $R_2$ is independently H or an alkyl comprising at least 1 and up to 4 carbon atoms;

wherein m=1-3;

wherein n=1-4;

wherein y=0-30;

wherein z=10-80; and wherein the PFPE bottlebrush polymer comprises at least 90% (w/w) first subunits of Structure IV, based on total weight of the PFPE bottlebrush polymer, and further comprises a second subunit having the structure:

(VIII)

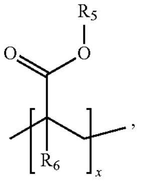

wherein each $R_5$ is independently a carbon-containing linker, optionally comprising up to 9 fluorine atoms, up to 1 silicon atom, up to 3 oxygen atoms, and up to 2 nitrogen atoms;

wherein each $R_6$ is independently H or an alkyl comprising at least 1 and up to 4 carbon atoms; and wherein x is from 1 to 6; and wherein Structure (VIII) is a cross-linker and is present in the composition at a concentration of at least 10 mol-%, based on a total amount of subunits.

2. The composition of claim 1, wherein each $R_1$ is $—OCH_2CH_2OC(O)CF(CF_3)—$;

each $R_2$ is $—CH_3$;

m=3;

n=3;

y is at least 3 and up to 4; and z is at least 10 and up to 60.

3. The composition of claim 1 having the structure:

(XIV)

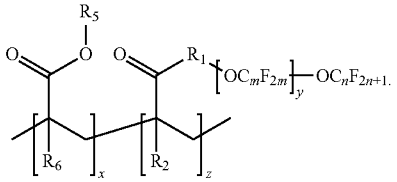

4. The composition of claim 3, wherein Structure (VIII) is present in the composition at a concentration of 10 mol-% to 25 mol-%, based on a total amount of subunits.

5. The composition of claim 1, wherein the composition further comprises:

a short chain fluoropolymer comprising a subunit having the structure:

(III)

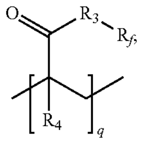

wherein each $R_3$ is independently a carbon-containing linker comprising at least 1 oxygen atom or nitrogen atom and at least 1 and up to 2 carbon atoms;

wherein each $R_4$ is independently H or an alkyl comprising at least 1 and up to 4 carbon atoms;

wherein each $R_f$ is independently F or a substituted alkyl comprising at least 1 and up to 4 carbon atoms and at least 1 and up to 9 fluorine atoms; and wherein q is at least 10.

6. The composition of claim 5, wherein q is at least 20.

7. The composition of claim 5, wherein the short chain fluoropolymer has the following structure:

(VI)

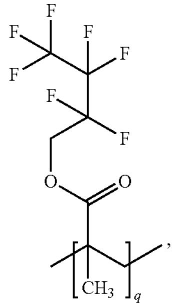

wherein q is at least 10 and up to 300.

8. The composition of claim 1, wherein the PFPE bottlebrush polymer contains side chains that are cross-linkable after the polymer has been disposed on an article.

9. The composition of claim 1, wherein the composition comprises an organic solvent.

10. An article comprising a composition disposed on a surface of a substrate, wherein the composition comprises the composition of claim 1.

11. The article of claim 10, wherein the substrate comprises a porous filtration medium, and wherein the composition is disposed on a major surface of the porous filtration medium.

12. The article of claim 11, wherein the treated porous filtration medium exhibits an oleophobicity of at least 6 on at least one major surface of the porous filtration medium, as determined by AATCC test method 118 (TM118-2013e2), wherein the ratings are rounded to nearest integer value.

13. The article of claim 12, wherein the treated porous filtration medium exhibits an oleophobicity of at least 6 on at least two major surfaces of the porous filtration medium, as determined by AATCC test method 118 (TM118-2013e2), wherein the ratings are rounded to nearest integer value.

14. A method of making an article comprising a treated porous filtration medium, the method comprising:

contacting a porous filtration medium with a mixture comprising the composition of claim 1, wherein the composition comprises a liquid, depositing the mixture onto the porous filtration medium to form the treated porous filtration medium, and removing the liquid.

15. The method of claim 14, wherein forming the treated porous filtration medium further comprises heat treating the treated porous filtration medium.

* * * * *